US012142734B2

(12) United States Patent
Hwangbo et al.

(10) Patent No.: US 12,142,734 B2
(45) Date of Patent: Nov. 12, 2024

(54) BATTERY, AND BATTERY PACK AND VEHICLE INCLUDING THE SAME

(71) Applicant: LG ENERGY SOLUTION, LTD., Seoul (KR)

(72) Inventors: Kwang-Su Hwangbo, Daejeon (KR); Do-Gyun Kim, Daejeon (KR); Geon-Woo Min, Daejeon (KR); Hae-Jin Lim, Daejeon (KR); Min-Ki Jo, Daejeon (KR); Su-Ji Choi, Daejeon (KR); Bo-Hyun Kang, Daejeon (KR); Jong-Sik Park, Daejeon (KR); Jae-Won Lim, Daejeon (KR); Yu-Sung Choe, Daejeon (KR); Hak-Kyun Choe, Daejeon (KR); Je-Jun Lee, Daejeon (KR); Byoung-Gu Lee, Daejeon (KR); Duk-Hyun Ryu, Daejeon (KR); Kwan-Hee Lee, Daejeon (KR); Jae-Eun Lee, Daejeon (KR); Jae-Woong Kim, Daejeon (KR); Ji-Min Jung, Daejeon (KR); Jin-Hak Kong, Daejeon (KR); Soon-O Lee, Daejeon (KR); Kyu-Hyun Choi, Daejeon (KR); Pil-Kyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/131,751

(22) Filed: Apr. 6, 2023

(65) Prior Publication Data

US 2023/0246244 A1 Aug. 3, 2023

Related U.S. Application Data

(63) Continuation of application No. 17/579,380, filed on Jan. 19, 2022.

(30) Foreign Application Priority Data

Jan. 19, 2021 (KR) .................. 10-2021-0007278
Feb. 19, 2021 (KR) .................. 10-2021-0022881
(Continued)

(51) Int. Cl.
*H01M 50/107* (2021.01)
*H01M 10/0587* (2010.01)
(Continued)

(52) U.S. Cl.
CPC ..... *H01M 10/0587* (2013.01); *H01M 50/107* (2021.01); *H01M 50/119* (2021.01);
(Continued)

(58) Field of Classification Search
None
See application file for complete search history.

(56) References Cited

U.S. PATENT DOCUMENTS 3,761,314 A 9/1973 Cailley
5,576,113 A 11/1996 Hirofumi et al.
(Continued)

FOREIGN PATENT DOCUMENTS

CN 1170782 A 1/1998
CN 1407642 A 4/2003
(Continued)

OTHER PUBLICATIONS

Nigel, "Tesla 4680 Cell", Battery Design, Nov. 18, 2022, <https://www.batterydesign.net/tesla-4680-cell/> (Year: 2022).*
(Continued)

*Primary Examiner* — Matthew T Martin
*Assistant Examiner* — Jessie Walls-Murray
(74) *Attorney, Agent, or Firm* — Birch, Stewart, Kolasch & Birch, LLP

(57) ABSTRACT

A battery can include an electrode assembly, a battery housing, a terminal and a cap. The electrode assembly can
(Continued)

have a first electrode, a second electrode and a separator between the first electrode and the second electrode. Each of the first electrode and the second electrode can have a first portion including an active material corresponding to the separator, and a second portion exposed beyond the separator and not coated with the active material. The battery housing can have a first end with a first opening and a second end with a second opening opposite the first end. The terminal can be electrically connected to the second portion of the first electrode and exposed out of the battery housing through the first opening of the battery housing at the first end.

28 Claims, 21 Drawing Sheets

(30) Foreign Application Priority Data

| Feb. 19, 2021 | (KR) | 10-2021-0022891 |
|---|---|---|
| Feb. 19, 2021 | (KR) | 10-2021-0022894 |
| Feb. 19, 2021 | (KR) | 10-2021-0022897 |
| Feb. 23, 2021 | (KR) | 10-2021-0024424 |
| Mar. 8, 2021 | (KR) | 10-2021-0030291 |
| Mar. 8, 2021 | (KR) | 10-2021-0030300 |
| Apr. 9, 2021 | (KR) | 10-2021-0046798 |
| May 4, 2021 | (KR) | 10-2021-0058183 |
| Jun. 14, 2021 | (KR) | 10-2021-0077046 |
| Jun. 28, 2021 | (KR) | 10-2021-0084326 |
| Oct. 1, 2021 | (KR) | 10-2021-0131205 |
| Oct. 1, 2021 | (KR) | 10-2021-0131207 |
| Oct. 1, 2021 | (KR) | 10-2021-0131208 |
| Oct. 1, 2021 | (KR) | 10-2021-0131215 |
| Oct. 1, 2021 | (KR) | 10-2021-0131225 |
| Oct. 14, 2021 | (KR) | 10-2021-0137001 |
| Oct. 15, 2021 | (KR) | 10-2021-0137856 |
| Oct. 22, 2021 | (KR) | 10-2021-0142196 |
| Nov. 9, 2021 | (KR) | 10-2021-0153472 |
| Nov. 19, 2021 | (KR) | 10-2021-0160823 |
| Nov. 24, 2021 | (KR) | 10-2021-0163809 |
| Nov. 26, 2021 | (KR) | 10-2021-0165866 |
| Dec. 3, 2021 | (KR) | 10-2021-0172446 |
| Dec. 10, 2021 | (KR) | 10-2021-0177091 |
| Dec. 31, 2021 | (KR) | 10-2021-0194572 |
| Dec. 31, 2021 | (KR) | 10-2021-0194593 |
| Dec. 31, 2021 | (KR) | 10-2021-0194610 |
| Dec. 31, 2021 | (KR) | 10-2021-0194611 |
| Dec. 31, 2021 | (KR) | 10-2021-0194612 |
| Jan. 5, 2022 | (KR) | 10-2022-0001802 |

(51) Int. Cl.

| *H01M 50/119* | (2021.01) |
|---|---|
| *H01M 50/124* | (2021.01) |
| *H01M 50/133* | (2021.01) |
| *H01M 50/152* | (2021.01) |
| *H01M 50/167* | (2021.01) |
| *H01M 50/186* | (2021.01) |
| *H01M 50/188* | (2021.01) |
| *H01M 50/342* | (2021.01) |
| *H01M 50/505* | (2021.01) |
| *H01M 50/507* | (2021.01) |
| *H01M 50/533* | (2021.01) |
| *H01M 50/536* | (2021.01) |
| *H01M 50/538* | (2021.01) |
| *H01M 50/545* | (2021.01) |
| *H01M 50/55* | (2021.01) |

(52) U.S. Cl.
CPC ..... *H01M 50/1245* (2021.01); *H01M 50/133* (2021.01); *H01M 50/152* (2021.01); *H01M 50/167* (2021.01); *H01M 50/186* (2021.01); *H01M 50/188* (2021.01); *H01M 50/3425* (2021.01); *H01M 50/505* (2021.01); *H01M 50/507* (2021.01); *H01M 50/533* (2021.01); *H01M 50/536* (2021.01); *H01M 50/538* (2021.01); *H01M 50/545* (2021.01); *H01M 50/55* (2021.01); *H01M 2220/20* (2013.01)

(56) References Cited

U.S. PATENT DOCUMENTS

| 5,665,483 | A | 9/1997 | Saito et al. | |
|---|---|---|---|---|
| 5,849,431 | A | 12/1998 | Kita et al. | |
| 6,399,237 | B1 | 6/2002 | Souliac et al. | |
| 6,451,473 | B1 | 9/2002 | Saito et al. | |
| 6,653,017 | B2 | 11/2003 | Satoh et al. | |
| 6,677,082 | B2 | 1/2004 | Thackeray et al. | |
| 6,680,143 | B2 | 1/2004 | Thackeray et al. | |
| 7,273,678 | B2 | 9/2007 | Akita et al. | |
| 8,007,549 | B2 | 8/2011 | Ligeois et al. | |
| 9,496,539 | B2 | 11/2016 | Tyler et al. | |
| 9,496,557 | B2 | 11/2016 | Fuhr et al. | |
| 10,840,555 | B2 | 11/2020 | Iwama et al. | |
| 2001/0004505 | A1 | 6/2001 | Kim et al. | |
| 2001/0051297 | A1 | 12/2001 | Nemoto et al. | |
| 2001/0053477 | A1 | 12/2001 | Kitoh et al. | |
| 2002/0061435 | A1 | 5/2002 | Hisai | |
| 2002/0110729 | A1 | 8/2002 | Hozumi et al. | |
| 2003/0035993 | A1 | 2/2003 | Enomoto et al. | |
| 2003/0049536 | A1 | 3/2003 | Wiepen | |
| 2003/0064285 | A1 | 4/2003 | Kawamura et al. | |
| 2004/0023108 | A1 | 2/2004 | Nakanishi et al. | |
| 2005/0048365 | A1 | 3/2005 | Miyahisa et al. | |
| 2005/0058184 | A1 | 3/2005 | Paul et al. | |
| 2005/0118499 | A1 | 6/2005 | Kim | |
| 2005/0158620 | A1 | 7/2005 | Kim et al. | |
| 2005/0181272 | A1 | 8/2005 | Kim | |
| 2005/0214640 | A1 | 9/2005 | Kim | |
| 2005/0238951 | A1 | 10/2005 | Yoo et al. | |
| 2005/0260487 | A1 | 11/2005 | Kim et al. | |
| 2005/0260489 | A1 | 11/2005 | Kim | |
| 2005/0287428 | A1* | 12/2005 | Cheon | H01M 50/528 |
| | | | | 429/211 |
| 2005/0287432 | A1 | 12/2005 | Cheon et al. | |
| 2006/0024574 | A1 | 2/2006 | Yim et al. | |
| 2006/0063063 | A1 | 3/2006 | Mori et al. | |
| 2006/0204841 | A1 | 9/2006 | Satoh et al. | |
| 2008/0026293 | A1 | 1/2008 | Marple et al. | |
| 2008/0038629 | A1 | 2/2008 | Okabe et al. | |
| 2008/0057394 | A1 | 3/2008 | Rigobert et al. | |
| 2008/0145756 | A1 | 6/2008 | Taniguichi | |
| 2008/0182159 | A1 | 7/2008 | Mitani et al. | |
| 2009/0104520 | A1 | 4/2009 | Marple | |
| 2009/0208830 | A1 | 8/2009 | Okabe et al. | |
| 2009/0208836 | A1* | 8/2009 | Fuhr | H01M 50/107 |
| | | | | 429/178 |
| 2009/0239133 | A1 | 9/2009 | Kosugi | |
| 2009/0280406 | A1 | 11/2009 | Kozuki | |
| 2009/0311583 | A1* | 12/2009 | Wu | H01M 50/171 |
| | | | | 429/185 |
| 2010/0081052 | A1 | 4/2010 | Morishima et al. | |
| 2010/0129716 | A1* | 5/2010 | Kato | H01M 6/08 |
| | | | | 429/229 |
| 2010/0151317 | A1 | 6/2010 | Kim et al. | |
| 2010/0216001 | A1 | 8/2010 | Byun et al. | |
| 2010/0266893 | A1 | 10/2010 | Martin et al. | |
| 2010/0316897 | A1 | 12/2010 | Kozuki et al. | |
| 2010/0330414 | A1 | 12/2010 | Mori | |
| 2011/0027644 | A1 | 2/2011 | Kiyama | |
| 2011/0067227 | A1 | 3/2011 | Sohn | |
| 2011/0171508 | A1 | 7/2011 | Kim | |
| 2011/0256433 | A1* | 10/2011 | Fuhr | H01M 4/70 |
| | | | | 429/211 |

(56) References Cited

U.S. PATENT DOCUMENTS

| | | | |
|---|---|---|---|
| 2012/0058375 A1 | 3/2012 | Tanaka et al. | |
| 2012/0094169 A1 | 4/2012 | Kim et al. | |
| 2012/0231641 A1 | 9/2012 | Sugai et al. | |
| 2012/0297611 A1 | 11/2012 | Ma | |
| 2013/0136977 A1* | 5/2013 | Masuda | H01M 50/567 |
| | | | 429/178 |
| 2013/0183556 A1 | 7/2013 | Kim | |
| 2013/0273401 A1 | 10/2013 | Lee et al. | |
| 2013/0323574 A1 | 12/2013 | Tsunaki et al. | |
| 2014/0079971 A1 | 3/2014 | Huang | |
| 2014/0113185 A1 | 4/2014 | Mori et al. | |
| 2014/0162097 A1 | 6/2014 | Fuhr et al. | |
| 2014/0205868 A1 | 7/2014 | Phillips | |
| 2014/0212695 A1 | 7/2014 | Lane et al. | |
| 2014/0234676 A1* | 8/2014 | Tyler | H01M 50/528 |
| | | | 429/82 |
| 2014/0255748 A1 | 9/2014 | Jan et al. | |
| 2015/0104694 A1 | 4/2015 | Okuda et al. | |
| 2015/0140378 A1 | 5/2015 | Yau | |
| 2015/0155532 A1 | 6/2015 | Harayama et al. | |
| 2016/0043373 A1 | 2/2016 | Arishima et al. | |
| 2016/0099451 A1 | 4/2016 | Murai et al. | |
| 2016/0141589 A1 | 5/2016 | Kang et al. | |
| 2016/0155998 A1 | 6/2016 | Wakimoto et al. | |
| 2016/0181577 A1 | 6/2016 | Kajiwara et al. | |
| 2016/0226056 A1 | 8/2016 | Masson et al. | |
| 2016/0329542 A1 | 11/2016 | Tyler et al. | |
| 2017/0018750 A1 | 1/2017 | Wintner | |
| 2017/0047575 A1 | 2/2017 | Tsuji et al. | |
| 2017/0062789 A1 | 3/2017 | Sim et al. | |
| 2017/0149042 A1 | 5/2017 | Koo et al. | |
| 2017/0200935 A1 | 7/2017 | Hong et al. | |
| 2017/0187068 A1 | 8/2017 | Morisawa et al. | |
| 2017/0256769 A1* | 9/2017 | Wynn | H01M 50/559 |
| 2017/0372848 A1 | 12/2017 | Yoon et al. | |
| 2018/0123143 A1 | 5/2018 | Sato et al. | |
| 2018/0130995 A1 | 5/2018 | Nemoto et al. | |
| 2018/0182560 A1 | 6/2018 | Khakhalev | |
| 2018/0205044 A1 | 7/2018 | Urushihara | |
| 2018/0219208 A1 | 8/2018 | Dewulf et al. | |
| 2018/0247773 A1 | 8/2018 | Lee | |
| 2018/0375162 A1 | 12/2018 | Wakimoto et al. | |
| 2019/0006639 A1 | 1/2019 | Ito | |
| 2019/0148683 A1 | 5/2019 | Kwon et al. | |
| 2019/0221791 A1 | 7/2019 | Wakimoto | |
| 2019/0296283 A1 | 9/2019 | Chen et al. | |
| 2019/0379019 A1 | 12/2019 | Fukuda et al. | |
| 2019/0379028 A1 | 12/2019 | Lim et al. | |
| 2019/0386272 A1 | 12/2019 | Shin et al. | |
| 2020/0044289 A1 | 2/2020 | Pasma et al. | |
| 2020/0083492 A1 | 3/2020 | Koshiol et al. | |
| 2020/0119328 A1 | 4/2020 | Zheng et al. | |
| 2020/0127249 A1 | 4/2020 | Yoon et al. | |
| 2020/0144581 A1 | 5/2020 | Thunot | |
| 2020/0144676 A1 | 5/2020 | Tsuruta et al. | |
| 2020/0203773 A1 | 6/2020 | Fujita et al. | |
| 2020/0212374 A1 | 7/2020 | Gaugler | |
| 2020/0235369 A1 | 7/2020 | Jeong et al. | |
| 2020/0295341 A1 | 9/2020 | Kim et al. | |
| 2020/0388856 A1 | 12/2020 | Hayashi | |
| 2021/0039195 A1 | 2/2021 | Jost et al. | |
| 2021/0075051 A1 | 3/2021 | Zhou | |
| 2021/0167467 A1 | 6/2021 | Yang et al. | |
| 2021/0210792 A1 | 7/2021 | Mukai et al. | |
| 2021/0257652 A1 | 8/2021 | Ko et al. | |
| 2021/0273298 A1 | 9/2021 | Babinot et al. | |
| 2021/0278479 A1 | 9/2021 | Park et al. | |
| 2021/0280835 A1 | 9/2021 | Peng et al. | |
| 2021/0344033 A1 | 11/2021 | Park et al. | |
| 2021/0376333 A1 | 12/2021 | Shiozaki et al. | |
| 2022/0037712 A1 | 2/2022 | Kritzer et al. | |
| 2022/0069335 A1 | 3/2022 | Kim | |
| 2022/0123444 A1 | 4/2022 | Liu et al. | |
| 2023/0123195 A1 | 4/2023 | Fang et al. | |

FOREIGN PATENT DOCUMENTS

| | | |
|---|---|---|
| CN | 1426609 A | 6/2003 |
| CN | 1444303 A | 9/2003 |
| CN | 2681364 Y | 2/2005 |
| CN | 1700495 A | 11/2005 |
| CN | 1832228 A | 9/2006 |
| CN | 1309105 C | 4/2007 |
| CN | 1495943 A | 5/2007 |
| CN | 101010818 A | 8/2007 |
| CN | 100349321 C | 11/2007 |
| CN | 101083317 A | 12/2007 |
| CN | 200990393 Y | 12/2007 |
| CN | 201066701 Y | 5/2008 |
| CN | 201117731 Y | 9/2008 |
| CN | 101286572 A | 10/2008 |
| CN | 100468827 C | 3/2009 |
| CN | 101404338 A | 4/2009 |
| CN | 101501884 A | 6/2009 |
| CN | 201466087 U | 5/2010 |
| CN | 201638890 U | 11/2010 |
| CN | 201725845 U | 1/2011 |
| CN | 201781028 U | 3/2011 |
| CN | 202423400 U | 9/2012 |
| CN | 103280543 A | 9/2013 |
| CN | 103427063 A | 12/2013 |
| CN | 203553261 U | 4/2014 |
| CN | 103797611 A | 5/2014 |
| CN | 2203967145 U | 11/2014 |
| CN | 104396044 A | 3/2015 |
| CN | 204230370 U | 3/2015 |
| CN | 204596910 U | 8/2015 |
| CN | 204885267 U | 12/2015 |
| CN | 105449291 A | 3/2016 |
| CN | 1056555623 A | 6/2016 |
| CN | 106159350 A | 11/2016 |
| CN | 205862351 U | 1/2017 |
| CN | 106463654 A | 2/2017 |
| CN | 107112597 A | 8/2017 |
| CN | 206461019 U | 9/2017 |
| CN | 206461044 U | 9/2017 |
| CN | 206471426 U | 9/2017 |
| CN | 104488113 B | 10/2017 |
| CN | 107275524 A | 10/2017 |
| CN | 206619636 U | 11/2017 |
| CN | 107431215 A | 12/2017 |
| CN | 107482156 A | 12/2017 |
| CN | 107851769 A | 3/2018 |
| CN | 207217654 U | 4/2018 |
| CN | 108063192 A | 5/2018 |
| CN | 207381468 U | 5/2018 |
| CN | 108496269 A | 9/2018 |
| CN | 108695451 A | 10/2018 |
| CN | 208400966 U | 1/2019 |
| CN | 110048065 A | 7/2019 |
| CN | 209328958 U | 8/2019 |
| CN | 110459705 A | 11/2019 |
| CN | 110476273 A | 11/2019 |
| CN | 110581235 A | 12/2019 |
| CN | 209912959 U | 1/2020 |
| CN | 110870099 A | 3/2020 |
| CN | 111033807 A | 4/2020 |
| CN | 111446386 A | 7/2020 |
| CN | 211208547 U | 8/2020 |
| CN | 111668534 A | 9/2020 |
| CN | 111952525 A | 11/2020 |
| CN | 211879534 U | 11/2020 |
| CN | 212182379 U | 12/2020 |
| CN | 112310574 A | 2/2021 |
| CN | 112335075 A | 2/2021 |
| CN | 212907981 U | 4/2021 |
| CN | 112909445 A | 6/2021 |
| CN | 113193165 A | 7/2021 |
| CN | 214378637 U | 10/2021 |
| CN | 215342666 U | 12/2021 |
| CN | 114865242 A | 6/2022 |
| EP | 2677592 A1 | 12/2013 |
| EP | 2 728 647 A1 | 5/2014 |
| EP | 2 876 338 A1 | 5/2015 |

(56) References Cited

FOREIGN PATENT DOCUMENTS

| | | |
|---|---|---|
| EP | 20160777 B1 | 3/2019 |
| EP | 4087034 A1 | 11/2022 |
| EP | 4336649 A1 | 3/2024 |
| GB | 1191105 A | 5/1970 |
| GB | 2564670 A | 1/2019 |
| JP | 62-7157 U | 1/1987 |
| JP | 6-124696 A | 5/1994 |
| JP | 7-201309 A | 8/1995 |
| JP | 8-22818 A | 1/1996 |
| JP | 8-102313 A | 4/1996 |
| JP | 8-180849 A | 7/1996 |
| JP | 10-83833 A | 3/1998 |
| JP | 10-108532 A | 4/1998 |
| JP | 10-214609 A | 8/1998 |
| JP | 10-228908 A | 8/1998 |
| JP | 11-67279 A | 3/1999 |
| JP | 11-176447 A | 7/1999 |
| JP | 11-297301 A | 10/1999 |
| JP | 2955135 B2 | 10/1999 |
| JP | 11-329398 A | 11/1999 |
| JP | 2000-243433 A | 9/2000 |
| JP | 2001-28274 A | 1/2001 |
| JP | 2001-43844 A | 2/2001 |
| JP | 2001-52756 A | 2/2001 |
| JP | 2001-148238 A | 5/2001 |
| JP | 2001-256954 A | 9/2001 |
| JP | 3252846 B2 | 2/2002 |
| JP | 2002-157991 A | 5/2002 |
| JP | 2002-289170 A | 10/2002 |
| JP | 2003-115285 A | 4/2003 |
| JP | 2004-14173 A | 1/2004 |
| JP | 2004-95487 A | 3/2004 |
| JP | 2004-253253 A | 9/2004 |
| JP | 3588264 B2 | 11/2004 |
| JP | 3632586 B2 | 3/2005 |
| JP | 2005-100927 A | 4/2005 |
| JP | 2005-129433 A | 5/2005 |
| JP | 2005-166664 A | 6/2005 |
| JP | 2005-276840 A | 10/2005 |
| JP | 3718872 B2 | 11/2005 |
| JP | 3751782 B2 | 3/2006 |
| JP | 2006-120606 A | 5/2006 |
| JP | 2006-278016 A | 10/2006 |
| JP | 3906519 B2 | 1/2007 |
| JP | 2007-234486 A1 | 9/2007 |
| JP | 2008-66302 A | 3/2008 |
| JP | 2008-123848 A | 5/2008 |
| JP | 2008-243811 A | 10/2008 |
| JP | 2009-104925 A | 5/2009 |
| JP | 2009-110885 A | 5/2009 |
| JP | 2009-176449 A | 8/2009 |
| JP | 4346637 B2 | 10/2009 |
| JP | 2009-259452 A | 11/2009 |
| JP | 2009-289672 A | 12/2009 |
| JP | 4401634 B2 | 1/2010 |
| JP | 2010-33940 A | 2/2010 |
| JP | 4430587 B2 | 3/2010 |
| JP | 2010-529624 A | 6/2010 |
| JP | 2011-113845 A | 6/2011 |
| JP | 2011-159582 A | 8/2011 |
| JP | 2012-74359 A | 4/2012 |
| JP | 2012-510143 A | 4/2012 |
| JP | 2012-160658 A | 8/2012 |
| JP | 5019557 B2 | 9/2012 |
| JP | 5030379 B2 | 9/2012 |
| JP | 2012-190739 A | 10/2012 |
| JP | 5051410 B2 | 10/2012 |
| JP | 2013-246966 A | 12/2013 |
| JP | 5651536 B2 | 1/2015 |
| JP | 2015-106613 A | 6/2015 |
| JP | 2015-222685 A | 12/2015 |
| JP | 2016-100323 A | 5/2016 |
| JP | 5935878 B2 | 6/2016 |
| JP | 2016-225014 A | 12/2016 |
| JP | 2017-143004 A1 | 8/2017 |
| JP | 2018-507544 A | 3/2018 |
| JP | 5877724 B2 | 3/2018 |
| JP | 2018-092776 A | 6/2018 |
| JP | 2018-163765 A | 10/2018 |
| JP | 6406836 B2 | 10/2018 |
| JP | 2019-46639 A | 3/2019 |
| JP | WO2019/194182 A1 | 10/2019 |
| JP | 2020-71898 A | 5/2020 |
| JP | 6735445 B2 | 8/2020 |
| JP | 2020-527841 A | 9/2020 |
| JP | 2020-202038 A | 12/2020 |
| KR | 2001-0017098 A | 3/2001 |
| KR | 10-2001-0038811 A | 5/2001 |
| KR | 2001-0056363 A | 7/2001 |
| KR | 10-0490526 B1 | 8/2005 |
| KR | 10-2005-0110460 A | 11/2005 |
| KR | 10-2005-0121904 A | 12/2005 |
| KR | 10-2005-0121914 A | 12/2005 |
| KR | 10-0551885 B1 | 2/2006 |
| KR | 10-2006-0022128 A | 3/2006 |
| KR | 10-0612236 B1 | 8/2006 |
| KR | 10-2007-0033762 A | 3/2007 |
| KR | 10-2008-0047165 A | 5/2008 |
| KR | 10-2010-0068080 A | 6/2010 |
| KR | 10-2010-0089092 A | 8/2010 |
| KR | 10-2010-0096100 A | 9/2010 |
| KR | 10-2013-0084086 A | 7/2013 |
| KR | 10-1320581 B1 | 10/2013 |
| KR | 10-1446151 B1 | 10/2014 |
| KR | 10-2016-0043725 A | 4/2016 |
| KR | 10-2016-0092748 A | 8/2016 |
| KR | 10-1679413 B1 | 11/2016 |
| KR | 10-2017-0025074 A | 3/2017 |
| KR | 10-2017-0033543 A | 3/2017 |
| KR | 10-1743136 B1 | 6/2017 |
| KR | 10-1807353 B1 | 12/2017 |
| KR | 10-2018-0026910 A | 3/2018 |
| KR | 10-1839158 B1 | 3/2018 |
| KR | 10-2018-0106367 A | 10/2018 |
| KR | 10-2018-0116004 A | 10/2018 |
| KR | 10-2018-0116156 A | 10/2018 |
| KR | 10-2018-0129115 A | 12/2018 |
| KR | 10-2019-0030016 A | 3/2019 |
| KR | 10-2019-0040699 A | 4/2019 |
| KR | 10-2019-0078094 A | 7/2019 |
| KR | 10-2042999 B1 | 11/2019 |
| KR | 10-2020-0007561 A | 1/2020 |
| KR | 10-2020-0020173 A | 2/2020 |
| KR | 10-2020-0037599 A | 4/2020 |
| KR | 10-2020-0039214 A | 4/2020 |
| KR | 10-2020-0041625 A | 4/2020 |
| KR | 10-2021-0006203 A | 1/2021 |
| TW | I679311 B | 12/2019 |
| WO | WO 01/59856 A1 | 8/2001 |
| WO | WO 2006/035980 A1 | 4/2006 |
| WO | WO 2006/085437 A1 | 8/2006 |
| WO | WO 2010/146154 A2 | 12/2010 |
| WO | WO 2012/090599 A1 | 7/2012 |
| WO | WO 2013/024774 A1 | 2/2013 |
| WO | WO 2015/025388 A1 | 2/2015 |
| WO | WO 2018/117457 A1 | 6/2018 |
| WO | WO 2020/060069 A1 | 3/2020 |
| WO | WO 2020/149350 A1 | 7/2020 |
| WO | WO 2020/159071 A1 | 8/2020 |
| WO | WO 2020/0171426 A1 | 8/2020 |
| WO | WO 2021/020119 A1 | 2/2021 |
| WO | WO 2021/020237 A1 | 2/2021 |

OTHER PUBLICATIONS

European Search Report mailed in EP 22 15 2207 dated Jul. 22, 2022 (9 pages).

European Search Report mailed in EP 22152223 dated Jul. 29, 2022 (10 pages).

European Search Report mailed in EP 22152237 dated Aug. 2, 2022 (11 pages).

European Search Report mailed in EP 22152245 dated Jul. 28, 2022 (11 pages).

(56) References Cited

OTHER PUBLICATIONS

European Search Report mailed in EP 22152250 dated Aug. 5, 2022 (12 pages).
U.S. Office Action dated Nov. 24, 2023 for U.S. Appl. No. 17/592,594.
U.S. Office Action dated Nov. 28, 2023 for U.S. Appl. No. 18/132,140.
U.S. Advisory Action for U.S. Appl. No. 18/086,485, dated Nov. 3, 2023.
U.S. Office Action for U.S. Appl. No. 18/132,166, dated Oct. 2, 2023.
U.S. Office Action for U.S. Appl. No. 18/086,410, dated Jul. 24, 2023.
U.S. Office Action for U.S. Appl. No. 18/086,485, dated Aug. 15, 2023.
U.S. Office Action for U.S. Appl. No. 17/592,597, dated Jun. 21, 2023.
U.S. Office Action for U.S. Appl. No. 18/132,085, dated Jun. 14, 2023.
"Laser Welding vs. Arc (Tig) Welding of Medical Instruments," ACCUMET, Oct. 22, 2014, URL: <https://www.accumet.com/updates/consider_laser_welding_instead/>.
Ma et al., "Electro-Thermal Modeling of a Lithium-ion Battery System," SAE International Journal of Engines, vol. 3, No. 2, Oct. 25, 2010, p. 306 (abstract only).
U.S. Office Action for U.S. Appl. No. 17/579,380, dated Jul. 20, 2023.
ASM Aerospace Specification Metals Inc., "Aluminum 5052-H19 Foil", 2001, https://asm.matweb.com/search/SpecificMaterial.asp?bassnum=ma5052h 19, 2 pages.
Iowa State University, Center for Nondestructive Evaluation, NDE-Ed.org, Physics of Nondestructive Evaluation>Electricity, 2021, https://www.nde-ed.org/Physics/Electricity/voltage.xhtml, 14 pages.
Third Party Observation dated Feb. 13, 2024 for European Application No. 22742834.9.
U.S. Notice of Allowance for U.S. Appl. No. 17/579,380, dated Feb. 14, 2024.
U.S. Office Action for U.S. Appl. No. 17/665,896, dated Feb. 12, 2024.
Youtube, "Tesla Battery Day", Sep. 22, 2020, https://www.youtube.com/watch?v=I6T9xleZTds, 2 pages.
Automotive & Accessories Magazine, "The core topic of Tesla's "Battery Day": reducing battery manufacturing costs," Sep. 23, 2020, 6 pages.
Third Party Observation dated Feb. 26, 2024 for European Application No. 22152256.8.
Third Party Observation dated Feb. 26, 2024 for European Application No. 22152262.6.
European Communication pursuant to Rule 114(2) EPC for European Application No. 22742840.6, dated Feb. 5, 2024.
Full English Translation of Japanese Patent Application No. 2002-289170-A dated Oct. 4, 2002.
Third Party Observation dated Apr. 9, 2024 for European Application No. 22742833.1.
Third Party Observation dated Apr. 17, 2024 for European Application No. 22742840.6.
Third Party Observation dated Apr. 18, 2024 for European Application No. 23214922.9.
Third Party Observation dated Apr. 19, 2024 for European Application No. 22742838.0.
Third Party Observation dated Apr. 25, 2024 for European Application No. 22742834.9.
Third Party Observation dated Apr. 4, 2024 for U.S. Appl. No. 17/592,576.
Third Party Observation dated Mar. 22, 2024 for U.S. Appl. No. 17/592,672.
European Communication pursuant to Rule 114(2) EPC dated Apr. 16, 2024 for European Application No. 22756576.9
European Communication pursuant to Rule 114(2) EPC dated Apr. 16, 2024 for European Application No. 22895785.8.
European Communication pursuant to Rule 114(2) EPC dated Apr. 30, 2024 for European Application No. 22856151.0.
European Communication pursuant to Rule 114(2) EPC dated Jun. 6, 2024 for European Application No. 22756569.4.
European Communication pursuant to Rule 114(2) EPC dated May 27, 2024 for European Application No. 22756569.4.
European Communication pursuant to Rule 114(2) EPC dated May 3, 2024 for European Application No. 22756574.4.
European Communication pursuant to Rule 114(2) EPC dated May 3, 2024 for European Application No. 22881171.7.
European Communication pursuant to Rule 114(2) EPC dated May 8, 2024 for European Application No. 22883724.1.
Partial Supplementary European Search Report for dated Jul. 15, 2024 for European Application No. 227428.6.
Third Party Observation dated Jul. 22, 2024 for European Application No. 22861172.5.
U.S. Office Action for U.S. Appl. No. 18/086,402 dated Jun. 12, 2024.

* cited by examiner

-- CONVENTIONAL ART --

-- CONVENTIONAL ART --

BATTERY, AND BATTERY PACK AND VEHICLE INCLUDING THE SAME

CROSS-REFERENCE TO RELATED APPLICATIONS

This application is a Continuation of U.S. patent application Ser. No. 17/579,380, filed on Jan. 19, 2022, which claims priority under 35 U.S.C. § 119(a) to Patent Application No. 10-2021-0007278, filed in the Republic of Korea on Jan. 19, 2021, Patent Application No. 10-2021-0022881, filed in the Republic of Korea on Feb. 19, 2021, Patent Application No. 10-2021-0022891, filed in the Republic of Korea on Feb. 19, 2021, Patent Application No. 10-2021-0022894, filed in the Republic of Korea on Feb. 19, 2021, Patent Application No. 10-2021-0022897, filed in the Republic of Korea on Feb. 19, 2021, Patent Application No. 10-2021-0024424, filed in the Republic of Korea on Feb. 23, 2021, Patent Application No. 10-2021-0030291, filed in the Republic of Korea on Mar. 8, 2021, Patent Application No. 10-2021-0030300, filed in the Republic of Korea on Mar. 8, 2021, Patent Application No. 10-2021-0046798, filed in the Republic of Korea on Apr. 9, 2021, Patent Application No. 10-2021-0058183, filed in the Republic of Korea on May 4, 2021, Patent Application No. 10-2021-0077046, filed in the Republic of Korea on Jun. 14, 2021, Patent Application No. 10-2021-0084326, filed in the Republic of Korea on Jun. 28, 2021, Patent Application No. 10-2021-0131205, filed in the Republic of Korea on Oct. 1, 2021, Patent Application No. 10-2021-0131207, filed in the Republic of Korea on Oct. 1, 2021, Patent Application No. 10-2021-0131208, filed in the Republic of Korea on Oct. 1, 2021, Patent Application No. 10-2021-0131215, filed in the Republic of Korea on Oct. 1, 2021, Patent Application No. 10-2021-0131225, filed in the Republic of Korea on Oct. 1, 2021, Patent Application No. 10-2021-0137001, filed in the Republic of Korea on Oct. 14, 2021, Patent Application No. 10-2021-0137856, filed in the Republic of Korea on Oct. 15, 2021, Patent Application No. 10-2021-0142196, filed in the Republic of Korea on Oct. 22, 2021, Patent Application No. 10-2021-0153472, filed in the Republic of Korea on Nov. 9, 2021, Patent Application No. 10-2021-0160823, filed in the Republic of Korea on Nov. 19, 2021, Patent Application No. 10-2021-0163809, filed in the Republic of Korea on Nov. 24, 2021, Patent Application No. 10-2021-0165866, filed in the Republic of Korea on Nov. 26, 2021, Patent Application No. 10-2021-0172446, filed in the Republic of Korea on Dec. 3, 2021, Patent Application No. 10-2021-0177091, filed in the Republic of Korea on Dec. 10, 2021, Patent Application No. 10-2021-0194572, filed in the Republic of Korea on Dec. 31, 2021, Patent Application No. 10-2021-0194593, filed in the Republic of Korea on Dec. 31, 2021, Patent Application No. 10-2021-0194610, filed in the Republic of Korea on Dec. 31, 2021, Patent Application No. 10-2021-0194611, filed in the Republic of Korea on Dec. 31, 2021, Patent Application No. 10-2021-0194612, filed in the Republic of Korea on Dec. 31, 2021, and Patent Application No. 10-2022-0001802, filed in the Republic of Korea on Jan. 5, 2022, where all of these applications are hereby expressly incorporated by reference in their entireties into the present application.

BACKGROUND

Field

The present disclosure relates to a battery, and a battery pack and a vehicle including the battery. More particularly, the present disclosure relates to a cylindrical battery in which both a positive electrode terminal and a negative electrode terminal are adjacently disposed at one side of the cylindrical battery, without greatly deforming the structure of a conventional cylindrical battery, and a battery pack and a vehicle including the cylindrical battery.

Discussion of the Related Art

Secondary batteries that are easily applicable to various product groups and have electrical characteristics such as high energy density are universally applied not only to portable devices but also to electric vehicles (EVs) or hybrid electric vehicles (HEVs) driven by an electric drive source.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. A unit secondary battery has an operating voltage of about 2.5V to 4.5V. Therefore, when a higher output voltage is required, a battery pack is configured by connecting a plurality of batteries in series. In addition, a plurality of batteries may be connected in parallel to form a battery pack according to the charge/discharge capacity required for the battery pack. Accordingly, the number of batteries included in the battery pack and the form of electrical connection may be variously set according to the required output voltage and/or charge/discharge capacity.

Meanwhile, as a kind of secondary battery, there are known cylindrical, rectangular, and pouch-type batteries. In the case of a cylindrical battery, a separator serving as an insulator is interposed between a positive electrode and a negative electrode, and they are wound to form an electrode assembly in the form of a jelly roll, which is inserted into a battery can together with an electrolyte to configure a battery. In addition, a strip-shaped electrode tab may be connected to an uncoated region of each of the positive electrode and the negative electrode, and the electrode tab electrically connects the electrode assembly and an electrode terminal exposed to the outside. For reference, the positive electrode terminal is a cap of a sealing body that seals the opening of the battery can, and the negative electrode terminal is the battery can.

However, according to the conventional cylindrical battery having such a structure, since current is concentrated in the strip-shaped electrode tab coupled to the uncoated region of the positive electrode and/or the uncoated region of the negative electrode, the current collection efficiency is not good due to large resistance and large heat generation.

For small cylindrical batteries with a form factor of 18650 or 21700, resistance and heat are not a major issue. However, when the form factor is increased to apply the cylindrical battery to an electric vehicle, the cylindrical battery may ignite while a lot of heat is generated around the electrode tab during the rapid charging process.

In order to solve this problem, there is provided a cylindrical battery (so-called tab-less cylindrical battery) in which the uncoated region of the positive electrode and the uncoated region of the negative electrode are designed to be positioned at the top and bottom of the rolled electrode assembly, respectively, and the current collector is welded to the uncoated region to improve the current collecting efficiency.

FIGS. 1 to 3 are diagrams showing a process of manufacturing a tab-less cylindrical battery. FIG. 1 shows the structure of an electrode, FIG. 2 shows a process of winding the electrode, and FIG. 3 shows a process of welding a current collector to a bent surface of an uncoated region. FIG. 4 is a sectional view showing a tab-less cylindrical battery, taken along the longitudinal direction Z.

Referring to FIGS. 1 to 4, a positive electrode plate 210 and a negative electrode plate 211 have a structure in which a sheet-shaped current collector 220 is coated with an active material 221, and include an uncoated region 222 at one long side along the winding direction X.

An electrode assembly A is manufactured by sequentially stacking the positive electrode 210 and the negative electrode 211 together with two sheets of separators 212 as shown in FIG. 2 and then winding them in one direction X. At this time, the uncoated region of the positive electrode 210 and the uncoated region of the negative electrode 211 are arranged in opposite directions.

After the winding process, the uncoated region 210a of the positive electrode 210 and the uncoated region 211a of the negative electrode 211 are bent toward the core. After that, current collectors 230, 231 are welded and coupled to the uncoated regions 210a, 211a, respectively.

An electrode tab is not separately coupled to the positive electrode uncoated region 210a and the negative electrode uncoated region 211a, the current collectors 230, 231 are connected to external electrode terminals, and a current path is formed with a large cross-sectional area along the winding axis direction of electrode assembly A (see arrow), which has an advantage of lowering the resistance of the battery. This is because resistance is inversely proportional to the cross-sectional area of the path through which the current flows.

However, when the form factor of the cylindrical battery increases and the magnitude of the charging current during rapid charging increases, the heat problem occurs again in the tab-less cylindrical battery.

Specifically, the conventional tab-less cylindrical battery 240 includes a battery can 241 and a sealing body 242 as shown in FIG. 4. The sealing body 242 includes a cap 242a having a plate shape, a sealing gasket 242b and a connection plate 242c. The sealing gasket 242b surrounds the edge of the cap 242a and is fixed by a crimping portion 243. In addition, the electrode assembly A is fixed in the battery can 241 by a beading portion 244 to prevent vertical movement.

Typically, the positive electrode terminal is the cap 242a of the sealing body 242, and the negative electrode terminal is the battery can 241. Therefore, the current collector 230 coupled to the uncoated region 210a of the positive electrode 210 is electrically connected to the connection plate 242c attached to the cap 242a through lead 245 in a strip form. In addition, the current collector 231 coupled to the uncoated region 211a of the negative electrode 211 is electrically connected to the bottom of the battery can 241. The insulator 246 covers the current collector 230 to prevent the battery can 241 and the uncoated region 210a of the positive electrode 210 having different polarities from contacting each other and causing a short circuit.

When the current collector 230 is connected to the connection plate 242c, the lead 245 of a strip form is used. The lead 245 is separately attached to the current collector 230 or is manufactured integrally with the current collector 230. However, since the lead 245 is in the form of a thin strip, its sectional area is small, and thus, when a rapid charging current flows, a lot of heat is generated. In addition, excessive heat generated from the lead 245 is transferred toward the electrode assembly A to shrink the separator 212, which may cause an internal short circuit that is a main cause of thermal runaway.

The lead 245 also occupies a significant installation space inside the battery can 241. Therefore, the cylindrical battery 240 including the lead 245 has low space efficiency, so there is a limit in increasing the energy density.

Moreover, in order to connect the conventional tab-less cylindrical batteries 240 in series and/or in parallel, it is necessary to connect a bus bar component to the cap 242a of the battery can 241 and the bottom surface of the sealing body 242, so space efficiency is reduced. A battery pack mounted to an electric vehicle includes hundreds of cylindrical batteries 240. Accordingly, the inefficiency of the electrical wiring causes considerable inconvenience in the electric vehicle assembling process and the maintenance of the battery pack.

Meanwhile, as the cylindrical battery is recently applied to an electric vehicle, the form factor of the cylindrical battery is increasing. That is, the diameter and height of the cylindrical battery are increasing compared to the conventional cylindrical batteries having a form factor of 18650, 21700, or the like. The increase in the form factor leads to an increased energy density, enhanced safety against thermal runaway, and improved cooling efficiency.

The energy density of the cylindrical battery may be further increased when the unnecessary space inside the battery can is minimized along with the increase of the form factor. Therefore, components used for electrical insulation between the electrode assembly and the battery can or components used for current collection from the positive electrode and the negative electrode need to be optimally designed to increase the capacity of the battery and lower the overall resistance of the battery.

SUMMARY OF THE DISCLOSURE

The present disclosure is designed in consideration of the above problems, and therefore the present disclosure is directed to providing a cylindrical battery having a structure in which a positive electrode terminal and a negative electrode terminal are applied in the same direction.

The present disclosure is directed to securing a sufficient area for welding an electric connection component such as a bus bar with an electrode terminal of a cylindrical battery while manufacturing a battery pack by utilizing a wide area of a closed portion of a battery can as an electrode terminal, in a case where a plurality of cylindrical batteries are to be electrically connected in one direction.

In another aspect, the present disclosure is directed to optimally designing so that the area occupied by the upper surface of the terminal (first electrode terminal) and the area occupied by the outer surface (second electrode terminal) of the closed portion may be sufficient for coupling with a bus bar.

In still another aspect, the present disclosure is directed to minimizing the resistance of the cylindrical battery by enlarging a contact area of the electrode assembly and the current collector (first current collector) and/or a contact area of the terminal and the current collector (first current collector) through improvement of the structure of the uncoated region of the electrode assembly.

In still another aspect, the present disclosure is directed to improving the electrical connection structure between the current collector (second current collector) and the battery can to multiplex a current path and directed to maximizing the contact area to minimize the resistance of the cylindrical battery.

In still another aspect, the present disclosure is directed to reducing the current path by improving the electrical connection structure of the current collector (second current collector) and the battery can, thereby minimizing the resistance of the cylindrical battery.

In still another aspect, the present disclosure is directed to minimizing the dead space by improving the structure of the uncoated region of the electrode assembly and/or optimally designing the height of the terminal and/or optimally designing the thickness of the battery can, thereby maximizing the energy density.

However, the technical object to be solved by the present disclosure is not limited to the above, and other objects not mentioned herein will be clearly understood by those skilled in the art from the following disclosure.

In one aspect of the present disclosure, there is provided a battery, comprising: a rolled electrode assembly having a first electrode and a second electrode and a separator interposed therebetween, each of the first electrode and the second electrode having a first uncoated region and a second uncoated region not coated with an active material and exposed out of the separator at long side ends thereof; a battery can accommodating the electrode assembly through an opening at a lower end thereof and electrically connected to the second uncoated region; a terminal electrically connected to the first uncoated region and exposed out of the battery can through a closed portion of the battery can located opposite to the opening; and a cap covering and sealing the opening of the battery can.

The cap may be configured to have no polarity.

The terminal may be configured to penetrate a center of the closed portion.

An insulating gasket interposed between the battery can and the terminal may be provided at the closed portion side of the battery can, and a sealing gasket interposed between the battery can and the cap such that the cap seals the opening may be provided at the opening side of the battery can.

A surface of the terminal exposed out of the battery can may serve as a first electrode terminal to which a first bus bar terminal is coupled, and a region of an outer surface of the closed portion of the battery can, which is occupied by an exposed surface parallel to an upper surface of the first electrode terminal, may serve as a second electrode terminal to which a second bus bar terminal is coupled.

The first bus bar terminal may overlap with the first electrode terminal on a plane to form a first overlapping region, and the second bus bar terminal may overlap with the second electrode terminal on a plane to form a second overlapping region.

A diameter of the first electrode terminal and a width of the second electrode terminal may satisfy the following formulas:

$$W_1 \leq E_1 \leq D - 2R_d - 2G - 2W_2$$

$$E_2 = 0.5*(D - 2R_d - 2G - E_1)$$

($E_1$: diameter of the terminal exposed out of the battery can (diameter of the first electrode terminal), $E_2$: width of the exposed surface of the outer surface of the closed portion of the battery can parallel to the upper surface of the terminal (width of the second electrode terminal), D: outer diameter of the battery can, $R_d$: width of a round region at an edge of the battery can measured on a plane, G: exposure width of an insulating gasket exposed out of an edge of the first electrode terminal on a plane, $W_1$: maximum value among distances between arbitrarily selected two points at an edge of the first overlapping region; $W_2$: maximum value among distances between two points at which a plurality of straight lines passing through a center of the first electrode terminal meet an edge of the second overlapping region).

An area occupied by the first electrode terminal may be 2% to 30% compared to an area occupied by the second electrode terminal.

A form factor ratio obtained by dividing a diameter of the battery by a height thereof may be greater than 0.4.

At least a part of the first uncoated region may include a plurality of segments divided along a winding direction of the electrode assembly, and the plurality of segments may be bent along a radial direction of the electrode assembly.

The plurality of bent segments may be overlapped in multiple layers along the radial direction.

The electrode assembly may include a welding target region in which the number of overlapping layers of the segments of the first uncoated region is kept constant along the radial direction of the electrode assembly.

At least a part of the second uncoated region may include a plurality of segments divided along a winding direction of the electrode assembly, and the plurality of segments may be bent along a radial direction of the electrode assembly.

The plurality of bent segments may be overlapped in multiple layers along the radial direction.

The electrode assembly may include a welding target region in which the number of overlapping layers of the segments of the second uncoated region is kept constant along the radial direction of the electrode assembly.

The battery can may be made of steel, stainless steel, or nickel-plated steel.

The battery can may be configured to have different thicknesses depending on locations.

The battery can may be configured such that a thickness of a sidewall thereof is smaller than a thickness of the closed portion.

The closed portion may have a thickness of 0.4 mm to 1.2 mm.

A sidewall of the battery can may have a thickness of 0.3 mm to 0.8 mm.

The battery can may have a nickel-plated layer formed on a surface thereof.

The nickel-plated layer may have a thickness of 1.5 μm to 6.0 μm.

The battery can may include a round region for connecting a sidewall thereof and the closed portion.

The battery can may include a beading portion formed by press-fitting a periphery of an outer circumferential surface of the battery can at the opening side.

The beading portion may include an upper beading portion and a lower beading portion located above and below based on an innermost portion located at an innermost side along the pressing-fitting direction.

The upper beading portion and the lower beading portion may have asymmetric shapes.

The lower beading portion may include a flat portion parallel to the closed portion.

The upper beading portion may be at least partially inclined upward toward the innermost portion.

The upper beading portion may be configured to press and fix a lower portion of the electrode assembly.

The battery can may include a crimping portion formed below the beading portion and having a shape extending and bent from the beading portion to surround an outer circumferential surface of the cap and a part of a lower surface of the cap.

The battery may include a sealing gasket interposed between the battery can and the cap at the crimping portion.

The cap may include a venting portion configured to be ruptured when an internal pressure of the battery can increases over a predetermined level to discharge gas generated inside the battery can.

The venting portion may be a region of the cap having a smaller thickness than surrounding regions.

The venting portion may be formed to partially reduce a thickness of the battery can by forming a notch at one surface or both surfaces of the cap.

The venting portion may be formed along a periphery of an edge portion of a central region protruding downward, among the entire region of the cap.

The venting portion may be formed continuously or discontinuously.

The venting portion may be formed in a central region protruding downward, among the entire region of the cap, and the central region protruding downward may be located higher than a lower end of the battery can.

The terminal may include a terminal exposing portion exposed out of the battery can; and a terminal insert portion provided through the closed portion of the battery can and located inside the battery can.

The terminal insert portion may include an electric connection portion electrically connected to the first uncoated region; and a flange portion formed at a periphery of the electric connection portion and having a shape bent toward an inner surface of the closed portion of the battery can so as to be riveted on the inner surface.

The terminal may be made of aluminum.

A step may be formed between an upper surface of the terminal exposing portion and an upper surface of the battery can.

The terminal exposing portion may protrude out of the battery can through the upper surface of the battery can.

The height of the step may be 0.8 mm or more.

An insulating gasket may be interposed between the terminal and the battery can, and the insulating gasket may include a gasket exposing portion interposed between the terminal exposing portion and the battery can; and a gasket insert portion interposed between the terminal insert portion and the battery can.

The gasket exposing portion may have a thickness of 0.3 mm to 1 mm.

The gasket exposing portion may extend longer than the terminal exposing portion to be exposed out of the terminal exposing portion.

The gasket insert portion may be deformed together when the flange portion of the terminal insert portion is riveted, so as be in close contact with the inner surface of the closed portion of the battery can.

A region of the gasket insert portion exposed out of the terminal exposing portion may have a width in the range of 0.1 mm to 3.0 mm.

The battery may include a first current collector coupled to an upper portion of the electrode assembly and coupled to the terminal to electrically connect the first uncoated region of the electrode assembly and the terminal.

A flat portion parallel to an inner surface of the closed portion of the battery can may be formed in at least a part of a bottom surface of the terminal, and the first current collector may be coupled to the flat portion of the terminal.

The first current collector may be coupled onto a coupling surface formed by bending an end of the first uncoated region.

The battery may include a first current collector coupled to an upper portion of the electrode assembly and coupled to the terminal to electrically connect the first uncoated region of the electrode assembly and the terminal, and the first current collector may be coupled to the first uncoated region inside the welding target region.

The first current collector may include an edge portion disposed on the electrode assembly; a first uncoated region coupling portion configured to extend inward from the edge portion and coupled to the first uncoated region; and a terminal coupling portion configured to extend inward from the edge portion and coupled to the terminal.

The first uncoated region coupling portion and the terminal coupling portion may be not directly connected but indirectly connected by the edge portion.

The terminal coupling portion may be provided at a location corresponding to a hole formed at a winding center of the electrode assembly.

The terminal coupling portion may be configured to cover the hole formed at the winding center so that the hole formed at the winding center of the electrode assembly is not exposed out of the terminal coupling portion.

The terminal coupling portion may have a diameter substantially equal to or greater than a diameter of a flat portion formed at a bottom surface of the terminal.

The first current collector may further include a bridge portion configured to extend inward from the edge portion and connected to the terminal coupling portion.

The bridge portion may include a notching portion formed to partially reduce a sectional area of the bridge portion.

At least a part of the first uncoated region may include a plurality of segments divided along a winding direction of the electrode assembly, and the plurality of segments may be bent along a radial direction of the electrode assembly to be overlapped in multiple layers, and the notching portion may be provided in a region corresponding to a welding target region in which the number of overlapping layers of the segments of the first uncoated region is kept constant along the radial direction of the electrode assembly.

The notching portion may be provided at a location corresponding to a center in the radial direction of the electrode assembly.

A welding pattern drawn by welding beads formed on one surface of the terminal coupling portion of the first current collector may be drawn to surround a center of a bottom surface of the terminal.

The welding pattern may be formed continuously or discontinuously.

A welding portion formed between the terminal coupling portion of the first current collector and a bottom surface of the terminal may have a tensile force of 2 kgf or more.

A welding pattern drawn by welding beads formed on one surface of the terminal coupling portion of the first current collector may have a converted diameter of 2 mm or more.

A flat portion formed at the bottom surface of the terminal may have a diameter of 3 mm to 14 mm.

A ratio of an area of a welding pattern drawn by welding beads formed on one surface of the terminal coupling portion of the first current collector to an area of a flat portion formed at the bottom surface of the terminal may be 2.04% to 44.4%.

The battery may include a second current collector coupled to a lower portion of the electrode assembly and coupled to the battery can to electrically connect the second uncoated region of the electrode assembly and the battery can.

The second current collector may be coupled onto a coupling surface formed by bending an end of the first uncoated region.

The battery may include a second current collector coupled to a lower portion of the electrode assembly and coupled to the battery can to electrically connect the second uncoated region of the electrode assembly and the battery can, and the second current collector may be coupled to the second uncoated region inside the welding target region.

The second current collector may include a support portion disposed below the electrode assembly; a second uncoated region coupling portion configured to extend from the support portion and coupled to the second uncoated region; and a can coupling portion configured to extend from the support portion and coupled to the battery can.

The second uncoated region coupling portion and the can coupling portion may be indirectly connected through the support portion.

The second current collector may include a second uncoated region coupling portion coupled to the second uncoated region; and a can coupling portion coupled to the battery can.

The can coupling portion may be provided in plural, and the plurality of can coupling portions may be configured to radially extend toward a sidewall of the battery can.

The second current collector and the battery can may be electrically connected at a plurality of points.

The battery can may include a beading portion formed by press-fitting a periphery of an outer circumferential surface of the battery can at the opening side, and the can coupling portion may be electrically coupled to a lower surface of the beading portion.

The battery can may include a crimping portion formed below the beading portion and having a shape extending and bent from the beading portion to surround an outer circumferential surface of the cap and a part of a lower surface of the cap, the battery may include a sealing gasket interposed between the battery can and the cap at the crimping portion, and the can coupling portion may be interposed between the sealing gasket and the lower surface of the beading portion.

A flat portion parallel to the closed portion may be formed on the lower surface of the beading portion, and the can coupling portion may be electrically coupled onto the flat portion.

The can coupling portion may include a contact portion coupled onto an inner surface of the battery can; and a connection portion configured to connect a center of the second current collector and the contact portion to each other.

The battery can may include a beading portion formed by press-fitting a periphery of an outer circumferential surface of the battery can at the opening side, and the contact portion may have a shape extending by a predetermined length along a circumferential direction of the battery can on the beading portion.

The second current collector may have a current collector hole formed at a location corresponding to a hole formed at a winding center of the electrode assembly.

The current collector hole may have a diameter substantially equal to or greater than the hole formed at the winding center of the electrode assembly.

The battery can may include a beading portion formed by press-fitting a periphery of an outer circumferential surface of the battery can at the opening side, and a maximum distance from a center of the second current collector to an end of the second uncoated region coupling portion along the radial direction of the electrode assembly may be substantially equal to or smaller than an inner diameter of the battery can in a region where the beading portion is formed.

An insulator may be interposed between the first current collector and an inner surface of the closed portion of the battery can.

The insulator may have a thickness corresponding to the distance between the inner surface of the closed portion of the battery can and the first current collector.

The terminal may be coupled to the first current collector through a hole formed in the insulator.

The insulator may have a thickness substantially equal to or greater than the distance between the inner surface of the closed portion of the battery can and a bottom surface of the terminal.

The insulator may be interposed between the first uncoated region and a sidewall of the battery can.

An upper surface of the insulator may be in contact with the inner surface of the closed portion of the battery can, and a lower surface of the insulator may be in contact with an upper surface of the first current collector.

Resistance measured between a positive electrode and a negative electrode of the battery may be 4 mohm or below.

In another aspect of the present disclosure, there is also provided a battery pack, comprising a plurality of batteries according to the present disclosure.

In the battery pack of the present disclosure, the plurality of batteries may be arranged in a predetermined number of columns, and the terminal of each cylindrical battery and an outer surface of the closed portion of the battery can may be disposed to face upward.

The battery pack may comprise a plurality of bus bars configured to connect the plurality of batteries in series and in parallel, the plurality of bus bars may be disposed on top of the plurality of batteries, and each of the bus bars may include a body portion configured to extend between terminals of neighboring batteries; a plurality of first bus bar terminals configured to extend in one side direction of the body portion and electrically coupled to a terminal of a battery located in the one side direction; and a plurality of second bus bar terminals configured to extend in the other side direction of the body portion and electrically coupled to an outer surface of the closed portion of the battery can of a battery located in the other side direction.

In another aspect of the present disclosure, there is also provided a vehicle, comprising at least one battery pack according to the present disclosure.

According to one aspect of the present disclosure, by improving the electrode terminal structure of the cylindrical battery to increase the space efficiency in the battery can, it is possible to lower the internal resistance of the cylindrical battery and increase the energy density.

According to another aspect of the present disclosure, by improving the structure of the electrode terminal of the cylindrical battery to enlarge the sectional area of the current path, it is possible to improve the problem of internal heat generated during rapid charging.

According to still another aspect of the present disclosure, an electrical wiring operation for serial and/or parallel connection of the batteries may be performed at one side of the batteries.

According to still another aspect of the present disclosure, in the case of electrically connecting a plurality of batteries in one direction, it is possible to utilize the wide surface of the closed portion of the battery can as an electrode terminal, thereby securing a sufficient area for welding electrical connection components such as bus bars for manufacturing a battery pack to electrode terminals of the batteries.

According to still another aspect of the present disclosure, it is possible to optimally design such that the area occupied by the upper surface of the terminal (first electrode terminal) and the area occupied by the outer surface (second electrode terminal) of the closed portion are sufficient for coupling with the bus bar.

According to still another aspect of the present disclosure, through improvement of the structure of the uncoated region of the electrode assembly, the contact area of the electrode assembly and the current collector (first current collector) and/or the contact area of the terminal and the current collector (first current collector) may be enlarged, thereby minimizing the resistance of the cylindrical battery.

According to still another aspect of the present disclosure, the current path may be multiplexed through improvement of the electrical connection structure of the current collector (second current collector) and the battery can, and the contact area between these parts may be maximized to minimize the resistance of the cylindrical battery.

According to still another aspect of the present disclosure, it is possible to reduce the current path through the improvement of the electrical connection structure of the current collector (second current collector) and the battery can, thereby minimizing the resistance of the cylindrical battery.

According to still another aspect of the present disclosure, it is possible to minimize the dead space by improving the structure of the uncoated region of the electrode assembly and/or optimally designing the height of the terminal and/or optimally designing the thickness of the battery can, thereby maximizing the energy density.

According to still another aspect of the present disclosure, it is possible to provide a battery pack manufactured using the cylindrical battery having an improved structure and a vehicle including the same.

BRIEF DESCRIPTION OF DRAWINGS

The accompanying drawings illustrate an example embodiment of the present disclosure and together with the foregoing disclosure, serve to provide further understanding of the technical features of the present disclosure, and thus, the present disclosure is not construed as being limited to the drawing.

DETAILED DESCRIPTION OF THE EMBODIMENTS

Hereinafter, example embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In addition, in order to help the understanding of the present disclosure, the accompanying drawings are not drawn to scale, but dimensions of some components may be exaggerated. Also, the same reference signs may be assigned to the same components in different embodiments.

When it is explained that two objects are identical, this means that these objects are 'substantially identical'. Accordingly, the substantially identical objects may include deviations considered low in the art, for example, deviations within 5%. Also, when it is explained that certain parameters are uniform in a predetermined region, this may mean that the parameters are uniform in terms of an average.

Figure 5:
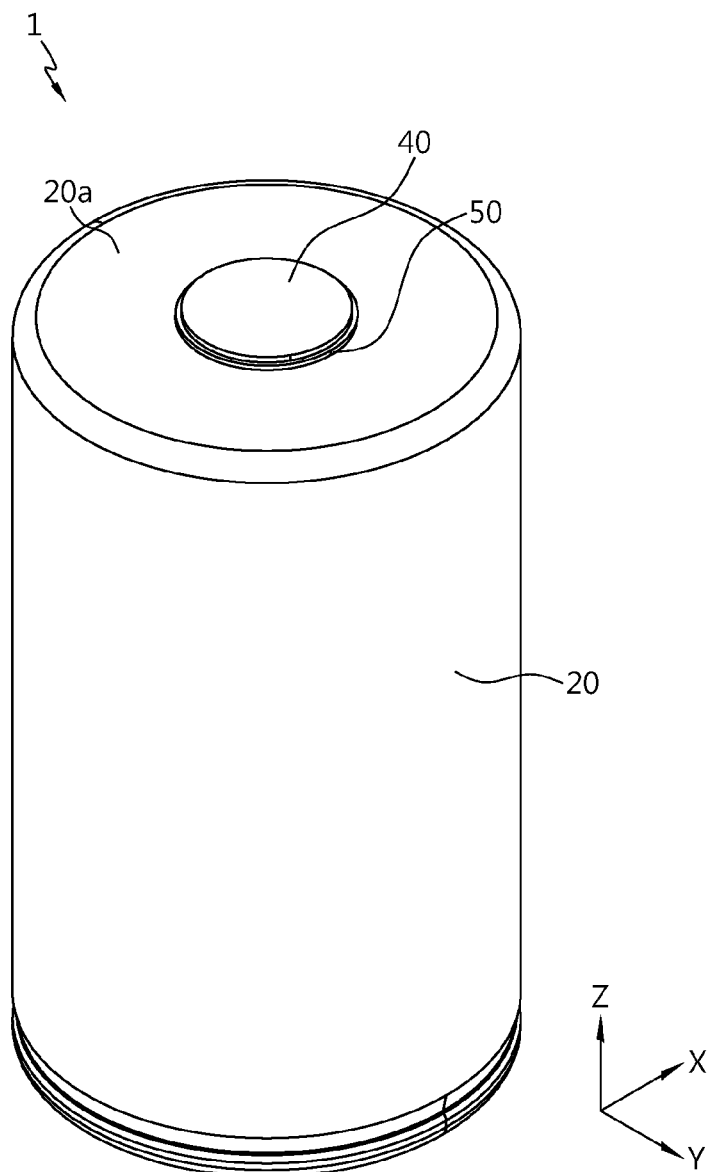
FIG. 5 is a diagram showing an appearance of a cylindrical battery according to an embodiment of the present disclosure.
Figure 6:
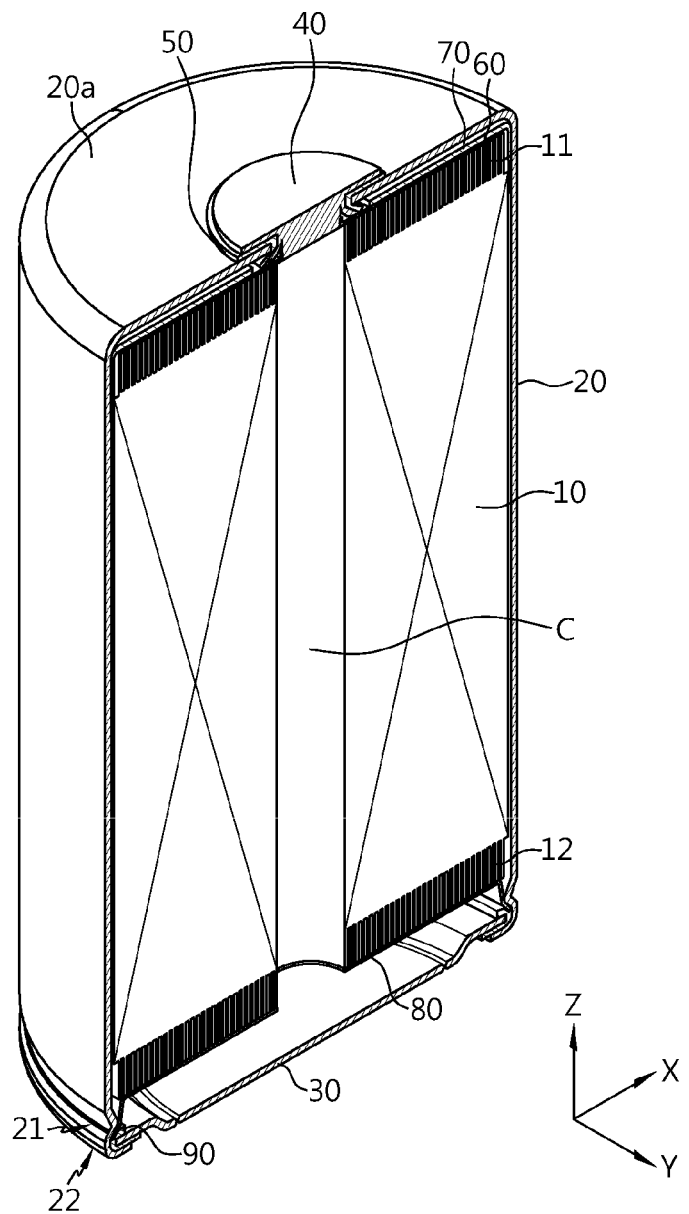
FIG. 6 is a diagram showing an internal structure of the cylindrical battery according to an embodiment of the present disclosure.
Figure 7:
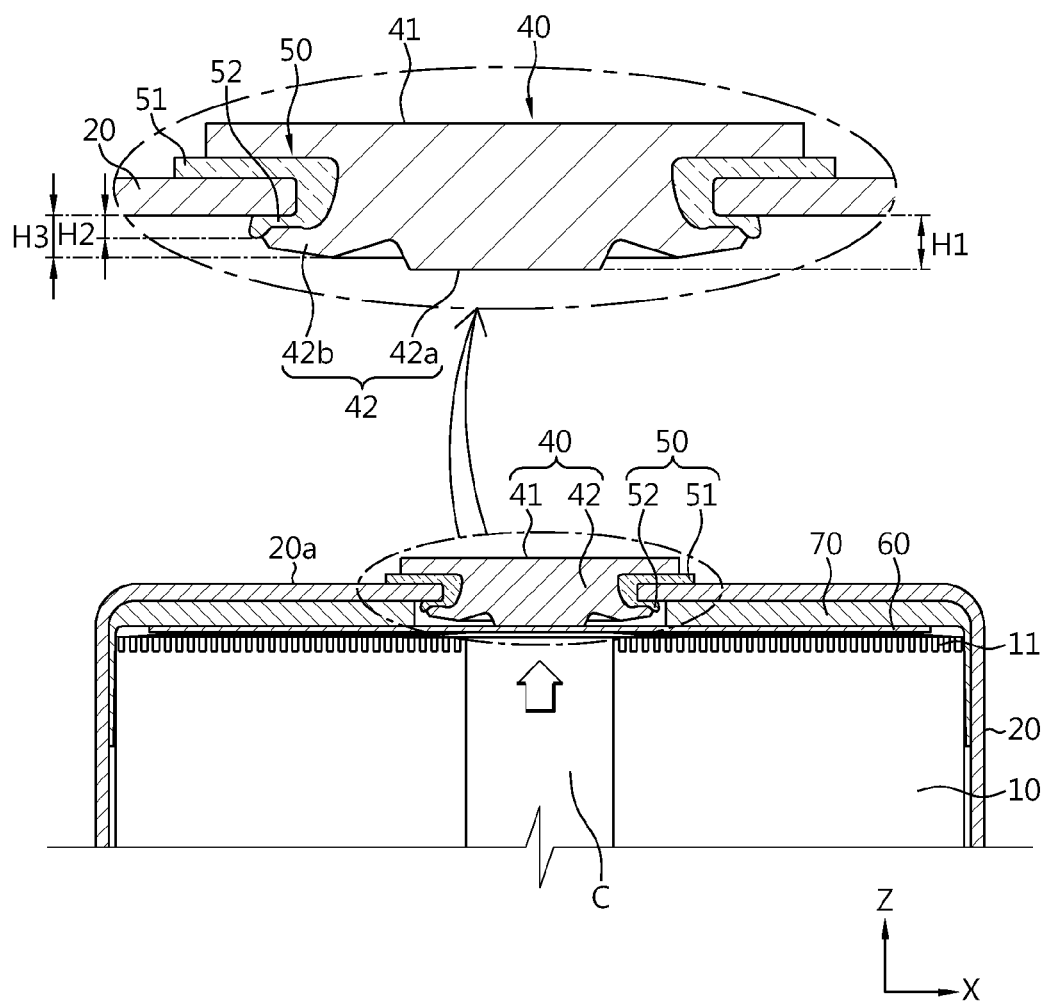
FIGS. 7 and 8 are partially sectioned views showing an upper structure of the cylindrical battery according to an embodiment of the present disclosure.

Referring to FIGS. 5 to 7, a cylindrical battery 1 according to an embodiment of the present disclosure includes an electrode assembly 10, a battery can 20, a cap 30, and a penetrating terminal 40. In addition to the above components, the cylindrical battery 1 may further include an insulation gasket 50 and/or a first current collector 60 and/or an insulator 70 and/or a second current collector 80 and/or a sealing gasket 90. In various embodiments, the cylindrical battery 1 may have at least one gasket at opposite ends of the battery can 20. For example, a closed end may have one gasket (e.g., the insulation gasket 50) and an open end may have one gasket (e.g., the sealing gasket 90), but such is not required, and additional gaskets can be used. Meanwhile, the battery can 20 may be referred to as a battery housing.

The electrode assembly 10 includes a first electrode having a first polarity, a second electrode having a second polarity, and a separator interposed between the first electrode and the second electrode. The first electrode is a positive electrode or a negative electrode, and the second electrode corresponds to an electrode having a polarity opposite to that of the first electrode.

The electrode assembly 10 may have, for example, a jelly-roll structure. That is, the electrode assembly 10 may be manufactured by preparing a stack that is formed by stacking a first electrode and a second electrode having a sheet shape at least once with a separator interposed therebetween, and winding the stack based on a winding center C. In this case, an additional separator may be provided on an outer circumferential surface of the electrode assembly 10 for insulation from the battery can 20. The jelly-roll structure known in the art can be applied to the present disclosure without limitations.

The first electrode includes a first electrode current collector and a first electrode active material coated on one surface or both surfaces of the first electrode current collector. At one end of the first electrode current collector in a width direction (parallel to the Z-axis), there is an uncoated region that is not coated with the first electrode active material. Hereinafter, the uncoated region functioning as a first electrode tab 11 will be called the first uncoated region 11. The first uncoated region 11 is provided at an upper portion of the electrode assembly 10 accommodated in the battery can 20 in a height direction (parallel to the Z-axis). That is, the first electrode current collector includes a first uncoated region 11 that is not coated with an active material layer at a long side end thereof and is exposed out of the separator, and a part of the first uncoated region 11 is used as an electrode tab by itself. The first uncoated region 11 may be, for example, a positive electrode tab.

Meanwhile, at least a part of the first uncoated region 11 may include a plurality of segments divided along a winding direction of the electrode assembly 10. In this case, the plurality of segments may be bent along a radial direction of the electrode assembly 10. The plurality of bent segments may be overlapped in multiple layers. In this case, a first uncoated region coupling portion 62 of the first current collector 60, explained later, may be coupled to a region in which the plurality of segments are overlapped in multiple layers. Meanwhile, the electrode assembly 10 may include a welding target region that is a region in which the number of overlapping layers of the segments of the first uncoated region 11 is kept constant along the radial direction of the electrode assembly 10. In this region, since the number of overlapping layers is kept to the maximum, it may be advantageous that the first current collector 60, explained later, and the first uncoated region 11 are welded in this region. This is, for example, in the case of applying laser welding, to prevent the laser beam from passing through the first uncoated region 11 and damaging the electrode assembly 10 when the output of the laser is increased, in order to improve welding quality. In addition, this is to effectively prevent foreign substances such as welding spatters from flowing into the electrode assembly 10.

The second electrode includes a second electrode current collector and a second electrode active material coated on one surface or both surfaces of the second electrode current collector. At the other end of the second electrode current collector in the width direction (parallel to the Z-axis), there is an uncoated region that is not coated with the second electrode active material. Hereinafter, the uncoated region functioning as a second electrode tab 12 will be called the second uncoated region 12. The second uncoated region 12 is provided at a lower portion of the electrode assembly 10 accommodated in the battery can 20 in the height direction (parallel to the Z-axis). That is, the second electrode current collector includes a second uncoated region 12 that is not coated with an active material layer at a long side end thereof and is exposed out of the separator, and at least a part of the second uncoated region 12 is used as an electrode tab by itself. The second uncoated region 12 may be, for example, a negative electrode tab. Meanwhile, at least a part of the second uncoated region 12 may include a plurality of segments divided along the winding direction of the electrode assembly 10. In this case, the plurality of segments may be bent along the radial direction of the electrode assembly 10. The plurality of bent segments may be overlapped in multiple layers. In this case, a second uncoated region coupling portion 82 of the second current collector 80, explained later, may be coupled to a region in which the plurality of segments are overlapped in multiple layers. Meanwhile, the electrode assembly 10 may include a welding target region that is a region in which the number of overlapping layers of the segments of the second uncoated region 12 is kept constant along the radial direction of the electrode assembly 10. In this region, since the number of overlapping layers is kept to the maximum, it may be advantageous that the second current collector 80, explained later, and the second uncoated region 12 are welded within this region. This is, for example, in the case of applying laser welding, to prevent the laser beam from passing through the second uncoated region 12 and damaging the electrode assembly 10 when the output of the laser is increased, in order to improve welding quality. In addition, this is to effectively prevent foreign substances such as welding spatters from flowing into the electrode assembly 10.

The first uncoated region 11 and the second uncoated region 12 extend in opposite directions along the height direction (parallel to the Z-axis) of the cylindrical battery 1. The first uncoated region 11 extends toward a closed portion located opposite to an opening formed at the lower end of the battery can 20, and the second uncoated region 12 extends toward the opening of the battery can 20.

In the present disclosure, a positive electrode active material coated on the positive electrode plate and a negative electrode active material coated on the negative electrode plate may employ any active material known in the art without limitation.

In one example, the positive electrode active material may include an alkali metal compound expressed by a general formula $A[A_xM_y]O_{2+z}$ (A includes at least one element among Li, Na and K; M includes at least one element selected from is Ni, Co, Mn, Ca, Mg, Al, Ti, Si, Fe, Mo, V, Zr, Zn, Cu, Al, Mo, Sc, Zr, Ru, and Cr; $x \geq 0$, $1 \leq x+y \leq 2$, $-0.1 \leq z \leq 2$; and the stoichiometric coefficients x, y and z are selected so that the compound maintains electrical neutrality).

In another example, the positive electrode active material may be an alkali metal compound $xLiM^1O_2$-$(1-x)Li_2M^2O_3$ disclosed in U.S. Pat. Nos. 6,677,082, 6,680,143, et al., wherein $M^1$ includes at least one element having an average oxidation state 3; $M^2$ includes at least one element having an average oxidation state 4; and $0 \leq x \leq 1$).

In still another example, the positive electrode active material may be lithium metal phosphate expressed by a general formula $Li_aM^1_xFe_{1-x}M^2_yP_{1-y}M^3_zO_{4-z}$ ($M^1$ includes at least one element selected from the Ti, Si, Mn, Co, Fe, V, Cr, Mo, Ni, Nd, Al, Mg and Al; $M^2$ includes at least one element selected from Ti, Si, Mn, Co, Fe, V, Cr, Mo, Ni, Nd, Al, Mg, Al, As, Sb, Si, Ge, V and S; $M^3$ includes a halogen element optionally including F; $0 < a \leq 2$, $0 \leq x \leq 1$, $0 \leq y \leq 1$, $0 \leq z < 1$; the stoichiometric coefficients a, x, y and z are selected so that the compound maintains electrical neutrality), or $Li_3M_2(PO_4)_3$ (M includes at least one element selected from Ti, Si, Mn, Fe, Co, V, Cr, Mo, Ni, Al, Mg and Al).

Preferably, the positive electrode active material may include primary particles and/or secondary particles in which the primary particles are aggregated.

In one example, the negative electrode active material may employ carbon material, lithium metal or lithium metal compound, silicon or silicon compound, tin or tin compound, or the like. Metal oxides such as $TiO_2$ and $SnO_2$ with a potential of less than 2V may also be used as the negative electrode active material. As the carbon material, a low-crystalline carbon and/or a high-crystalline carbon may be used.

The separator may employ a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, or the like, or laminates thereof. As another example, the separator may employ a common porous nonwoven fabric, for example, a nonwoven fabric made of high melting point glass fiber, polyethylene terephthalate fiber, or the like.

A coating layer of inorganic particles may be included in at least one surface of the separator. It is also possible that the separator itself is made of a coating layer of inorganic particles. Particles in the coating layer may be coupled with a binder so that an interstitial volume exists between adjacent particles.

The inorganic particles may be made of an inorganic material having a dielectric constant of 5 or more. As a non-limiting example, the inorganic particles may include at least one material selected from the group consisting of $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), $BaTiO_3$, hafnia ($HfO_2$), $SrTiO_3$, $TiO_2$, $Al_2O_3$, $ZrO_2$, $SnO_2$, $CeO_2$, $MgO$, $CaO$, $ZnO$ and $Y_2O_3$.

The electrolyte may be a salt having a structure like $A^+B^-$. Here, $A^+$ includes an alkali metal cation such as $Li^+$, $Na^+$, or $K^+$, or a combination thereof and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte may also be dissolved in an organic solvent. The organic solvent may employ propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

Referring to FIGS. 5 to 8, the battery can 20 is a substantially cylindrical container having an opening at a lower side, and is made of, for example, a material having conductivity such as metal. As a material of the battery can 20, for example, steel, stainless steel or nickel-plated steel may be applied. The bottom of the battery can 20 having the opening will be referred to as an opened end. The upper surface located opposite to the opening (or, the opened end) will be referred to as a closed portion or a closed end. A side surface (outer circumferential surface) and an upper surface of the battery can 20 may be integrally formed. Alternatively, the sidewall and the closed portion of the battery can 20 may be provided separately from each other and be coupled to each other by welding or the like. The upper surface of the battery can 20 (a surface parallel to the X-Y plane), namely an outer surface 20a of the closed portion, has an approximately flat shape. The battery can 20 accommodates the electrode assembly 10 through the opening formed at the bottom, and also accommodates an electrolyte together.

The battery can 20 is electrically connected to the electrode assembly 10. The battery can 20 is electrically connected to, for example, the second uncoated region 12 of the electrode assembly 10. In this case, the battery can 20 has the same polarity as the second uncoated region 12.

Figure 13:
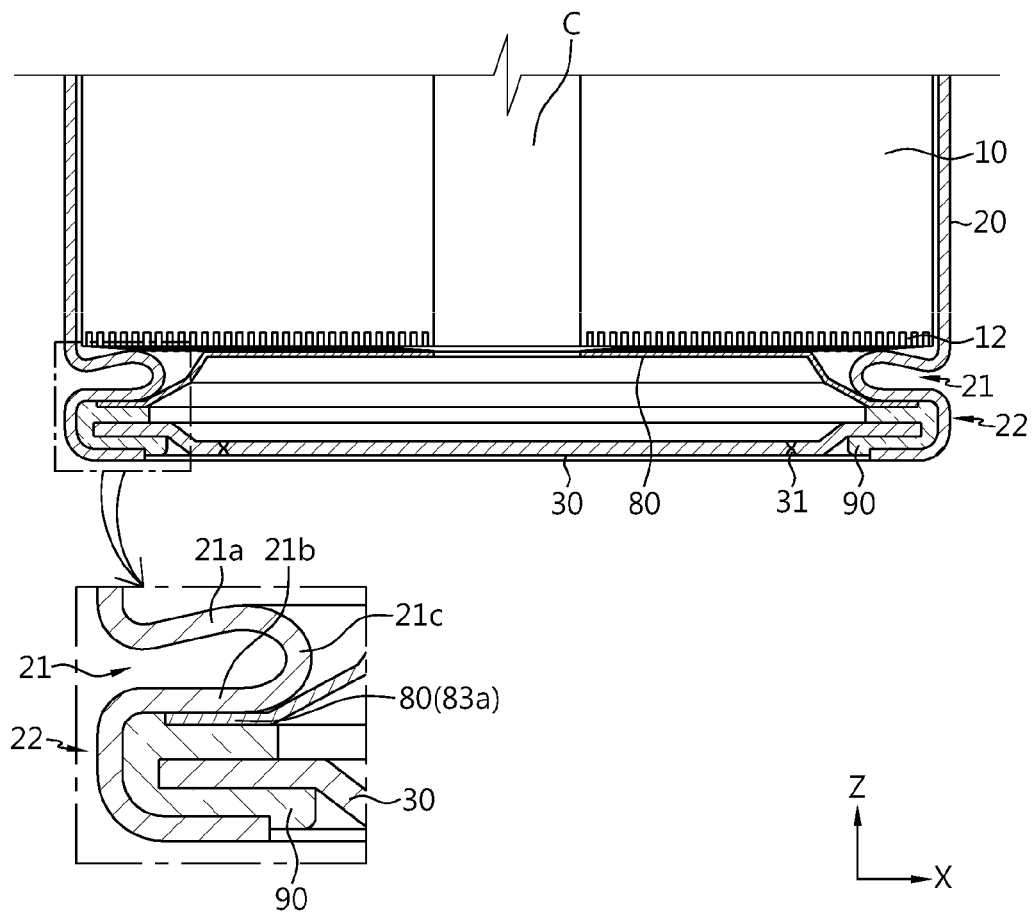
FIG. 13 is a partially sectioned view showing a lower structure of the cylindrical battery according to an embodiment of the present disclosure.

Referring to FIGS. 6 and 13, the battery can 20 may include a beading portion 21 and a crimping portion 22 formed at a lower end thereof. The beading portion 21 is located below the electrode assembly 10. The beading portion 21 is formed by press-fitting a periphery of the outer circumferential surface of the battery can 20. The upper beading portion 21a and the lower beading portion 21b respectively located above and below based on an innermost portion 21c of the beading portion 21 located at an innermost side along the pressing-fitting direction may have an asymmetric shape. This asymmetric shape may be formed in the process of compressing the battery can 20 along the height direction (parallel to the Z-axis) through a sizing process. The sizing process is a process of matching the height of the cylindrical battery 1 to a design form factor by pressing the battery can 20 along the winding axis direction of the electrode assembly 10.

The lower beading portion 21b may include a flat portion substantially parallel to the closed portion of the battery can 20. Meanwhile, due to the asymmetrical formation, the upper beading portion 21a may have a shape inclined upward at least partially along a direction toward the innermost portion 21c. Accordingly, the upper beading portion 21a may compress and fix the lower portion of the electrode assembly 10. The beading portion 21 prevents the electrode assembly 10 having a size approximately corresponding to the inner diameter of the battery can 20 from coming out through the opening formed at the lower end of the battery can 20, and may function as a support portion on which the cap 30 is placed. The lower beading portion 21b may function as a support portion for fixing the contact portion 83a of the second current collector 80, the sealing gasket 90, and the like as well as the cap 30, explained later.

The crimping portion 22 is formed below the beading portion 21. The crimping portion 22 extends from the lower beading portion 21. The crimping portion 22 has a shape extending and bent to surround the outer circumferential surface of the cap 30 disposed below the beading portion 21 and a part of the lower surface of the cap 30. The crimping portion 22 may fix the sealing gasket 90 in addition to the cap 30.

However, the present disclosure does not exclude the case where the battery can 20 does not include the beading portion 21 and/or the crimping portion 22. In the present disclosure, if the battery can 20 does not include the beading portion 21 and/or the crimping portion 22, it is possible to fix the electrode assembly 10 and/or fix the cap 30 and/or seal the battery can 20 by, for example, additionally applying a component that can function as a stopper for the electrode assembly 10 and/or additionally applying a structure on which the cap 30 can be placed and/or welding the battery can 20 and the cap 30 to each other.

Meanwhile, the battery can 20 may be configured to have different thicknesses depending on locations. In the battery can 20, the thickness of the sidewall may be formed smaller than the thickness of the closed portion. In this case, since the electrode assembly 10 may be formed to have a greater diameter, it may be advantageous in terms of energy density.

The closed portion of the battery can 20, namely a region forming the upper surface, may have a thickness in the range of, for example, about 0.4 mm to 1.2 mm, more preferably in the range of about 0.6 mm to 1.0 mm. If the thickness of the closed portion of the battery can 20 is too great, the risk of deformation of the battery can 20 may increase when the internal pressure rises or welding is performed. Conversely, if the thickness of the closed portion of the battery can 20 is too small, it may be disadvantageous in terms of processing the battery can 20, and loss in terms of energy density may increase. Therefore, it is necessary to manage the thickness of the closed portion of the battery can 20 at an appropriate level.

Meanwhile, in the battery can 20, the sidewall constituting the outer circumferential surface may have, for example, a thickness in the range of about 0.3 mm to 0.8 mm, more preferably in the range of about 0.4 mm to 0.6 mm. If the thickness of the sidewall of the battery can 20 is too small, the possibility of fire spreading to neighboring cylindrical batteries 1 increase when fire and explosion occurs at the cylindrical battery 1. For example, in a battery pack including a plurality of cylindrical batteries 1, in the case where an abnormality occurs in some cylindrical batteries 1 to cause fire and explosion, if the thickness of the sidewall of the battery can 20 is too small, a pin hole may be generated, thereby increasing the risk of a chain ignition and explosion. Meanwhile, if the thickness of the sidewall of the battery can 20 is too small, it may be disadvantageous in terms of processing the battery can 20 and loss in terms of energy density may increase. Therefore, it is necessary to manage the thickness of the sidewall of the battery can 20 at an appropriate level. Meanwhile, a plating layer may be formed on the battery can 20. In this case, the plating layer may include, for example, nickel (Ni). The thickness of the plating layer may be in the range of approximately 1.5 μm to 6.0 μm.

Referring to FIGS. 6 and 13, the cap 30 may be made of, for example, a metal material to ensure rigidity. The cap 30 seals the opening (or, the opened end) formed at a bottom end of the battery can 20. That is, the cap 30 functions as the lower surface of the cylindrical battery 1. In the cylindrical battery 1 of the present disclosure, the cap 30 may not have a polarity even if it is made of a conductive metal material. The cap 30 having no polarity may mean that the cap 30 is not electrically connected to the electrode assembly 10. If the cap 30 is not electrically connected to the electrode assembly 10 as above, the cap 30 does not function as a positive electrode terminal or a negative electrode terminal. That is, in the present disclosure, the cap 30 does not need to be electrically connected to the electrode assembly 10 and the battery can 20, and its material does not necessarily have to be a conductive metal.

If the battery can 20 of the present disclosure includes the beading portion 21, the cap 30 may be supported by the lower surface of the beading portion 21 formed on the battery can 20. In addition, if the battery can 20 of the present disclosure includes the crimping portion 22, the cap 30 is fixed by the crimping portion 22. That is, the upper surface of the cap 30 may be supported by the beading portion 21, and the outer circumferential surface and the lower surface of the cap 30 may be supported by the beading portion 21. The sealing gasket 90 may be interposed between the cap 30 and the crimping portion 22 of the battery can 20 to secure the airtightness of the battery can 20. Meanwhile, as described above, the battery can 20 of the present disclosure may not include the beading portion 21 and/or the crimping portion 22, and in this case, the sealing gasket 90 may be interposed between a fixing structure provided at a side of the battery can 20 having the opening and the cap 30 in order to secure the airtightness of the battery can 20.

Figure 14:
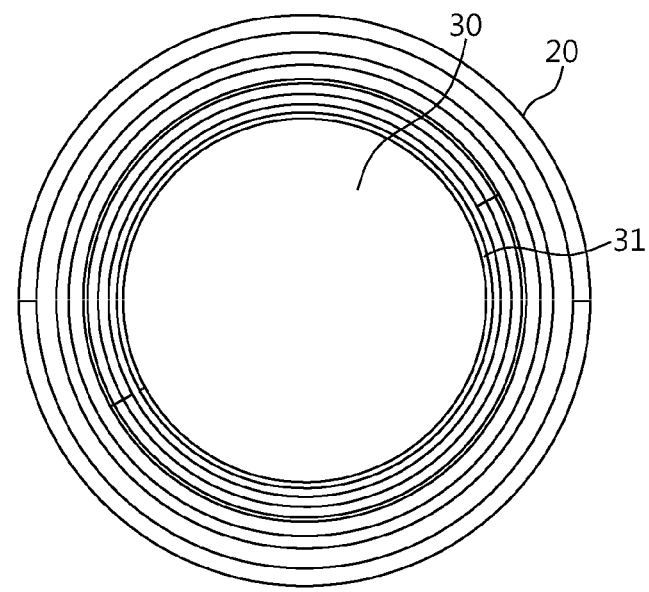
FIG. 14 is a diagram showing a lower surface of the cylindrical battery according to an embodiment of the present disclosure.

Referring to FIGS. 13 and 14, the cap 30 may further include a venting portion 31 formed to prevent an inner pressure from increasing over a preset value due to a gas generated inside the battery can 20. The preset inner pressure value may be about 15 kgf/cm$^2$ to 35 kgf/cm$^2$. The venting portion 31 corresponds to a region having a smaller thickness compared to the peripheral region of the cap 30. The venting portion 31 is structurally weak compared to the peripheral region. Accordingly, if an abnormal situation occurs in the cylindrical battery 1 so that the inner pressure of the battery can 20 increases over a certain level, the venting portion 31 is ruptured so that the gas generated inside the battery can 20 is discharged. The venting portion 31 may be formed by reducing the thickness of the battery can 20 partially, for example by notching any one surface or both surfaces of the cap 30.

The cylindrical battery 1 according to an embodiment of the present disclosure has a structure in which both a positive electrode terminal and a negative electrode terminal are provided at an upper portion thereof as will be described later, and thus the upper structure is more complicated than the lower structure. Accordingly, the venting portion 31 may be formed at the cap 30 that functions as a lower surface of the cylindrical battery 1 in order to smoothly discharge the gas generated inside the battery can 20. As shown in FIG. 7, the lower end of the cap 30 is preferably located higher than the lower end of the battery can 20. In this case, even if the lower end of the battery can 20 touches the ground or the bottom surface of the housing for a module or pack configuration, the cap 30 does not touch the ground or the bottom surface of the housing for the module or pack configuration. Accordingly, it is possible to prevent the pressure required to rupture the venting portion 31 from being different from a design value due to the weight of the cylindrical battery 1, thereby securing smooth rupture of the venting portion 31.

Meanwhile, the venting portion 31 may have a shape extending continuously or discontinuously to surround the central region of the cap 30 as shown in FIGS. 13 and 14. In this case, a greater distance is advantageous from the center of the cap 30 to the venting portion 31 in terms of ease of rupture of the venting portion 31 due to the increase of internal pressure. This is because, when the same internal pressure is applied, as the distance from the center point of the cap 30 to the venting portion 31 is greater, the force acting on the venting portion 31 increases further to secure easy rupture. In addition, a greater distance is also advantageous from the center point of the cap 30 to the venting portion 31 in terms of the smooth discharge of the venting gas since the area opened by venting is increased. From this point of view, the venting portion 31 may be advantageously formed along an edge circumference of the central region having an approximately flat shape and protruding downward (in a lower direction based on FIG. 13), in the entire region of the cap 30.

FIGS. 13 and 14 depict a case in which the venting portion 31 is continuously formed in an approximately circular shape on the cap 30, but the present disclosure is not limited thereto. The venting portion 31 may have an approximately elliptical shape or other geometric shape that is formed to include the center point of the cap 30 therein. In addition, the venting portion 31 may be formed discontinuously instead of continuously.

Referring to FIGS. 5 to 7, the terminal 40 is made of a metal material with conductivity. The material of the terminal 40 may be aluminum (Al). If the material of the terminal 40 is aluminum, the riveting process, explained later, may be performed easily, and aluminum of 10 series having a relatively low electrical resistance may be applied. The terminal 40 penetrates an upper surface of the battery can 20, namely a surface (parallel to the XY plane) located at a side of the battery can 20 opposite to the opening. The terminal 40 is electrically connected to the first uncoated region 11 of the electrode assembly 10, for example. In this case, the terminal 40 has a first polarity. Accordingly, the terminal 40 may function as a first electrode terminal in the cylindrical battery 1 of the present disclosure. If the terminal 40 has the first polarity like this, the terminal 40 is electrically insulated from the battery can 20 with the second polarity. The electrical insulation between the terminal 40 and the battery can 20 may be realized in various ways. For example, the insulation may be realized by interposing an insulation gasket 50, explained later, between the terminal 40 and the battery can 20. Alternatively, the insulation may be realized by forming an insulating coating layer on a portion of the terminal 40. Alternatively, any method of structurally fixing the terminal 40 securely such that the terminal 40 and the battery can 20 cannot contact each other may be applied. Alternatively, some of the above methods may be applied together.

The terminal 40 includes a terminal exposing portion 41 and a terminal insert portion 42. The terminal insert portion 42 may include an electric connection portion 42a and a flange portion 42b. The terminal exposing portion 41 is exposed out of the battery can 20. The terminal exposing portion 41 may be located approximately at the center of the closed portion of the battery can 20. The maximum width of the terminal exposing portion 41 may be formed larger than the maximum width of the hole formed in the battery can 20 for the insertion of the terminal 40. The terminal insert portion 42 may pass through approximately the center of the closed portion of the battery can 20, and the electric connection portion 42a of the terminal insert portion 42 may be electrically connected to the first uncoated region 11. The flange portion 42b of the terminal insert portion 42 is formed at the periphery of the electric connection portion 42a, and may be riveted on the inner surface of the closed portion of the battery can 20. That is, the flange portion 42b of the terminal insert portion 42 may have a shape curved toward the inner surface of the closed portion of the battery can 20. Therefore, the maximum width of the terminal insert portion 42 after the riveting process for fixing the terminal 40 is performed may be formed larger than the maximum width of the hole formed in the battery can 20 so that the terminal insert portion 42 passes therethrough.

Meanwhile, when the cylindrical battery 1 of the present disclosure includes the first current collector 60, the electric connection portion 42a of the terminal insert portion 42 may be coupled to the first current collector 60. The electric connection portion 42a of the terminal insert portion 42 may have, for example, a substantially cylindrical shape. Of course, the shape of the electric connection portion 42a of the terminal insert portion 42 is not limited thereto. The electric connection portion 42a of the terminal insert portion 42 may have various shapes, such as, for example, a cylindrical shape having an elliptical cross-section, a square pillar shape, a hexagonal pillar shape, an octagonal pillar shape, or the like. The bottom surface of the electric connection portion 42a of the terminal insert portion 42 may be formed to be substantially flat at least partially.

Figure 8:
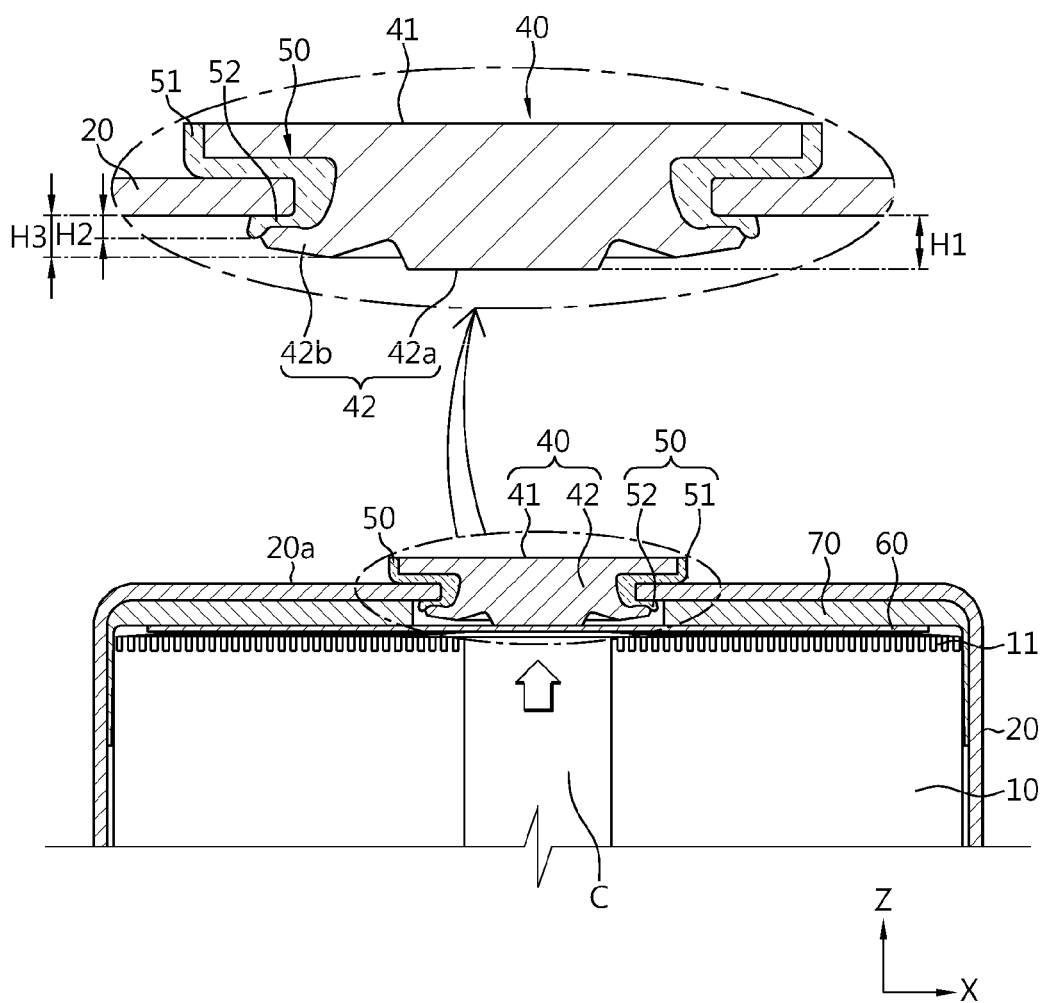
Figure 9:
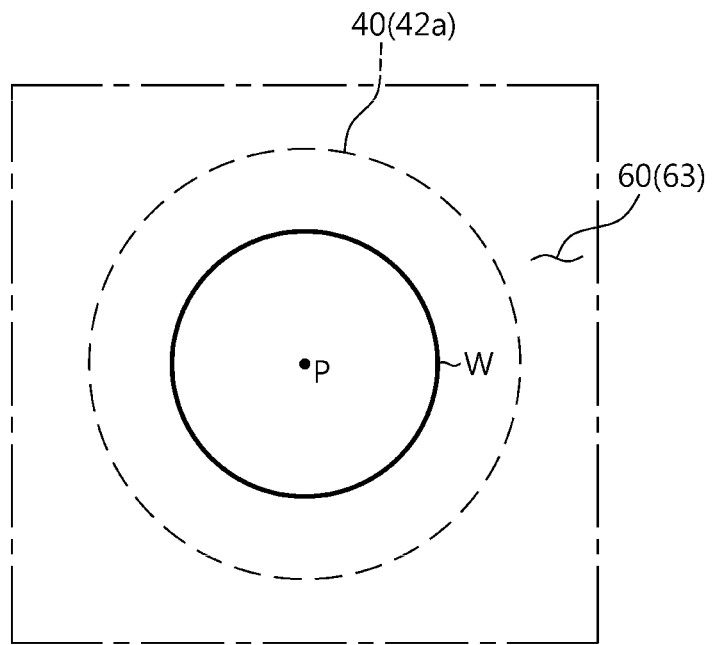
FIGS. 9 and 10 are plan views showing a coupling portion of a first current collector and a terminal, viewed along arrow directions of FIGS. 7 and 8.
Figure 10:
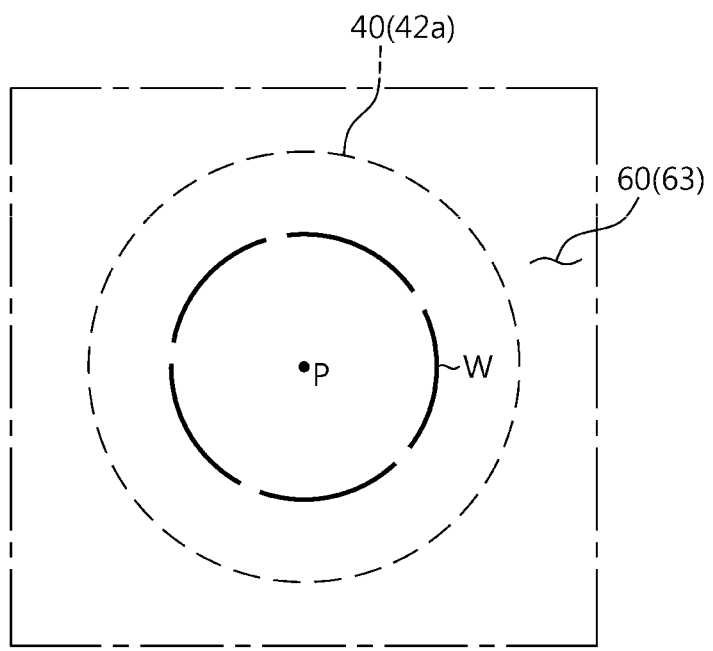

Referring to FIGS. 9 and 10 along with FIGS. 7 and 8, the bottom surface of the central region of the terminal insert portion 42 and the first current collector 60 may be coupled by, for example, laser welding, spot welding or ultrasonic welding.

The welding may be performed by irradiating a laser through a hole formed at the winding center C of electrode assembly 10 or inserting a tool for ultrasonic welding or spot welding to form a welding bead W on one surface of the first current collector 60 (a surface facing the hole formed at the winding center C of the electrode assembly 10). A guide pipe (not shown) for welding may be inserted into the hole formed at the winding center C. When welding is carried out in a state where the guide pipe is inserted, the risk of damage to the separator forming the inner wall of the hole formed at the winding center C may be reduced.

The welding pattern drawn by the welding bead W formed on one surface of the terminal coupling portion 63 of the first current collector 60 may be drawn to surround the center P of the bottom surface of the electric connection portion 42a of the terminal insert portion 42. The welding pattern may be, for example, approximately circular, and alternatively, the welding pattern may have an approximately elliptical shape, or a polygonal shape such as approximately square, hexagonal and octagonal shapes. The welding pattern formed by the welding bead W may be formed continuously (see FIG. 9) or discontinuously (see FIG. 10). The circular, elliptical and polygonal shapes, which are examples of the shape of the welding pattern formed by the welding bead W, do not mean geometrically perfect circles, ovals and polygons.

Meanwhile, the diameter of the flat portion formed on the bottom surface of the electric connection portion 42a of the terminal insert portion 42 may be determined in consideration of welding strength with the first current collector 60. The tensile force of the welding portion between the flat portion and the first current collector 60 may be at least about 2 kgf or more, 3 kgf or more, 4 kgf or more, 5 kgf or more, 6 kgf or more, 7 kgf or more, 8 kgf or more, 9 kgf or more, or 10 kgf or more. It is preferable to increase the tensile force of the welding portion as much as possible within an allowable range by optimally selecting a welding method.

The diameter (or, the maximum width) of the welding pattern formed on the flat portion to satisfy the tensile force condition of the welding portion may be at least about 2 mm. The diameter of the welding pattern may be defined as a converted diameter $(2*(S/\pi)^{0.5})$ of a circle when the area (S) of the welding bead W displayed on the surface of the welding portion is converted to an area $(\pi r^2)$ of the corresponding circle.

The flat portion formed on the bottom surface of the electric connection portion 42a of the terminal insert portion 42 corresponds to a weldable region. The diameter of the weldable region may be approximately 3 mm to 14 mm. If the diameter of the weldable region is less than about 3 mm, it is difficult to secure a welding pattern with a diameter (converted diameter) of 2 mm or more. In particular, in the case of forming a welding pattern using laser welding, it is difficult to secure a welding pattern having a diameter of 2 mm or more due to laser beam interference. If the diameter of the weldable region exceeds approximately 14 mm, the diameter of the terminal exposing portion 41 of the terminal 40 is inevitably increased beyond that, and thus it is difficult to sufficiently secure the area of the outer surface 20a of the battery can 20 to be used as an electrode terminal having an opposite polarity to the terminal 40.

Considering the diameter condition of the welding pattern and the diameter condition of the weldable region, the ratio of the area of the welding pattern to the area of the weldable region required to secure a welding portion tensile force of at least about 5 kgf or more is preferably approximately 2.04% $(\pi 1^2/\pi 7^2)$ to 44.4% $(\pi 1^2/\pi 1.5^2)$.

In one example, when the flat portion formed on the bottom surface of the electric connection portion 42a of the terminal insert portion 42 and the first current collector 60 are welded by a laser while the welding bead W is drawing a continuous or discontinuous line in the form of an approximately arc pattern, the diameter of the arc welding pattern is about 2 mm or more, preferably about 4 mm or more. When the diameter of the arc welding pattern satisfies the corresponding condition, it is possible to secure sufficient welding strength by increasing the welding portion tensile force to about 5 kgf or more.

In another example, when the flat portion formed on the bottom surface of the electric connection portion 42a of the terminal insert portion 42 and the first current collector 60 are welded by ultrasonic waves in a circular pattern, the diameter of the circular welding pattern is preferably about 2 mm or more. When the diameter of the circular welding pattern satisfies the corresponding condition, it is possible to secure sufficient welding strength by increasing the welding portion tensile force to about 5 kgf or more.

The diameter of the flat portion formed on the bottom surface of the terminal 40 corresponding to the weldable region may be adjusted in the range of approximately 3 mm to 14 mm. If the radius of the flat portion is less than about 3 mm, it is difficult to form a welding pattern having a diameter of about 2 mm or more by using a laser welding tool, an ultrasonic welding tool, or the like.

In another aspect, the distance from the center of the upper surface of the terminal 40 to the outermost side, namely the radius R1 of the terminal exposing portion 41, may be approximately 10% to 70% of the radius (R2, ½ of the outer diameter of the battery can) of the upper surface of the battery can 20. If R1 decreases, the welding space becomes insufficient when welding components (bus bars) used for the electrical connection of the terminal 40. In addition, when R1 increases, the welding space decreases when welding components (bus bars) used for electrical connection in a remaining area except for the terminal 40 on the upper surface of the battery can 20.

If the ratio R1/R2 is adjusted between approximately 10% and 70%, the welding space for the terminal 40 and the welding space for the outer surface 20a of the closed portion of the battery can 20 may be properly secured.

In addition, the radius R3 of the bottom surface of the electric connection portion 42a of the terminal insert portion 42 may be approximately 4% to 30% compared to the R2.

If the R3 decreases, the welding space becomes insufficient when welding the first current collector 60 to the flat portion formed on the bottom surface of the electric connection portion 42a of the terminal insert portion 42, and the contact resistance may increase since the welding area of the terminal 40 decreases. In addition, R3 should be smaller than R1, and if R3 increases, the thickness of the flange portion 42b of the terminal insert portion 42 inevitably decreases, which weakens the force of the flange portion 42b to compress the insulating gasket 50, thereby deteriorating the sealing ability of the insulating gasket 50.

If R3/R2 is adjusted between approximately 4% and 30%, the welding process may be easily performed by sufficiently securing the welding area between the bottom surface of the electric connection portion 42a of the terminal insert portion 42 and the first current collector 60, and also it is possible to reduce the contact resistance of the welding area and to prevent the sealing ability of the insulating gasket 50 from deteriorating.

Meanwhile, the cylindrical battery 1 according to an embodiment of the present disclosure has a structure in which the bottom surface of the electric connection portion 42a of the terminal insert portion 42 is welded onto the first current collector 60 as described above, thereby maximizing the binding area between the first current collector 60 and the terminal 40. That is, at least a part of the bottom surface of the electric connection portion 42a is formed to be flat, and thus the coupling area between the terminal 40 and the first current collector 60 may be maximized. Therefore, the cylindrical battery 1 according to an embodiment of the present disclosure may secure a smooth current flow at the coupling portion of the first current collector 60 and the terminal 40 in the case where a large amount of current flows due to rapid charging, thereby giving the effects of shortening the charging time and reducing the amount of heat generated.

In the present disclosure, the upper surface of the battery can 20, namely the outer surface 20a of the closed portion of the battery can 20, and the upper surface of the terminal exposing portion 41 of the terminal 40 exposed out of the battery can 20 have opposite polarities and face in the same direction. In addition, a step may be formed between the upper surface of the terminal exposing portion 41 and the upper surface of the battery can 20. That is, as shown in FIGS. 7 and 8, the terminal exposing portion 41 may protrude to the outside of the battery can 20 by a predetermined height through the upper surface of the battery can 20. In this case, the height of the step may be in the range of approximately 0.08 mm to 4 mm. If the height of the step is formed too low beyond this range, the possibility that the bus bar coupled to the upper surface of the terminal exposing portion 41 comes into contact with the upper surface of the battery can 20 having a polarity opposite to the terminal exposing portion 41 and/or the possibility that the terminal exposing portion 41 is deformed when the terminal 40 is riveted may increase. The thickness of the gasket exposing portion 51, explained later, may be formed in the range of about 0.3 mm to 1 mm in consideration of insulation and sealing properties. Considering the thickness of the gasket exposing portion 51, if the height of the terminal exposing portion 41 protruding to the upper surface 20a of the battery can 20 is less than approximately 0.08 mm, it becomes difficult to secure the mechanical rigidity of the terminal exposing portion 41. In particular, this is more serious when the terminal 40 is made of aluminum. Meanwhile, when the height of the step is formed to be too high beyond the above range, the size of the cylindrical battery 1 increases in the height direction, which may increase the loss in terms of energy density.

Meanwhile, in the drawings of the present disclosure, only the case where the terminal 40 protrudes higher than the upper surface of the battery can 20 functioning as the electrode terminal 20a having an opposite polarity to the terminal 40 is shown, but the present disclosure is not necessarily limited thereto.

For example, if the upper surface of the battery can 20 has a shape concavely indented from the center downward, namely toward the electrode assembly 10, the upper surface of the battery can 20 may be located higher than the terminal exposing portion 41 of the electrode terminal 40.

Meanwhile, in the case where the upper surface of the battery can 20 has a shape concavely indented from the center downward, namely toward the electrode assembly 10, the upper surface of the battery can 20 and the upper surface of the terminal exposing portion 41 may form the same plane according to the indented depth and the thickness of the terminal exposing portion 41 of the electrode terminal 40. In this case, a step may not be formed between the upper surface of the battery can 20 and the upper surface of the terminal exposing portion 41.

The insulation gasket 50 is interposed between the battery can 20 and the terminal 40 to prevent the battery can 20 and the terminal 40 having opposite polarities from contacting each other. Accordingly, the upper surface of the battery can 20 having an approximately flat shape may function as a second electrode terminal of the cylindrical battery 1.

The insulation gasket 50 includes a gasket exposing portion 51 and a gasket insert portion 52. The gasket exposing portion 51 is interposed between the terminal exposing portion 41 of the terminal 40 and the battery can 20. The gasket exposing portion 51 may extend longer than the terminal exposing portion 41, and thus may be exposed out of the terminal exposing portion 41 when the cylindrical battery 51 is viewed from the above. The gasket insert portion 52 is interposed between the terminal insert portion 42 of the terminal 40 and the battery can 20. When the flange portion 42b of the terminal insert portion 42 is riveted, the gasket insert portion 52 may be deformed together to come into close contact with the inner surface of the closed portion of the battery can 20. The insulation gasket 50 may be made of, for example, a resin material having insulation and elasticity.

Referring to FIG. 8, the gasket exposing portion 51 of the insulation gasket 50 may have an extended shape to cover the outer circumferential surface of the terminal exposing portion 41 of the terminal 40. If the insulation gasket 50 covers the outer circumferential surface of the terminal 40 in this way, it is possible to prevent a short circuit from occurring in the process of coupling an electric connection component such as a bus bar to the upper surface of the battery can 20 and/or the terminal 40. Although not shown in the drawings, the gasket exposing portion 51 of the insulation gasket 50 may also have an extended shape to cover not only the outer circumferential surface of the terminal exposing portion 41 but also a portion of the upper surface thereof.

In the case where the insulation gasket 50 is made of a resin material, the insulation gasket 50 may be coupled to the battery can 20 and the terminal 40 by thermal fusion. In this case, the airtightness at the coupling interface between the insulation gasket 50 and the terminal 40 and at the coupling interface between the insulation gasket 50 and the battery can 20 may be strengthened. Meanwhile, in the case where the gasket exposing portion 51 of the insulation gasket 50 extends to the upper surface of the terminal exposing portion 41, the terminal 40 may be coupled to the insulation gasket 50 by insert injection molding.

Meanwhile, referring to FIGS. 7 and 8, preferably, the height H3 of the flange portion 42a of the terminal insert portion 42 protruding to the inside of the battery can 20 may be approximately 0.5 mm to 3.0 mm. If the protrusion height H3 of the terminal insert portion 42 is less than about 0.5 mm, it is difficult to ensure sufficient sealing properties. In addition, if the protrusion height H3 of the terminal insert portion 42 exceeds 3 mm, the internal space of the battery can 20 that can be occupied by the electrode assembly 10 is reduced.

Preferably, the total height of the terminal 40 may be approximately 1.5 mm to 7 mm. The total height of the terminal 40 means the distance from the upper surface of the terminal exposing portion 41 to the bottom surface of the terminal insert portion 42. If the total height of the terminal 40 is less than about 1.5 mm, it is difficult to increase the thickness of the gasket insert portion 52 enough to secure sealing properties due to the thickness of the closed portion of the battery can 20. For reference, the thickness of the closed portion of the battery can 20 may be formed in the range of about 0.4 mm to 1.2 mm. In addition, if the total height of the terminal 40 exceeds approximately 7 mm, the inner space of the battery can 20 that can be occupied by the electrode assembly 10 is excessively reduced and the total height of the cylindrical battery 1 is increased, so that the energy density per unit area is lowered as much.

Meanwhile, the terminal 40 may have a riveted structure such that the terminal insert portion 42 is substantially parallel to the inner surface of the closed portion of the battery can 20. Accordingly, the angle formed by and the inner surface of the closed portion and the surface of the terminal insert portion 42 opposite to the inner surface of the closed portion of the battery can 20 may be formed substantially close to zero. In addition, the height H3 of the flange portion 42b of the terminal insert portion 42 protruding toward the inside of the battery can 20 with respect to the inner surface of the closed portion of the battery can 20 may be formed equal to or greater than the height H2 of the gasket insert portion 52 protruding toward the inside of the battery can 20. In addition, the height H1 of the electric connection portion 42a protruding toward the inside of the battery can 20 with respect to the inner surface of the closed portion of the battery can 20 may be equal to or greater than the protrusion height H3 of the flange portion 42b. In addition, the inner edge portion of the hole of the battery can 20 for the passage of the terminal 40 and the insulating gasket 50 has an arc shape with a predetermined curvature. In addition, the electric connection portion 42a of the terminal insert portion 42 of the terminal 40 may have a shape gradually narrowing toward its bottom surface.

Preferably, the thickness of the insulating gasket 50 may gradually decrease downward from an intermediate region where the gasket exposing portion 51 and the gasket insert portion 52 are connected, and then slightly increase at the distal end of the gasket insert portion 52. The compression structure of the insulating gasket 50 may further improve the sealing properties for the space between the terminal 40 and the battery can 20.

Preferably, the riveting structure of the terminal 40 according to an embodiment of the present disclosure as described above may be applied to a cylindrical battery having a form factor greater than 21700.

Recently, as the cylindrical battery is applied to an electric vehicle, the form factor of the cylindrical battery is increasing compared to the conventional 18650, 21700, and the like. An increase in the form factor leads to increased energy density, increased safety against thermal runaway, and improved cooling efficiency.

Also, as will be explained later, the cylindrical battery 1 to which the riveting structure of the terminal 40 is applied may perform all electrical wiring for the positive electrode/negative electrode in one direction. In addition, the terminal 40 having the riveting structure as described above has a large sectional area and low electric resistance, which is very advantageous for rapid charging.

According to an embodiment of the present disclosure, the insulation gasket 50, the insulator 70, and the sealing gasket 90 may be made of the same material. However, this is not essential. The insulation gasket 50 and the insulator 70 may have substantially the same thickness. However, this is not essential. If they have different thicknesses, the insulator 70 may be thinner than the insulation gasket 50, and vice versa.

In the entire area of the upper surface of the battery can 20, viewed from a location above the cylindrical battery 1, the entire area except for the area occupied by the terminal 40 and the insulation gasket 50 corresponds to the second electrode terminal having the opposite polarity to the terminal 40.

The cylindrical sidewall of the battery can 20 may be formed in one piece with the second electrode terminal so that there is no discontinuous portion therebetween. The connection portion from the sidewall of the battery can 20 to the second electrode terminal may have a smooth curve. That is, a round region may be provided at the edge circumference of the upper surface 20a of the battery can 20. However, the present disclosure is not limited thereto, and the connecting portion may include at least one corner having a predetermined angle. When the round region is formed at the edge of the upper surface 20a of the battery can 20, among the entire area of the upper surface of the battery can 20 viewed from a position above the cylindrical battery 1, a region occupied by the terminal 40 and the insulating gasket 50 and the entire region except for the round region may function as a second electrode terminal having a polarity opposite to the terminal 40.

Referring to FIGS. 7 and 8, the first current collector 60 is coupled to an upper portion of the electrode assembly 10. In addition, the first current collector 60 is coupled to the terminal 40. That is, the first current collector 60 electrically connects the first uncoated region 11 of the electrode assembly 10 and the terminal 40. The first current collector 60 is made of a metal material with conductivity and is connected to the first uncoated region 11. Although not shown in the drawings, the first current collector 60 may include a plurality of unevenness radially formed on a lower surface thereof. If the unevenness is formed, the unevenness may be pressed into the first uncoated region 11 by pressing the first current collector 60.

A flat portion approximately parallel to the inner surface of the closed portion of the battery can 20 may be formed in at least part of the bottom surface of the terminal 40, namely the bottom surface of the electric connection portion 42a of the terminal insert portion 42, and the first current collector 60 is coupled to the flat portion.

The first current collector 60 is coupled to an end of the first uncoated region 11. The coupling between the first uncoated region 11 and the first current collector 60 may be performed, for example, by laser welding. The laser welding may be performed by partially melting a base material of the first current collector 60, or may be performed in a state where a solder for welding is interposed between the first current collector 60 and the first uncoated region 11. In this case, the solder preferably has a lower melting point than the first current collector 60 and the first uncoated region 11.

The first current collector 60 may be coupled to a coupling surface of the first uncoated region 11, which is formed by bending an end of the first uncoated region 11 in a direction parallel to the first current collector 60. The bending direction of the first uncoated region 11 may be, for example, a direction toward the winding center C, namely core, of the electrode assembly 10. If the first uncoated region 11 has a bent shape as above, the space occupied by the first uncoated region 11 may be reduced, thereby improving energy density. In addition, as the coupling area between the first uncoated region 11 and the first current collector 60 increases, the coupling force may be improved and the resistance may be reduced.

Figure 11:
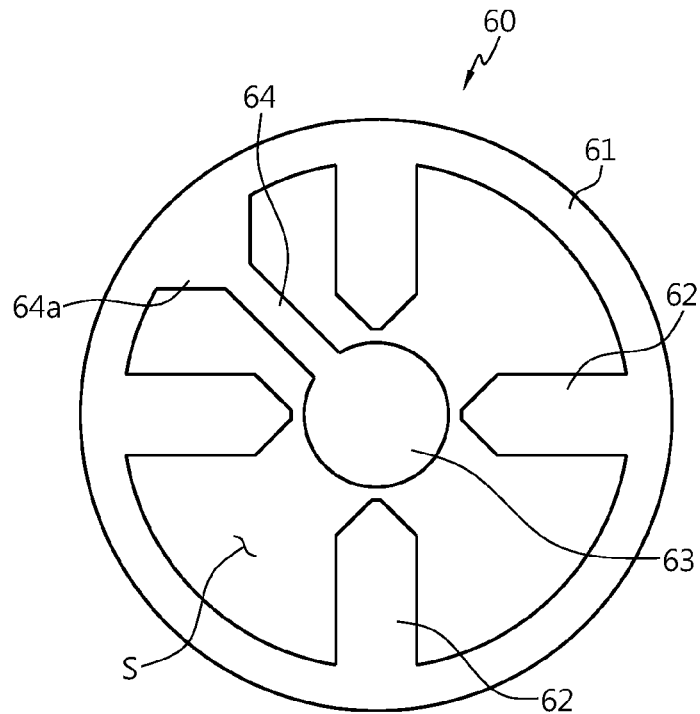
FIGS. 11 and 12 are diagrams showing the first current collector and an example form of the first current collector applied in the present disclosure.

An example form of the first current collector 60 of the present disclosure will be described with reference to FIG. 11 along with FIGS. 7 and 8. Referring to FIG. 11 along with FIGS. 7 and 8, the first current collector 60 applied to the present disclosure may include an edge portion 61, a first uncoated region coupling portion 62, and a terminal coupling portion 63. The edge portion 61 is disposed on the electrode assembly 10. The edge portion 61 may have a substantially rim shape having an empty space S formed therein. In the drawings of the present disclosure, only a case in which the edge portion 61 has a substantially circular rim shape is illustrated, but the present disclosure is not limited thereto. The edge portion 61 may have a substantially rectangular rim shape, a hexagonal rim shape, an octagonal rim shape, or other rim shapes, unlike the illustrated one.

The terminal coupling portion 63 may have a diameter substantially equal to or greater than the diameter of the flat portion formed on the bottom surface of the terminal 40 in order to secure a welding area for coupling with the flat portion formed on the bottom surface of the terminal 40.

The first uncoated region coupling portion 62 extends inward from the edge portion 61 and is coupled to the first uncoated region 11. The terminal coupling portion 63 is spaced apart from the first uncoated region coupling portion 62 and is located inside the edge portion 61. The terminal coupling portion 63 may be coupled to the terminal 40 by welding. The terminal coupling portion 63 may be located approximately at the center of the inner space, for example, surrounded by the edge portion 61. The terminal coupling portion 63 may be provided at a location corresponding to the hole formed at the winding center C of the electrode assembly 10. The terminal coupling portion 63 may be configured to cover the hole formed at the winding center C of the electrode assembly 10 so that the hole formed at the winding center C of the electrode assembly 10 is not exposed out of the terminal coupling portion 63. If the hole formed at the winding center C of the electrode assembly 10 is covered as above, it is possible to prevent that the separator positioned inside the hole is damaged due to the flow rate of the electrolyte passing through the hole and thus the electrode is leaked. To this end, the terminal coupling portion 63 may have a larger diameter or width than the hole formed at the winding center C of the electrode assembly 10.

The first uncoated region coupling portion 62 and the terminal coupling portion 63 may not be directly connected, but may be disposed to be spaced apart from each other and indirectly connected by the edge portion 61. Since the first current collector 60 has a structure in which the first uncoated region coupling portion 62 and the terminal coupling portion 63 are not directly connected to each other but are connected through the edge portion 61 as above, when shock and/or vibration occurs at the cylindrical battery 1, it is possible to disperse the shock applied to the coupling portion between the first uncoated region coupling portion 62 and the first uncoated region 11 and the coupling portion between the terminal coupling portion 63 and the terminal 40. In the drawings of the present disclosure, only a case in which four first uncoated region coupling portions 62 are provided is illustrated, but the present disclosure is not limited thereto. The number of the first uncoated region coupling portions 62 may be variously determined in consideration of manufacturing difficulty according to the complexity of the shape, electric resistance, the space inside the edge portion 61 considering electrolyte impregnation, and the like.

The first current collector 60 may further include a bridge portion 64 extending inward from the edge portion 61 and connected to the terminal coupling portion 63. At least a part of the bridge portion 64 may have a smaller sectional area compared to the first uncoated region coupling portion 62 and the edge portion 61. For example, at least a part of the bridge portion 64 may be formed to have a smaller width and/or thickness compared to the first uncoated region coupling portion 62. In this case, the electric resistance increases in the bridge portion 64, and thus when a current flows through the bridge portion 64, the relatively large resistance causes a part of the bridge portion 64 to be melted due to overcurrent heating, which irreversibly blocks the overcurrent. The sectional area of the bridge portion 64 may be adjusted to an appropriate level in consideration of the overcurrent blocking function.

The bridge portion 64 may include a taper portion 64a whose width is gradually decreased from the inner surface of the edge portion 61 toward the terminal coupling portion 63. When the taper portion 64a is provided, the rigidity of the component may be improved at the connection portion between the bridge portion 64 and the edge portion 61. When the taper portion 64a is provided, in the process of manufacturing the cylindrical battery 1, for example, a transfer device and/or a worker may easily and safely transport the first current collector 60 and/or a coupled body of the first current collector 60 and the electrode assembly 10 by gripping the taper portion 64a. That is, when the taper portion 64a is provided, it is possible to prevent product defects that may occur by gripping a portion where welding is performed with other components such as the first uncoated region coupling portion 62 and the terminal coupling portion 63.

The first uncoated region coupling portion 62 may be provided in plural. The plurality of first uncoated region coupling portions 62 may be disposed substantially at regular intervals from each other in the extending direction of the edge portion 61. An extension length of each of the plurality of first uncoated region coupling portions 62 may be substantially equal to each other. The first uncoated region coupling portion 62 may be coupled to the first uncoated region 11 by welding.

The terminal coupling portion 63 may be disposed to be surrounded by the plurality of first uncoated region coupling portions 62. The terminal coupling portion 63 may be coupled to the terminal 40 by welding. The bridge portion 64 may be positioned between a pair of first uncoated region coupling portions 62 adjacent to each other. In this case, the distance from the bridge portion 64 to any one of the pair of first uncoated region coupling portions 62 along the extending direction of the edge portion 61 may be substantially equal to the distance from the bridge portion 64 to the other one of the pair of first uncoated region coupling portions 62 along the extending direction of the edge portion 61. The plurality of first uncoated region coupling portions 62 may be formed to have substantially the same sectional area. The plurality of first uncoated region coupling portions 62 may be formed to have substantially the same width and thickness.

Although not shown in the drawings, the bridge portion 64 may be provided in plural. Each of the plurality of bridge portions 64 may be disposed between a pair of first uncoated region coupling portions 62 adjacent to each other. The plurality of bridge portions 64 may be disposed substantially at regular intervals to each other in the extending direction of the edge portion 61. A distance from each of the plurality of bridge portions 64 to one of the pair of first uncoated region coupling portions 62 adjacent to each other along the extending direction of the edge portion 61 may be substantially equal to a distance from each of the plurality of the bridge portion 64 to the other first uncoated region coupling portion 62.

In the case where the first uncoated region coupling portion 62 and/or the bridge portion 64 is provided in plural as described above, if the distance between the first uncoated region coupling portions 62 and/or the distance between the bridge portions 64 and/or the distance between the first uncoated region coupling portion 62 and the bridge portion 64 is uniformly formed, a current flowing from the first uncoated region coupling portion 62 toward the bridge portion 64 or a current flowing from the bridge portion 64 toward the first uncoated region coupling portion 62 may be smoothly formed.

Figure 12:
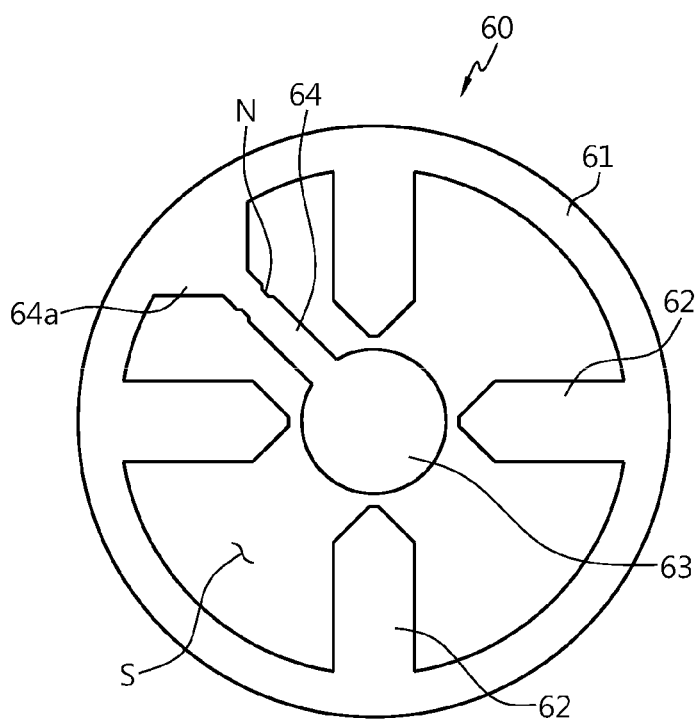

Meanwhile, the first current collector 60 and the first uncoated region 11 may be coupled by welding. In this case, for example, laser welding, ultrasonic welding, spot welding, or the like may be applied. Another example form of the first current collector 60 of the present disclosure will be described with reference to FIG. 12 along with FIGS. 7 and 8. Referring to FIG. 12 along with FIGS. 7 and 8, the bridge portion 64 may include a notching portion N formed to partially reduce a sectional area of the bridge portion 64. The sectional area of the notching portion N may be adjusted, for example, by partially reducing the width and/or thickness of the bridge portion 64. When the notching portion N is provided, electric resistance is increased in the region where the notching portion N is formed, thereby enabling rapid current interruption when overcurrent occurs.

In the case where the bridge portion 64 includes the taper portion 64a, the notching portion N may be located closer to the taper portion 64a than the terminal coupling portion 63. Heat is generated relatively more in the narrowest part of the taper portion 64*a*, and thus the notching portion N adjacent to the taper portion 64*a* may quickly cut off the overcurrent.

Meanwhile, the notching portion N is preferably provided in a region corresponding to the welding target region of the electrode assembly 10 described above in order to prevent foreign substances such as welding spatters generated during rupturing from flowing into the electrode assembly 10. This is because, in this region, the first uncoated region 11 maintains the maximum number of overlapping layers of segments and thus the overlapped segments may function as a mask. For example, the notching portion N may be provided at approximately the center in the radial direction of the electrode assembly 10.

Referring to FIGS. 6 to 8, the insulator 70 is provided between a top end of the electrode assembly 10 and the inner surface of the battery can 20 or between the first current collector 60 coupled to the upper portion of the electrode assembly 10 and the inner surface of the closed portion of the battery can 20. The insulator 70 prevents contact between the first uncoated region 11 and the battery can 20 and/or contact between the first current collector 60 and the battery can 20. The insulator 70 may also be interposed between a top end of the outer circumferential surface of the electrode assembly 10 and the sidewall of the battery can 20. That is, the insulator 70 may also be interposed between the uncoated region 11 and the sidewall of the battery can 20. The first current collector 60 may be a plate extending completely across the top of the outer circumferential surface of the electrode assembly 10. However, the present disclosure is not limited thereto, and the first current collector 60 may be formed to extend across the top of the outer circumferential surface of the electrode assembly 10 only partially.

If the cylindrical battery 1 according to an embodiment of the present disclosure includes the insulator 70, the terminal insert portion 42 of the terminal 40 is coupled to the first current collector 60 or the first uncoated region 11 through the insulator 70. The hole formed in the insulator 70 may be formed at a location corresponding to the hole formed at the winding center C of the electrode assembly 10. In addition, the hole formed in the insulator 70 may be formed at a location corresponding to the terminal coupling portion 63 of the first current collector 60.

Meanwhile, if the welding portion between the terminal 40 and the terminal coupling portion 63 of the first current collector 60 is located inside the hole formed at the winding center C of the electrode assembly 10, the electrode assembly 10 may be damaged. In order to prevent this, the flat portion formed at the lower end of the terminal 40 coupled to the terminal coupling portion 43 may be located substantially at the same height as the lower surface of the insulator 70 or located higher. In this case, the welding portion between the terminal 40 and the first current collector 60 is located outside the hole formed at the winding center C of the electrode assembly 10.

In consideration of this, the thickness of the insulator 70 may have a thickness substantially equal to or greater than the distance from the inner surface of the closed portion of the battery can 20 to the flat portion provided at the lower end of the terminal 40. Meanwhile, the insulator 70 may have a thickness corresponding to the distance between the inner surface of the closed portion of the battery can 20 and the first current collector 60 by filling the space between the inner surface of the closed portion of the battery can 20 and the first current collector 60 along the height direction so that a space where the electrode assembly 10 can move is not generated.

In another aspect, the upper surface of the insulator 70 may be in contact with the inner surface of the closed portion of the battery can 20, and the lower surface of the insulator 70 may be in contact with the upper surface of the first current collector 60.

Referring to FIG. 13, the second current collector 80 is disposed below the electrode assembly 10. In addition, the second current collector 80 may be configured to electrically connect the second uncoated region 12 of the electrode assembly 10 and the battery can 20. The second current collector 80 is made of a metal material with conductivity and is connected to the second uncoated region 12. In addition, the second current collector 80 is electrically connected to the battery can 20. The second current collector 80 may be interposed and fixed between the inner surface of the battery can 20 and the sealing gasket 90. More specifically, the second current collector 80 may be interposed between the lower surface of the beading portion 21 of the battery can 20 and the sealing gasket 90. However, the present disclosure is not limited thereto. Alternatively, the second current collector 80 may be welded to the inner wall surface of the battery can 20 in a region where the beading portion 21 is not formed.

Although not shown in the drawings, the second current collector 80 may include a plurality of unevenness radially formed on one surface thereof. If the unevenness is formed, the unevenness may be pressed into the second uncoated region 12 by pressing the second current collector 80.

The second current collector 80 is coupled to an end of the second uncoated region 12. The coupling between the second uncoated region 12 and the second current collector 80 may be performed, for example, by laser welding. The laser welding may be performed by partially melting a base material of the second current collector 80, or may be performed in a state where a solder for welding is interposed between the second current collector 80 and the second uncoated region 12. In this case, the solder preferably has a lower melting point than the second current collector 80 and the second uncoated region 12.

The second current collector 80 may be coupled to a coupling surface of the second uncoated region 12, which is formed by bending an end of the second uncoated region 12 in a direction parallel to the second current collector 80. The bending direction of the second uncoated region 12 may be, for example, a direction toward the winding center C, namely the core, of the electrode assembly 10. If the second uncoated region 12 has a bent shape as above, the space occupied by the second uncoated region 12 may be reduced, thereby improving energy density. In addition, as the coupling area between the second uncoated region 12 and the second current collector 80 increases, the coupling force may be improved and the resistance may be reduced.

Figure 15:
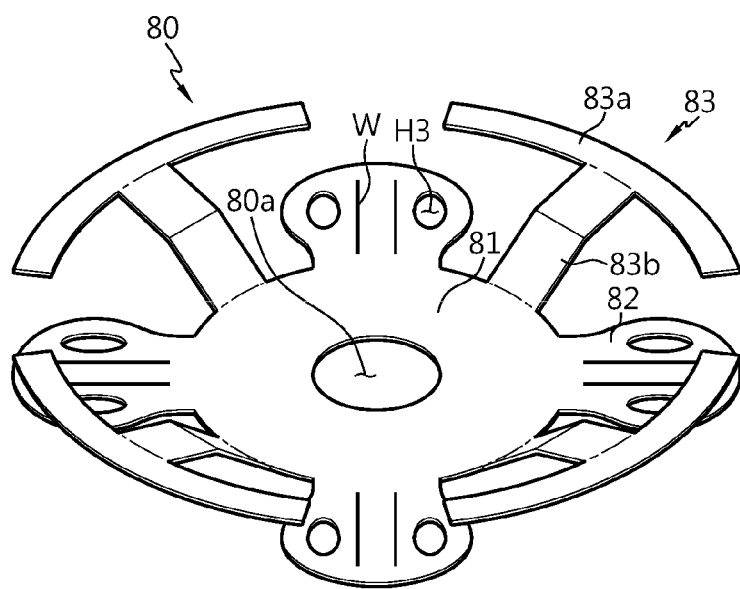
FIG. 15 is a diagram showing an example form of a second current collector applied in the present disclosure.

Referring to FIG. 15, an example form of the second current collector 80 of the present disclosure is shown. Referring to FIG. 15 along with FIG. 13, the second current collector 80 electrically connects the electrode assembly 10 and the battery can 20.

The second current collector 80 may include a support portion 81 disposed below the electrode assembly 10, a second uncoated region coupling portion 82 extending from the support portion 81 approximately along the radial direction of the electrode assembly 10 and coupled to the second uncoated region 12, and a can coupling portion 83 extending from the support portion 81 approximately along the radial direction of the electrode assembly 10 and coupled to the inner surface of the battery can 20. The second uncoated region coupling portion 82 and the can coupling portion 83 are indirectly connected through the support portion 81, and are not directly connected to each other. Therefore, when an external shock is applied to the cylindrical battery 1 of the present disclosure, it is possible to minimize the possibility of damage to the coupling portion of the second current collector 80 and the electrode assembly 10 and the coupling portion of the second current collector 80 and the battery can 20. However, the second current collector 80 of the present disclosure is not limited to the structure where the second uncoated region coupling portion 82 and the can coupling portion 83 are only indirectly connected. For example, the second current collector 80 may have a structure that does not include the support portion 81 for indirectly connecting the second uncoated region coupling portion 82 and the can coupling portion 83 and/or a structure in which the second uncoated region 12 and the can coupling portion 83 are directly connected to each other.

The support portion 81 and the second uncoated region coupling portion 82 are disposed below the electrode assembly 10. The second uncoated region coupling portion 82 is coupled to the second uncoated region 12 of the electrode assembly 10. In addition to the second uncoated region coupling portion 82, the support portion 81 may also be coupled to the second uncoated region 12. The second uncoated region coupling portion 82 and the second uncoated region 12 may be coupled by welding. The support portion 81 and the second uncoated region coupling portion 82 are located higher than the beading portion 21 when the beading portion 21 is formed on the battery can 20.

The support portion 81 has a current collector hole 80a formed at a location corresponding to the hole formed at the winding center C of the electrode assembly 10. The hole of the electrode assembly 10 and the current collector hole 80a communicating with each other may function as a passage for inserting a welding rod for welding between the terminal 40 and the terminal coupling portion 63 of the first current collector 60 or for irradiating a laser beam. The current collector hole 80a may have a diameter substantially equal to or greater than the hole formed at the winding center C of the electrode assembly 10. When the second uncoated region coupling portion 82 is provided in plural, the plurality of second uncoated region coupling portions 82 may have a shape extending approximately radially from the support portion 81 of the second current collector 80 toward the sidewall of the battery can 20. Each of the plurality of second uncoated region coupling portions 82 may be positioned to be spaced apart from each other along the periphery of the support portion 81. Meanwhile, in order to secure coupling force and reduce electrical resistance by increasing the coupling area between the second current collector 80 and the electrode assembly 10, not only the second uncoated region coupling portion 82 but also the support portion 81 may be coupled to the second uncoated region 12. At least a part of the second uncoated region 12 may be formed in a bent shape such that an end thereof is substantially parallel to the second uncoated region coupling portion 82. In this case, the second uncoated region 12 may be bent toward the winding center C of the electrode assembly 10, for example. If the end of the second uncoated region 12 is formed as above and coupled to the second uncoated region coupling portion 82 in a state of being parallel to the second uncoated region coupling portion 82, the coupling area is increased, thereby improving coupling force and reducing electric resistance. In addition, by minimizing the total height of the electrode assembly 10, the energy density may be improved. Meanwhile, the bent end of the second uncoated region 12 may be overlapped in multiple layers. If the second uncoated region 12 may be overlapped in multiple layers, the second uncoated region coupling portion 82 of the second current collector 80 may be coupled to a region where the second uncoated region 12 is bent and overlapped in multiple layers.

The can coupling portion 83 may be provided in plural. In this case, the plurality of can coupling portions 83 may have a shape extending approximately radially from the center of the second current collector 80 toward the sidewall of the battery can 20. Accordingly, the electrical connection between the second current collector 80 and the battery can 20 may be made at a plurality of points. Since the coupling for electrical connection is made at a plurality of points, the coupling area may be maximized, thereby minimizing electric resistance. The plurality of can coupling portions 83 may be positioned to be spaced apart from each other along the periphery of the support portion 81. At least one can coupling portion 83 may be positioned between the second uncoated region coupling portions 82 adjacent to each other. The plurality of can coupling portions 83 may be coupled to, for example, the beading portion 21 in the inner surface of the battery can 20. The can coupling portions 83 may be coupled, particularly, to the lower surface of the beading portion 21. If this structure is applied to the cylindrical battery 1 of the present disclosure, the can coupling portion 83 may be naturally placed on the lower surface of the beading portion 21 through the process of accommodating the electrode assembly 10 coupled with the second current collector 80 into the battery can 20. Therefore, the battery can 20 and the second current collector 80 may be welded easily. The welding for bonding the battery can 20 and the current collector 80 may use, for example, laser welding, ultrasonic welding, or spot welding. By coupling the can coupling portion 83 on the beading portion 21 by welding in this way, the resistance level may be limited to about 4 milliohms or less, and above about 0.5 milliohms. In addition, as the lower surface of the beading portion 21 has a shape extending in a direction approximately parallel to the upper surface of the battery can 20, namely in a direction approximately perpendicular to the sidewall of the battery can 20, and the can coupling portion 83 also has a shape extending in the same direction, namely in the radial direction and the circumferential direction, the can coupling portion 83 may be stably in contact with the beading portion 21. In addition, as the can coupling portion 83 is stably in contact with the flat portion of the beading portion 21, the two components may be welded smoothly, thereby improving the coupling force between the two components and minimizing the increase in resistance at the coupling portion.

The can coupling portion 83 may include a contact portion 83a coupled onto the inner surface of the battery can 20 and a connection portion 83b for connecting the support portion 81 and the contact portion 83a.

The contact portion 83a is coupled onto the inner surface of the battery can 20. In the case where the beading portion 21 is formed on the battery can 20, the contact portion 83a may be coupled onto the beading portion 21 as described above. More specifically, the contact portion 83a may be electrically coupled to the flat portion formed at the lower surface of the beading portion 21 formed on the battery can 20, and may be interposed between the lower surface of the beading portion 21 and the sealing gasket 90. In this case, for stable contact and coupling, the contact portion 83a may have a shape extending from the beading portion 21 by a predetermined length along the circumferential direction of the battery can 20.

Meanwhile, the maximum distance from the center of the second current collector 80 to the end of the second uncoated region coupling portion 82 along the radial direction of the electrode assembly 10 is preferably substantially equal to or smaller than the inner diameter of the battery can 20 in a region where the beading portion 21 is formed, namely the minimum inner diameter of the battery can 20. This is to prevent interference from occurring between the second current collectors 80 by the beading portion 21 during the sizing process for compressing the battery can 20 along the height direction, and thus to prevent the electrode assembly 10 from being pressed by the second current collector.

Referring to FIGS. 16 to 19, the structure of the electrode assembly 10 will be described in more detail. In the following description, the first electrode will be described as an example among the first and second electrodes described above, but the structure of the first electrode may be equally applied to the second electrode.

Figure 16:
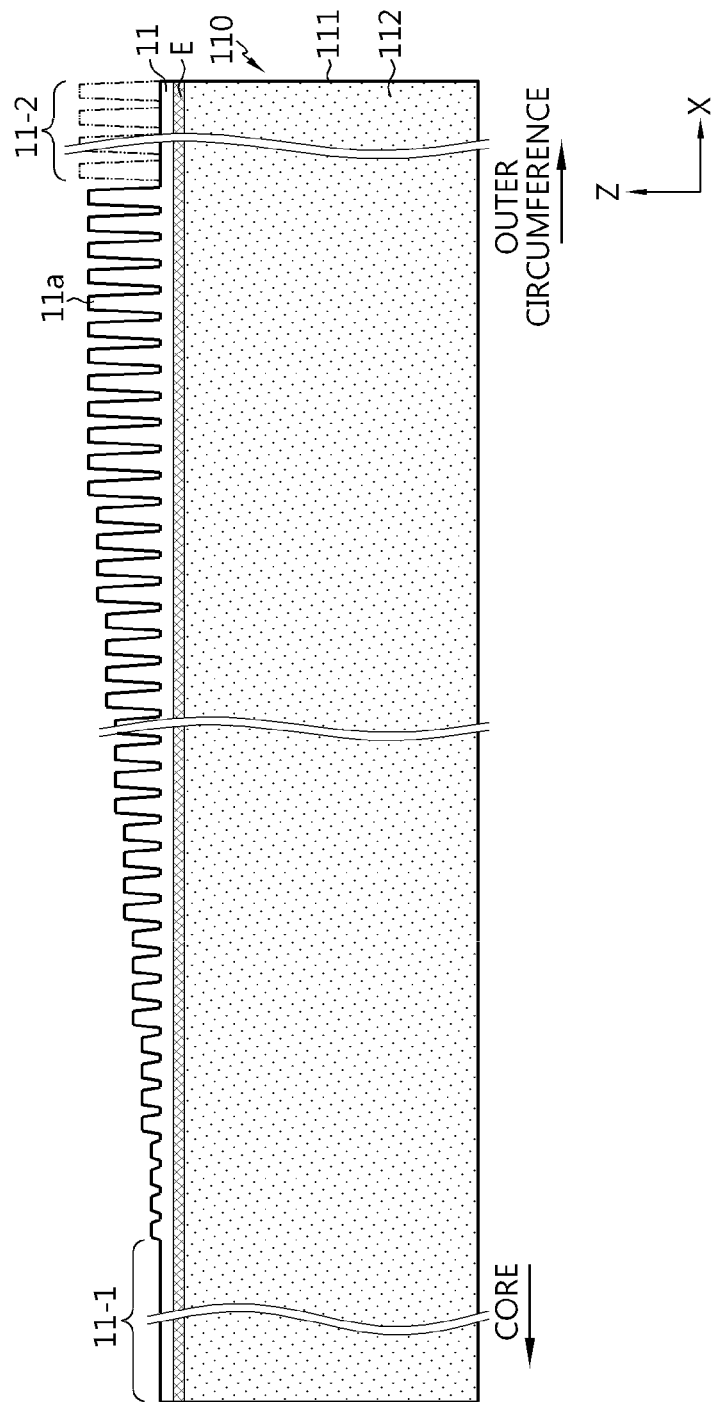
FIG. 16 is a plan view exemplarily showing an electrode structure according to an example embodiment of the present disclosure.
Figure 17:
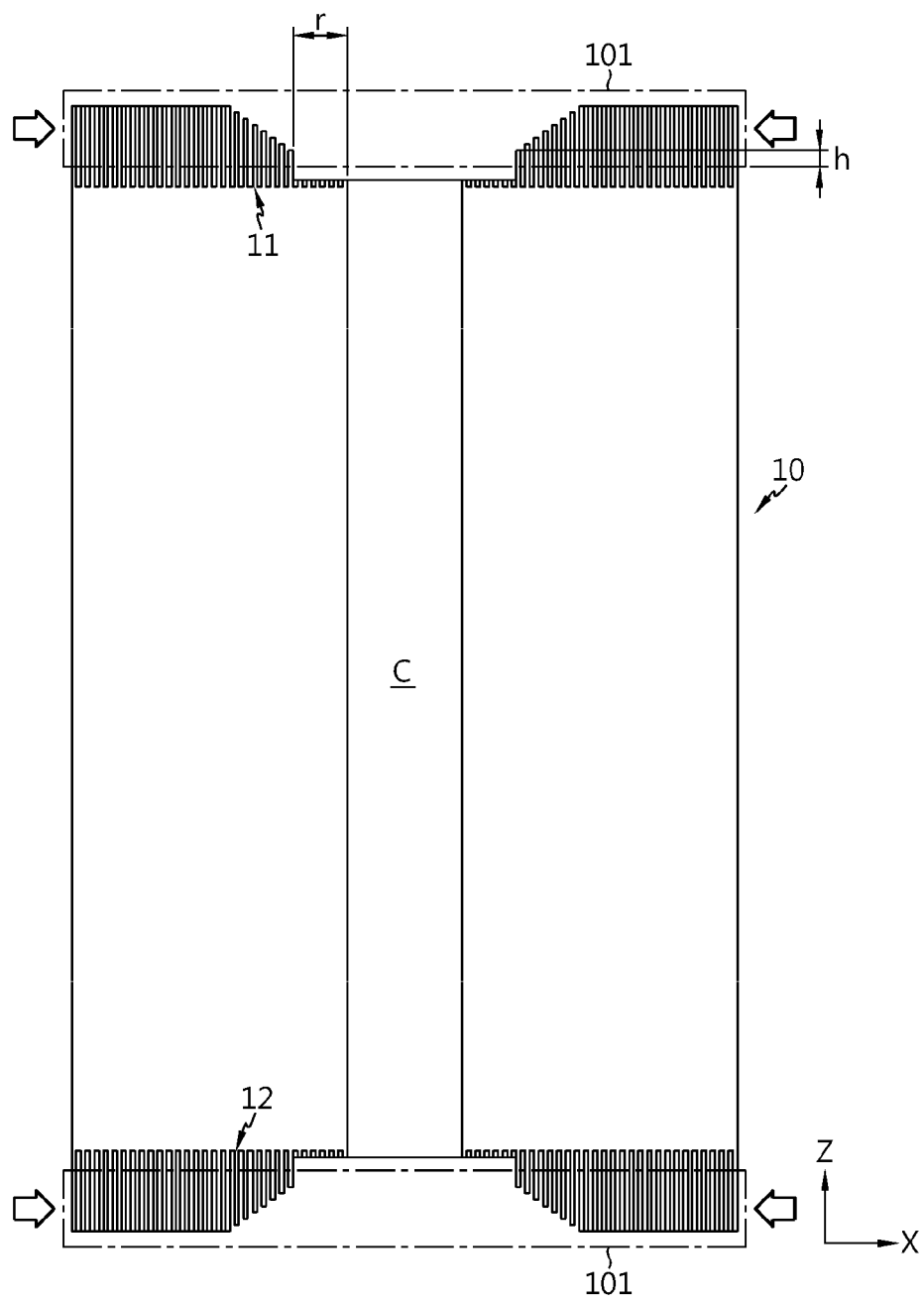
FIG. 17 is a sectional view showing an electrode assembly in which an uncoated region segmentation structure of a first electrode according to an embodiment of the present disclosure is also applied to a second electrode, taken along the longitudinal direction Z.
Figure 18:
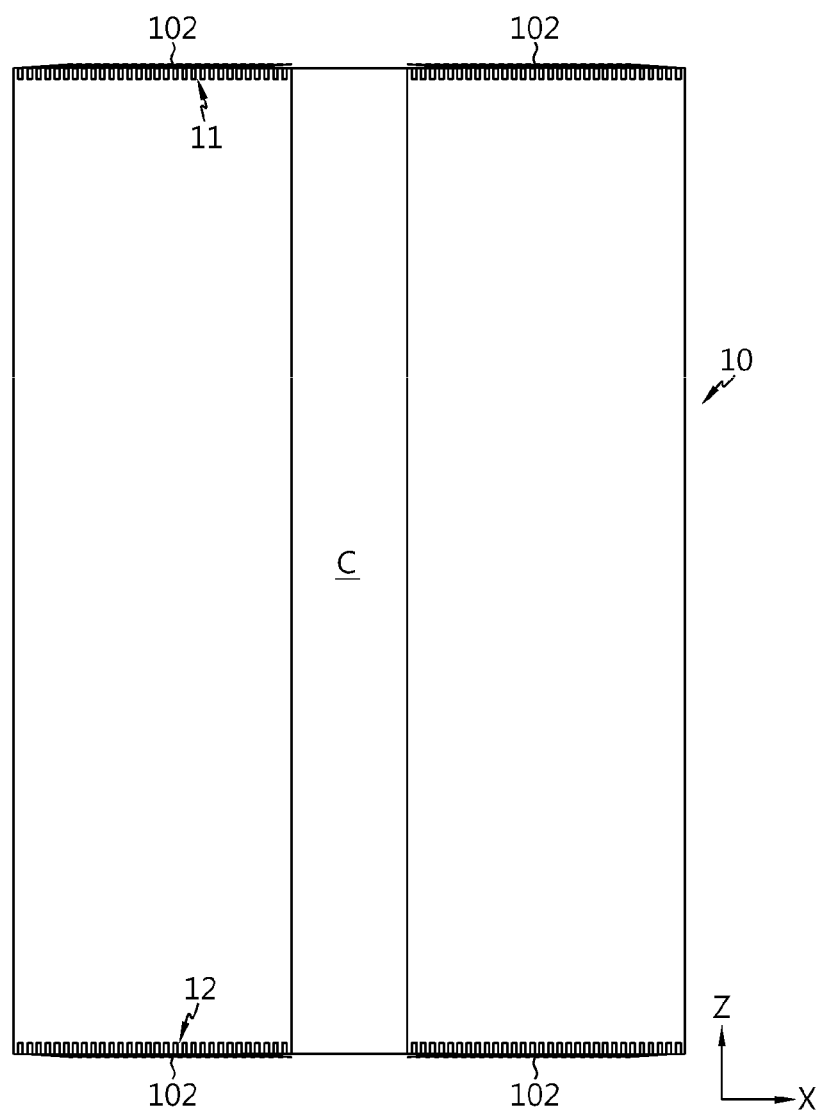
FIG. 18 is a sectional view showing an electrode assembly in which the uncoated region is bent according to an embodiment of the present disclosure, taken along the longitudinal direction Z.
Figure 19:
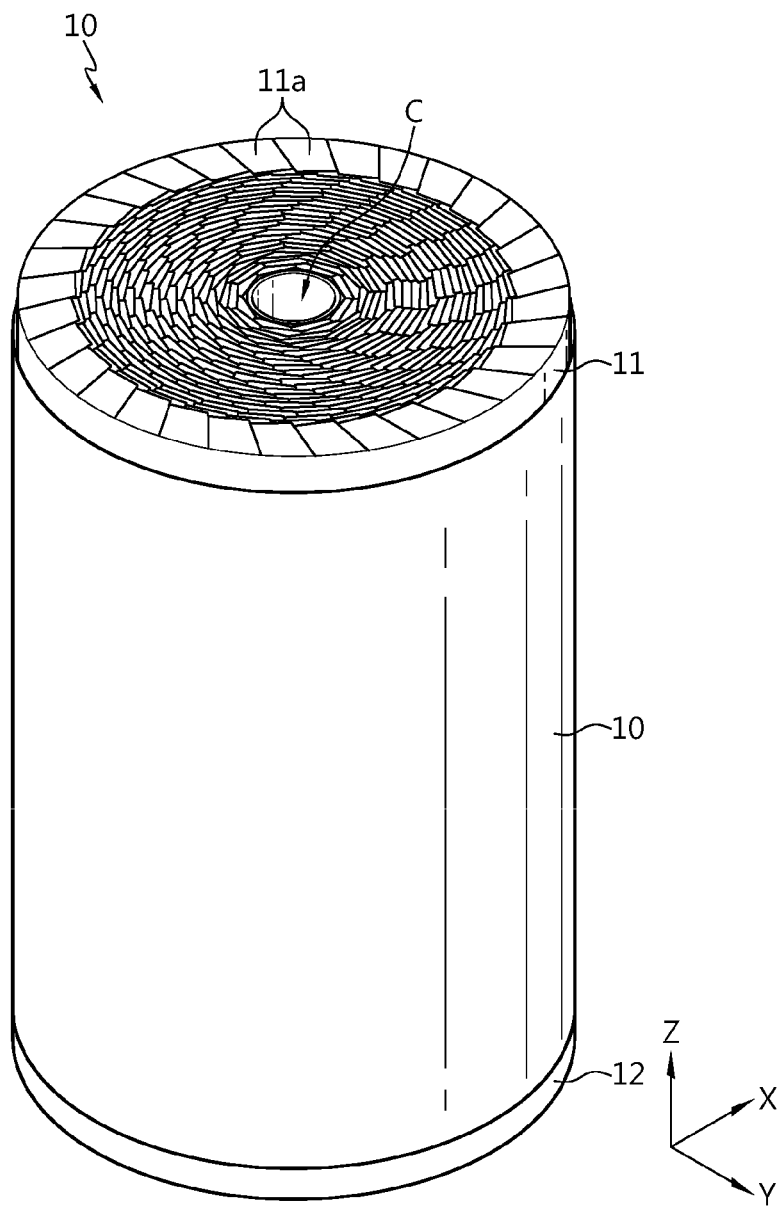
FIG. 19 is a perspective view showing an electrode assembly in which the uncoated region is bent according to an embodiment of the present disclosure.

Referring to FIGS. 16 and 17, the first electrode 110 includes a first electrode current collector 111 having a sheet shape made of a conductive foil, a first active material layer 112 formed on at least one surface of the first electrode current collector 111, and a first uncoated region 11 formed by not coating an active material at a long side end of the first electrode current collector 111.

Preferably, the first uncoated region 11 may include a plurality of notched segments 11a. The plurality of segments 11a constitutes a plurality of groups, and the segments 11a included in each group may be identical in terms of the height (length in the Y-axis direction) and/or the width (length in the X-axis direction) and/or the separation pitch. The number of segments 11a belonging to each group may be increased or decreased than shown in the drawings. The segment 11a has a geometric shape in which at least one straight line and/or at least one curve are combined. Preferably, the segment 11a may have a trapezoidal shape, and may be deformed into a rectangular, parallelogram, semicircular or a semi-elliptical shape.

Preferably, the height of the segment 11a may be increased stepwise along one direction parallel to the winding direction of the electrode assembly 10, for example, from the core toward the outer circumference. Also, a core-side uncoated region 11-1 adjacent to the core of the electrode assembly 10 may not include the segment 11a, and the core-side uncoated region 11-1 may have a lower height than the uncoated region of other regions. In addition, an outer circumferential uncoated region 11-2 adjacent to the outer circumference of the electrode assembly 10 may not include the segment 11a, and the outer circumferential uncoated region 11-2 may have a lower height than other uncoated regions.

Optionally, the first electrode 110 may include an insulation coating layer E that covers a boundary between the active material layer 112 and the first uncoated region 11. The insulation coating layer E includes a polymer resin having an insulation property, and may optionally further include an inorganic filler. The insulation coating layer E may function to prevent the end of the active material layer 112 from contacting an active material layer having an opposite polarity facing through the separator, and to structurally support the bending of the segment 11a. To this end, when the first electrode 110 is wound to form the electrode assembly 10, at least a part of the insulation coating layer E is preferably exposed from the separator to the outside.

Figure 1:
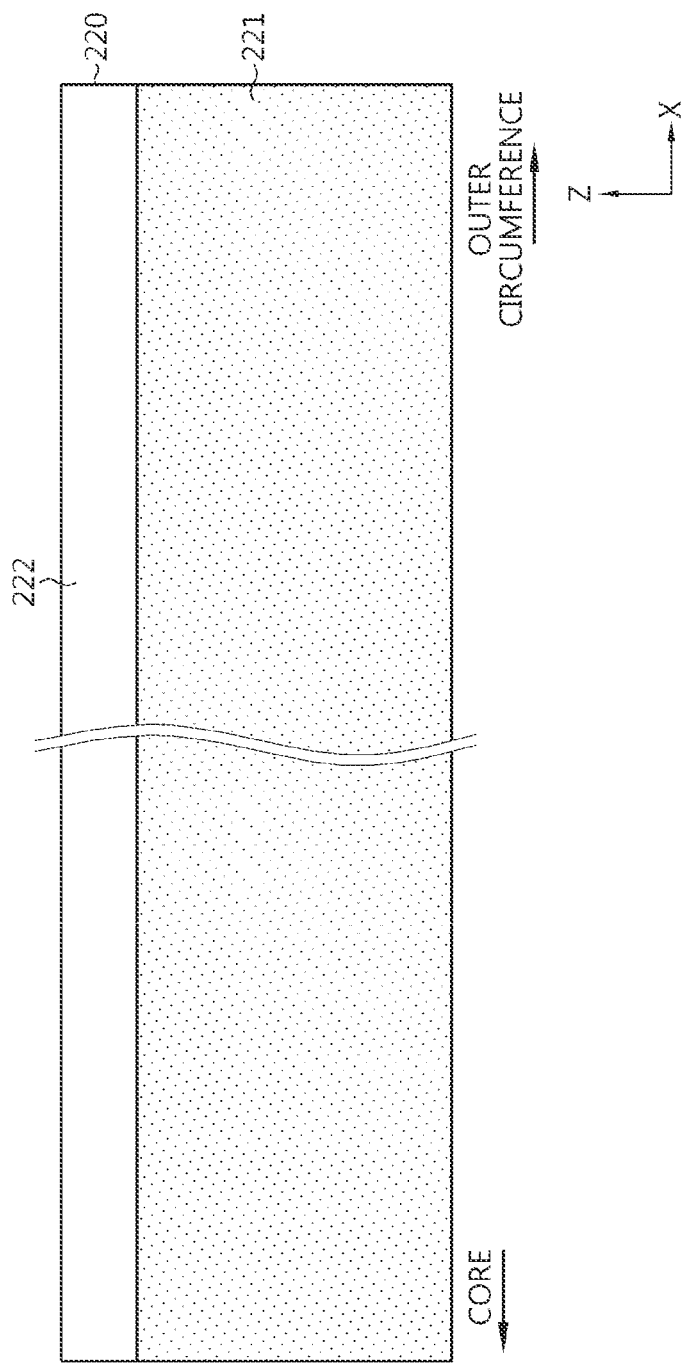
FIG. 1 is a plan view showing a structure of an electrode used for a conventional tab-less cylindrical battery.
Figure 2:
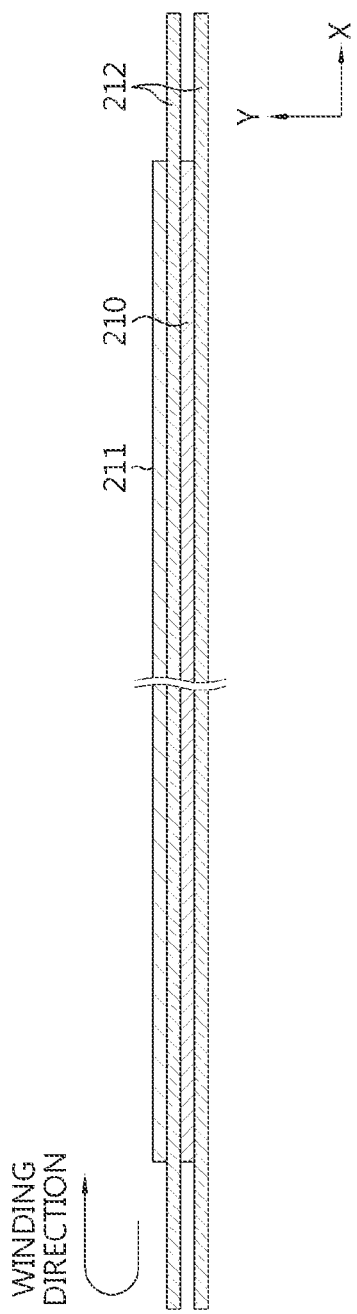
FIG. 2 is a diagram showing a process of winding an electrode assembly included in the conventional tab-less cylindrical battery.
Figure 3:
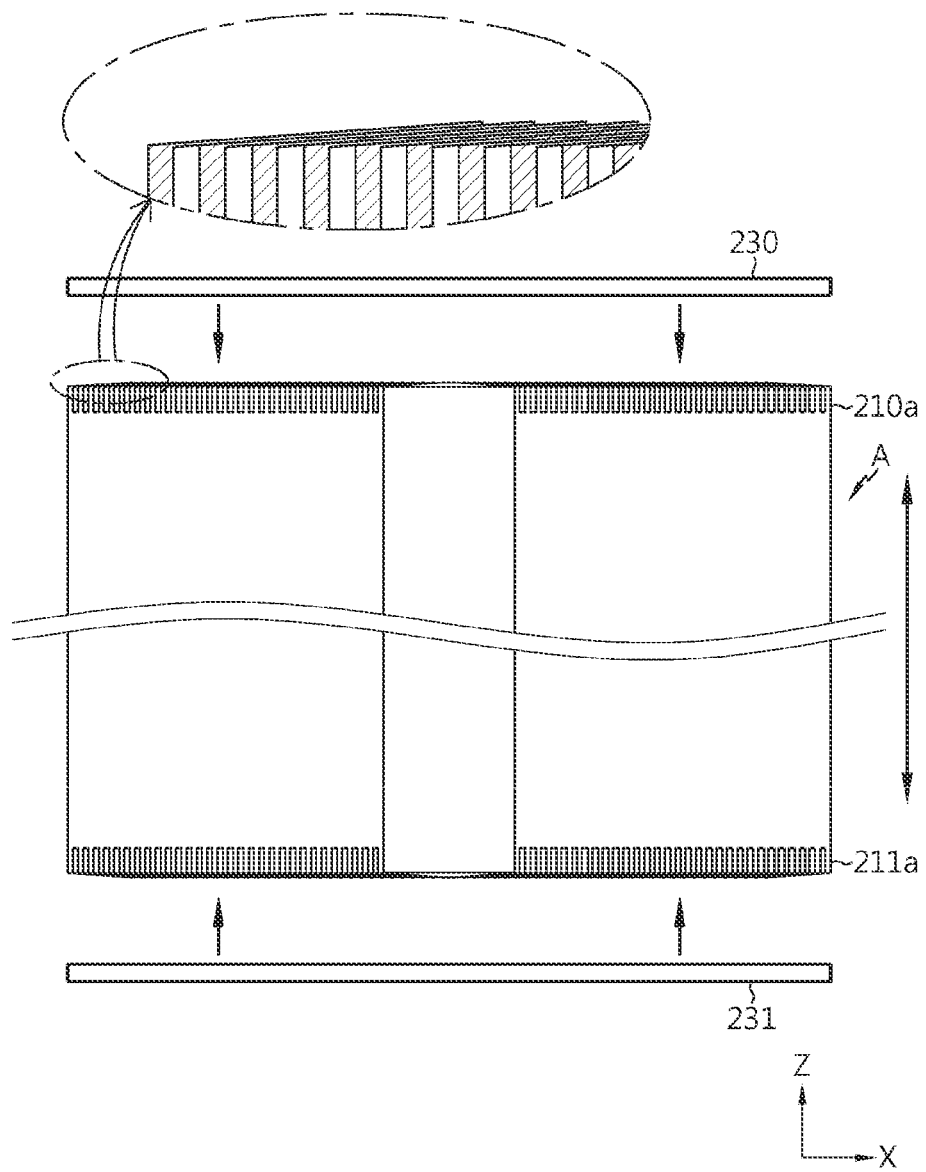
FIG. 3 is a diagram showing a process of welding a current collector to a bent surface of an uncoated region in the electrode assembly of FIG. 2.
Figure 4:
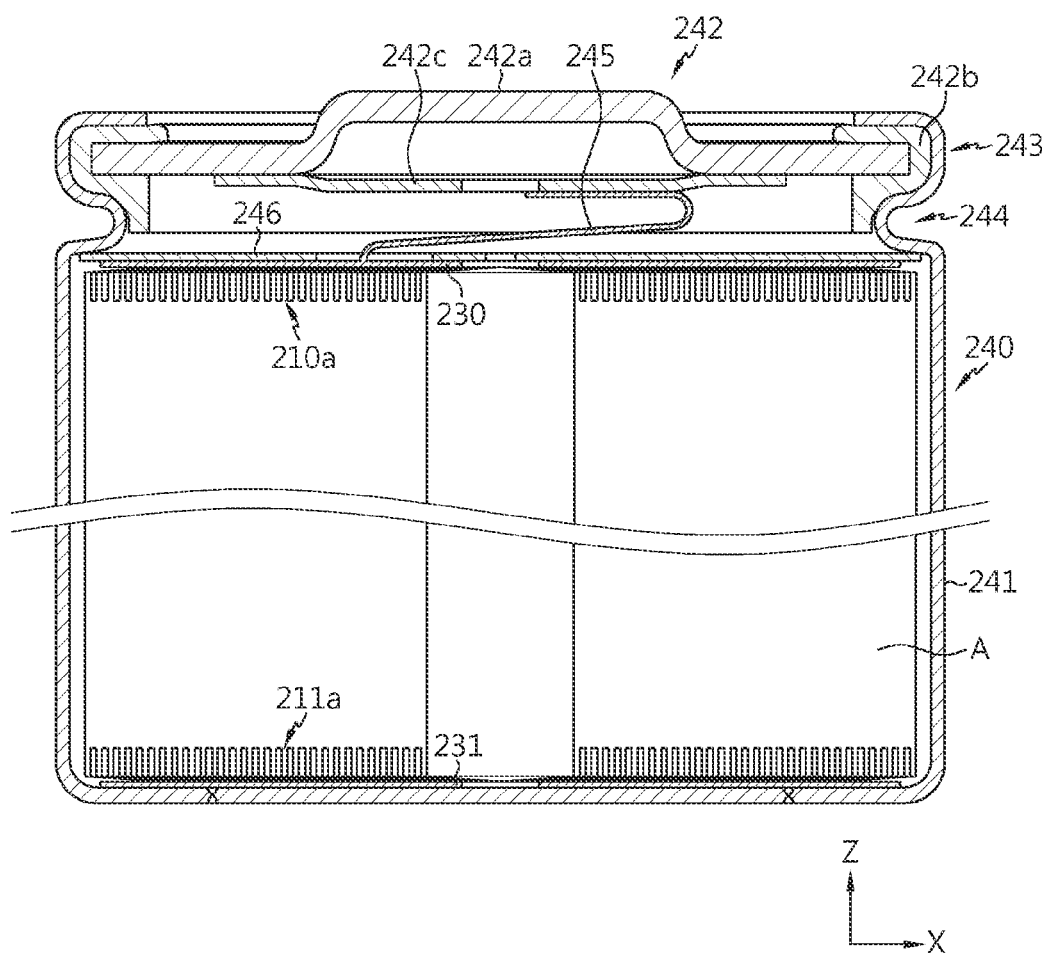
FIG. 4 is a sectional view showing a conventional tab-less cylindrical battery, taken along a longitudinal direction Z.

Referring to FIGS. 16 and 17, the electrode assembly 10 may be manufactured by the winding method described above with reference to FIG. 2. For convenience of explanation, the protruding structures of the uncoated regions 11, 12 extending out of the separator are illustrated in detail, and the winding structures of the first electrode, the second electrode and the separator are not illustrated. The first uncoated region 11 protruding upward extends from the first electrode, and the second uncoated region 12 protruding downward extends from the second electrode.

The pattern in which the heights of the uncoated regions 11, 12 change are schematically shown. That is, the heights of the uncoated regions 11, 12 may vary irregularly depending on the location where the cross section is cut. For example, if a side portion of the trapezoidal segment 11a is cut, the height of the uncoated region in the cross section is lower than the height of the segment 11a. Therefore, it should be understood that the heights of the uncoated regions 11, 12 shown in the drawings showing the cross section of the electrode assembly 10 correspond to the average of the heights of the uncoated regions included in each winding turn.

Referring to FIGS. 16 to 19, the uncoated regions 11, 12 may be bent along the radial direction of the electrode assembly 10, for example from the outer circumference toward the core. In the uncoated regions 11, 12, the region where the bending occurs is indicated by a dotted line box in FIG. 17. When the uncoated regions 11, 12 are bent, bent surfaces 102 are formed on the upper and lower portions of the electrode assembly 10 as segments adjacent in the radial direction are overlapped in multiple layers. At this time, the core-side uncoated region 11-1 (FIG. 16) is not bent due to its low height, and the height h of the segment 11a, which is bent at the innermost side, is equal to or smaller than the radial length R of the winding area formed by the core-side uncoated region 11-1 without a segment structure. Therefore, the hole formed at the core C of the electrode assembly 10 is not closed. The hole is not closed, there is no difficulty in the electrolyte injection process, and the electrolyte injection efficiency may be improved. In addition, by inserting a welding tool through the hole, it is possible to easily weld the terminal 40 and the first current collector 60 (see FIG. 7).

Meanwhile, the cylindrical battery 1 according to an embodiment of the present disclosure has a structure in which the cap 30 does not necessarily have polarity, as described above. When the cap 30 has no polarity, the second current collector 80 is connected to the sidewall of the battery can 20, and thus the outer surface 20a of the closed portion of the battery can 20 has a polarity opposite to the terminal 40. Therefore, when a plurality of cylindrical batteries 1 are to be connected in series and/or in parallel, the wiring work such as connecting a bus bar may be formed at the upper portion of the cylindrical battery 1 using the terminal 40 and the outer surface 20a of the closed portion of the battery can 20. Through this, energy density may be improved by increasing the number of cylindrical batteries 1 that can be mounted in the same space, and electrical wiring may be easily performed. That is, in the cylindrical battery 1 according to the present disclosure, the terminal 40 exposed out of the battery can 20 may function as a first electrode terminal, and the region of the outer surface 20a of the closed portion of the battery can 20 occupied by the exposed surface approximately parallel to the upper surface of the first electrode terminal may function as a second electrode terminal. Accordingly, when the plurality of cylindrical batteries 1 are to be electrically connected, a first bus bar may be coupled to the upper surface of the terminal 40 exposed out of the battery can 20, and a second bus bar may be coupled to the region of the outer surface 20a of the closed portion of the battery can 20 occupied by the exposed surface approximately parallel to the upper surface of the first electrode terminal.

Figure 20:
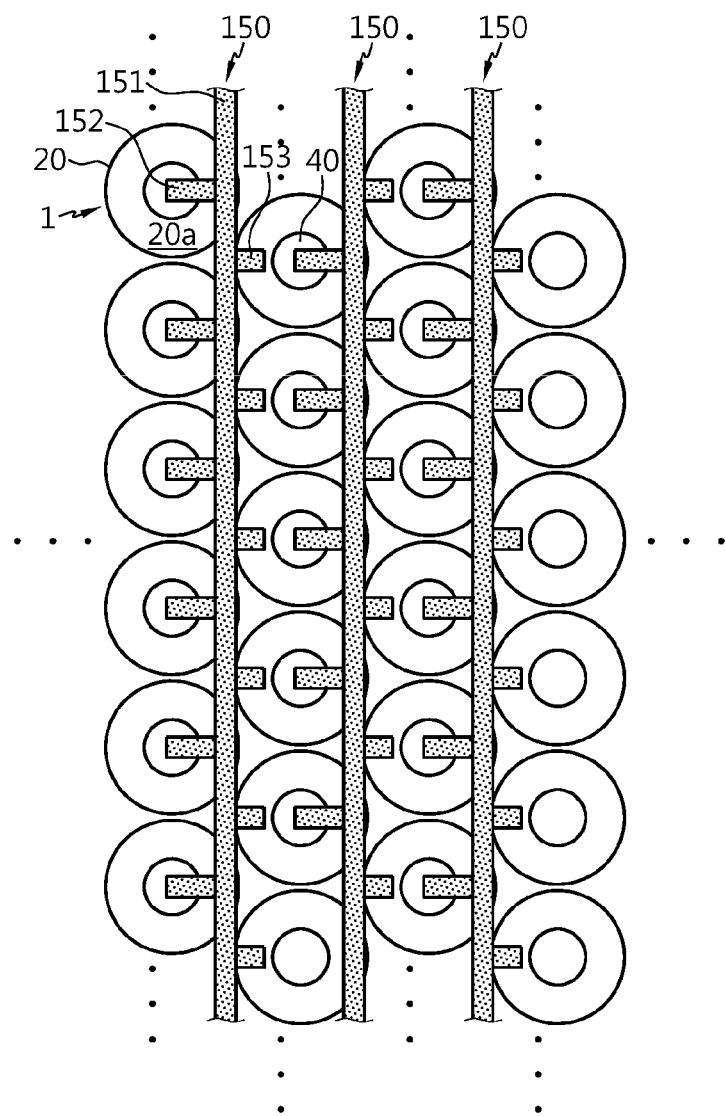
FIG. 20 is a top plan view showing that a plurality of cylindrical batteries according to the present disclosure are connected in series and in parallel using a bus bar.

Referring to FIG. 20, a plurality of cylindrical batteries 1 may be connected in series and in parallel on top of the cylindrical batteries 1 using a bus bar 150. The number of cylindrical batteries 1 may be increased or decreased in consideration of the capacity of the battery pack.

In each cylindrical battery 1, the terminal 40 may have a positive polarity and the outer surface 20a of the closed portion of the battery can 20 may have a negative polarity, or vice versa.

Preferably, the plurality of cylindrical batteries 1 may be arranged in a plurality of columns and rows. Columns are provided in a vertical direction with respect to the ground, and rows are provided in a left and right direction with respect to the ground. In addition, in order to maximize space efficiency, the cylindrical batteries 1 may be arranged in a closest packing structure. The closest packing structure is formed when an equilateral triangle is formed by connecting the centers of the terminal exposing portions 41 of the terminal 40 exposed out of the battery can 20 to each other. Preferably, the bus bar 150 may be disposed on the plurality of cylindrical batteries 1, more preferably between neighboring rows. Alternatively, the bus bar 150 may be disposed between neighboring rows.

Preferably, the bus bar 150 connects the cylindrical batteries 1 arranged in the same column in parallel to each other, and connects the cylindrical batteries 1 arranged in two neighboring columns in series with each other.

Preferably, the bus bar 150 may include a body portion 151, a plurality of first bus bar terminals 152 and a plurality of second bus bar terminals 153 for serial and parallel connection.

The body portion 151 may extend between terminals 40 of neighboring cylindrical batteries 70, preferably between rows of the cylindrical batteries 1. Alternatively, the body portion 151 may extend along the row of the cylindrical batteries 1 and may be regularly bent like a zigzag shape.

The plurality of first bus bar terminals 152 may protrusively extend from one side of the body portion 151 toward the terminal 40 of each cylindrical battery 1 and may be electrically coupled to the terminal 40. The electrical connection between the first bus bar terminal 152 and the terminal 40 may be accomplished by laser welding, ultrasonic welding, or the like. Also, the plurality of second bus bar terminals 153 may be electrically coupled to the outer surface 20a of each cylindrical battery 1 from the other side of the body portion 151. The electrical connection between the second bus bar terminal 153 and the outer surface 20a may be achieved by laser welding, ultrasonic welding, or the like.

Preferably, the body portion 151, the plurality of first bus bar terminals 152 and the plurality of second bus bar terminals 153 may be made of one conductive metal plate. The metal plate may be, for example, an aluminum plate or a copper plate, but the present disclosure is not limited thereto. In a modified example, the body portion 151, the plurality of first bus bar terminals 152 and the second bus bar terminals 153 may be manufactured as separate pieces and then coupled to each other by welding or the like.

In the cylindrical battery 1 according to the present disclosure, since the terminal 40 having a positive polarity and the outer surface 20a of the closed portion of the battery can 20 having a negative polarity are located in the same direction, the cylindrical batteries 1 may be electrically connected easily using the bus bar 150.

In addition, since the terminal 40 of the cylindrical battery 1 and the outer surface 20a of the closed portion of the battery can 20 have large areas, the coupling area of the bus bar 150 may be sufficiently secured to sufficiently lower the resistance of the battery pack including the cylindrical battery 1.

Figure 21:
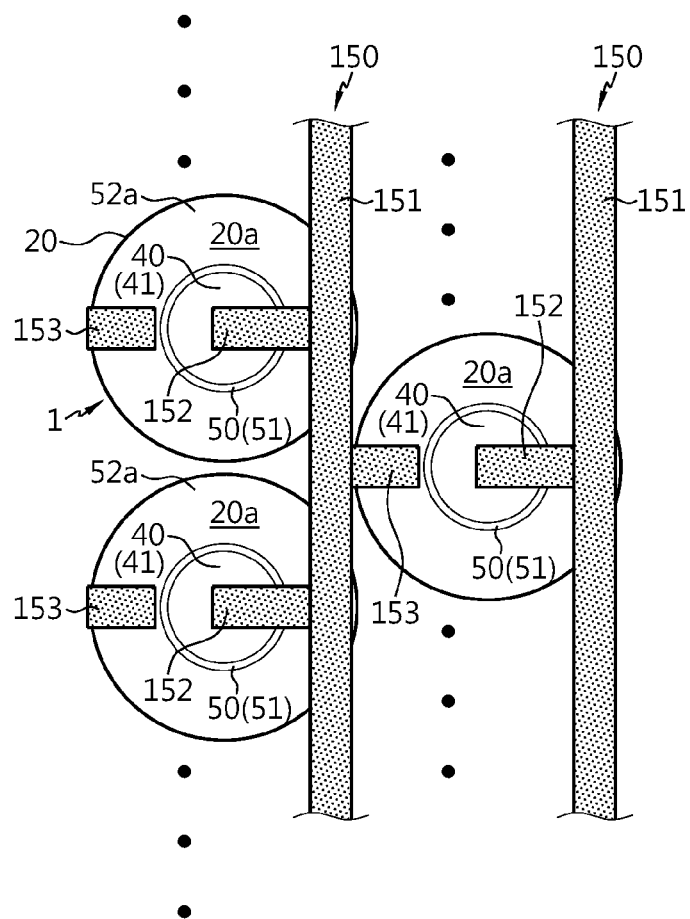
FIG. 21 is a partially enlarged view of FIG. 20.
Figure 22:
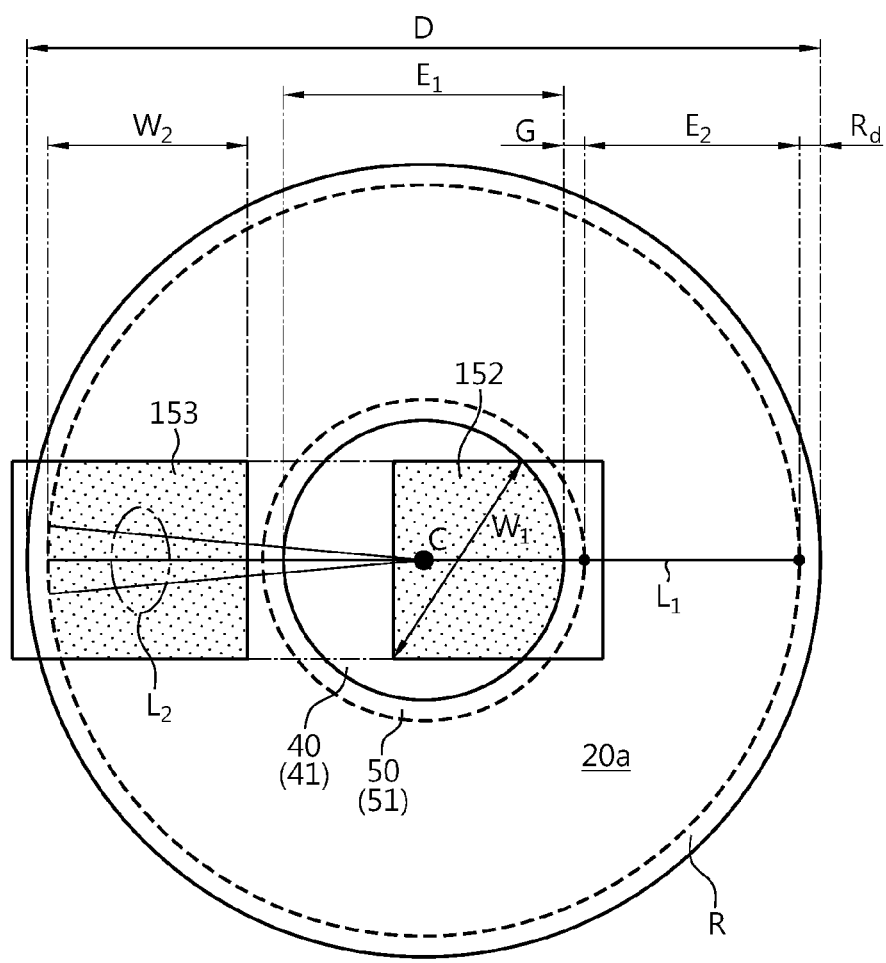
FIGS. 22 and 23 are diagrams exemplarily showing parameters used to define a diameter of the electrode terminal and an exposure width of an outer surface of a bottom of the battery can according to an embodiment of the present disclosure.
Figure 23:
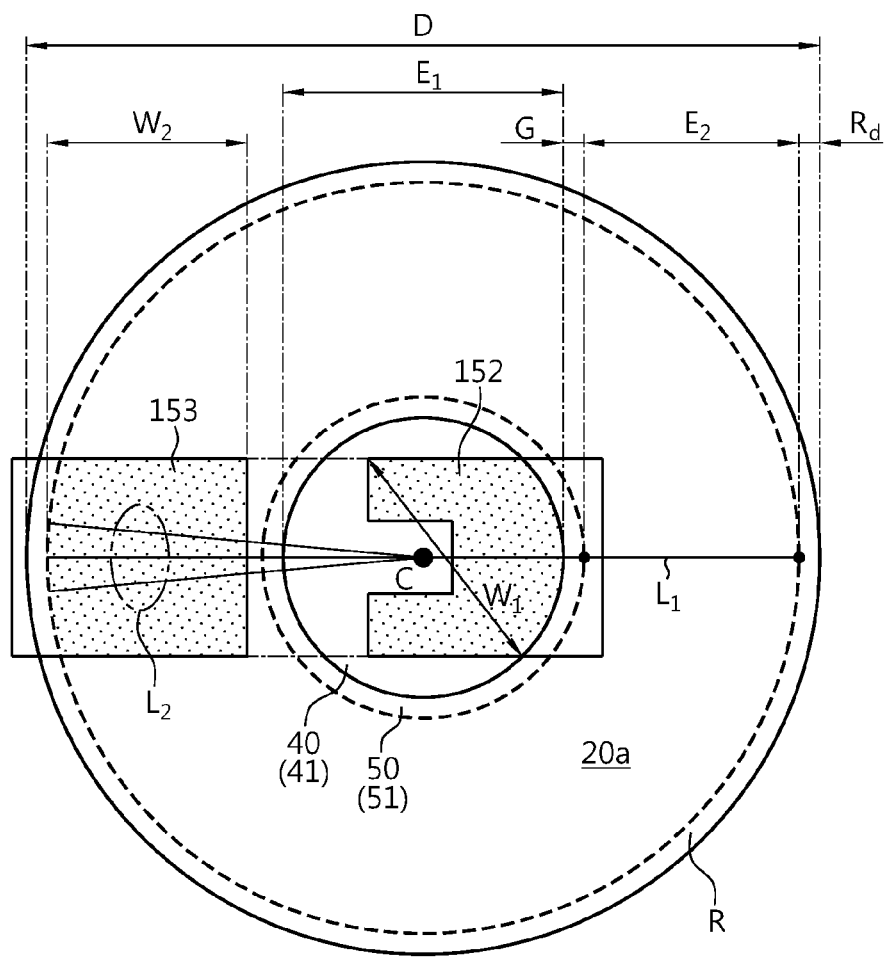

Referring to FIGS. 21 to 23, in the cylindrical battery 1, the diameter ($E_1$) of the electrode terminal 40 and the width ($E_2$) of the outer surface 20a having a ring shape may be adaptively adjusted in consideration of the dimensions of the contact areas of the bus bar terminals 152, 153.

Here, the width ($E_2$) of the outer surface 20a of the closed portion of the battery can 20 is the width of the exposed surface parallel to the surface of the electrode terminal 40. Specifically, the width ($E_2$) of the outer surface 20a is defined as the width of a line segment connecting two points where the straight line ($L_1$) drawn in the radial direction from the center C of the electrode terminal 40 intersects inner and outer boundaries of the outer surface 20. The width ($E_2$) of the outer surface 20a is the width of the flat exposed surface in the entire upper surface of the battery can 20, excluding the round region R existing at the edge of the closed portion of the battery can 20 and the gasket exposing portion 51 of the insulating gasket 50.

The closed portion of the battery can 20 may be divided into the terminal 40, the gasket exposing portion 51 of the insulating gasket 50, and the round region R formed at the edge of the outer surface 20a of the closed portion, when viewed from above. The round region R is a processing region (see FIGS. 7 and 8) for smoothly connecting the closed portion of the battery can 20 and the sidewall of the battery can 20, and has a predetermined width ($R_d$) on a plane.

The first bus bar terminal 152 of the bus bar 150 is branched to one side different from the traveling direction of the body portion 151 and is electrically coupled to the terminal exposing portion 41 of the terminal 40. At this time, the electrode terminal 40 and the first bus bar terminal 152 form a first overlapping region (marked by hatching) on a plane, and the first overlapping region has a first width ($W_1$). Here, the first overlapping region is a region where the electrode terminal 40 and the first bus bar terminal 152 overlap on a plane.

The first width ($W_1$) is defined as a maximum value among distances between any two points selected at the edge of the first overlapping region. The definition of the first width ($W_1$) is applied equally to the case where the first overlapping region includes the center of the terminal 40 (FIG. 22) and the case where the first overlapping region does not include the center of the terminal 40 (FIG. 23). Referring to FIGS. 22 and 23, the distance indicated by $W_1$ corresponds to a maximum value among distances between any two points selected at the edge of the first overlapping region.

The second bus bar terminal 153 of the bus bar 150 extends in a direction opposite to the first bus bar terminal 152 based on the traveling direction of the body portion 151 and is electrically coupled to the outer surface 20a of the closed portion of the battery can 20. At this time, the second bus bar terminal 153 and the outer surface 20a form a second overlapping region (marked by hatching) on a plane, and the second overlapping region has a second width ($W_2$). Here, the second overlapping region is a region where the outer surface 20a and the second bus bar terminal 153 overlap on a plane.

The second width ($W_2$) is defined as a maximum value among distances between two points where each straight line meets an edge of the second overlapping region, when a plurality of straight lines ($L_2$) are drawn from the center C of the terminal exposing portion 41 of the terminal 40 to pass through the second overlapping region.

Preferably, the diameter ($E_1$) of the terminal exposing portion 41 of the terminal 40 must be at least equal to or greater than the first width ($W_1$) of the first bus bar terminal 152. This is because the first overlapping region of the first bus bar terminal 152 and the terminal exposing portion 41 must not deviate to the outside of the terminal exposing portion 41 on a plane. In addition, the diameter ($E_1$) of the terminal 40 may be increased to the maximum until the distance between the boundary of the electrode terminal 40 and the second bus bar terminal 153 corresponds to the width (G) of the gasket exposing portion 51 of the insulating gasket 50. Therefore, the maximum value of the diameter ($E_1$) of the terminal exposing portion 41 of the terminal 40 is '$D-2*R_d-2*G-2*W_2$'.

Preferably, the width ($E_2$) of the outer surface 20a is a factor dependent on the diameter ($E_1$) of the terminal exposing portion 41, and must be at least equal to or greater than the second width ($W_2$) of the second bus bar terminal 153. Only in this case, an overlapping region of the second bus bar terminal 153 and the outer surface 20a may be formed. In addition, the width ($E_2$) of the outer surface 20a may be increased up to 50% of '$D-2*R_d-2*G-E1$', which is a value obtained by subtracting the diameter ($E_1$) of the terminal exposing portion 41, the width ($2*G$) occupied by the gasket exposing portion 51 and the width of the round region ($2*R_d$) from the outer diameter (D) of the battery can 20.

In conclusion, in the cylindrical battery 1 according to the present disclosure, the diameter ($E_1$) of the terminal exposing portion 41 of the terminal 40 and the width ($E_2$) of the outer surface 20a are preferably designed to satisfy the following formulas.

$$W_1 \leq E_1 \leq D-2R_d-2G-2W_2$$

$$E_2=0.5*(D-2R_d-2G-E_1)$$

($E_1$: diameter of the terminal 40 exposed out of the battery can 20, $E_2$: width of the exposed surface of the outer surface 20a of the closed portion of the battery can 20 approximately parallel to the upper surface of the terminal 40, D: outer diameter of the battery can 20, $R_d$: width of the round region R measured on a plane, G: exposure width of the insulating gasket 50 exposed out of the terminal 40 located outside the battery can 20, $W_1$: width of the first bus bar terminal 152, $W_2$: width of the second bus bar terminal 153)

In a specific example, when D is 46 mm, $W_1$ and $W_2$ are 6 mm, G is 0.5 mm and $R_d$ is 1 mm, the diameter ($E_1$) of the terminal exposing portion 41 is 6 mm to 31 mm and the width ($E_2$) of the outer surface 20a is 6 mm and 18.5 mm.

As another example, when D is 46 mm, $W_1$ and $W_2$ are 6 mm, G is 0.5 mm and $R_d$ is 1.5 mm, the diameter ($E_1$) of the terminal exposing portion 41 is 6 mm to 30 mm and the width ($E_2$) of the outer surface 20a is 6 mm and 18 mm.

Meanwhile, the area occupied by the terminal exposing portion 41 (the area occupied by the first electrode terminal) is preferably about 2% to 30% of the area of the exposed surface of the outer surface 20a of the closed portion of the battery can 20 approximately parallel to the upper surface of the terminal 40 (the area occupied by the second electrode terminal). This is due to the width of the bus bar applied considering that a current in the level of about 300 A flows. If the ratio of the area occupied by the terminal exposing portion 41 to the area occupied by the outer surface 20a exceeds the upper limit of the above range, the area may not be sufficient to connect the second bus bar terminal 153 to the outer surface 20a. Conversely, if the ratio of the area occupied by the terminal exposing portion 41 to the area occupied by the outer surface 20a does not reach the lower limit of the above range, the area may not be sufficient in connecting the first bus bar terminal 153 to the terminal exposing portion 41.

Meanwhile, the width ($R_d$) occupied by the gasket exposing portion 51 may be in the range of about 0.1 mm to 3.0 mm, preferably about 0.1 mm to 1.0 mm. If the width ($R_d$) occupied by the gasket exposing portion 51 is too large, the connection area of the bus bar terminals 152, 153 may not be sufficiently secured. Conversely, if the width ($R_d$) occupied by the gasket exposing portion 51 is too small, for example if charging and discharging is performed at a high C-rate of 300 A or more, the electrical insulation between the terminal 40 and the outer surface 20a of the battery can 20 may be broken on a plane.

Preferably, the cylindrical battery may be, for example, a cylindrical battery whose form factor ratio (defined as a value obtained by dividing the diameter of the cylindrical battery by height, namely a ratio of height (H) to diameter ($\Phi$)) is greater than about 0.4.

Here, the form factor means a value indicating the diameter and height of a cylindrical battery. The cylindrical battery according to an embodiment of the present disclosure may be, for example, a 46110 cell, a 48750 cell, a 48110 cell, a 48800 cell, or a 46800 cell. In the numerical value representing the form factor, first two numbers indicate the diameter of the cell, next two numbers indicate the height of the cell, and the last number "0" indicates that the cross-section of the cell is circular.

A battery according to an embodiment of the present disclosure may be a cylindrical battery having an approximately cylindrical shape, whose diameter is approximately 46 mm, height is approximately 110 mm, and form factor ratio is 0.418.

A battery according to another embodiment may be a cylindrical battery having a substantially cylindrical shape, whose diameter is about 48 mm, height is about 75 mm, and form factor ratio is 0.640.

A battery according to still another embodiment may be a cylindrical battery having an approximately cylindrical shape, whose diameter is approximately 48 mm, height is approximately 110 mm, and form factor ratio is 0.418.

A battery according to still another embodiment may be a cylindrical battery having an approximately cylindrical shape, whose diameter is approximately 48 mm, height is approximately 80 mm, and form factor ratio is 0.600.

A battery according to still another embodiment may be a cylindrical battery having an approximately cylindrical shape, whose diameter is approximately 46 mm, height is approximately 80 mm, and form factor ratio is 0.575.

Conventionally, batteries having a form factor ratio of about 0.4 or less have been used. That is, conventionally, for example, 18650 cell, 21700 cell, etc. were used. The 18650 cell has a diameter of approximately 18 mm, height of approximately 65 mm, and a form factor ratio of 0.277. The 21700 cell has a diameter of approximately 21 mm, a height of approximately 70 mm, and a form factor ratio of 0.300.

As described above, the cylindrical battery 1 of the present disclosure has a structure in which resistance is minimized by expanding a contact area between components, multiplexing current path, minimizing a current path length, and the like. After the product is finally manufactured, the AC resistance of the cylindrical battery 1 measured using a resistance measuring instrument between the positive electrode and the negative electrode, namely between the upper surface of the terminal 40 and the outer surface 20a of the closed portion of the battery can 20, may be about 4 milliohms (mohm) or less, but greater than 0.5 milliohms (mohm).

Figure 24:
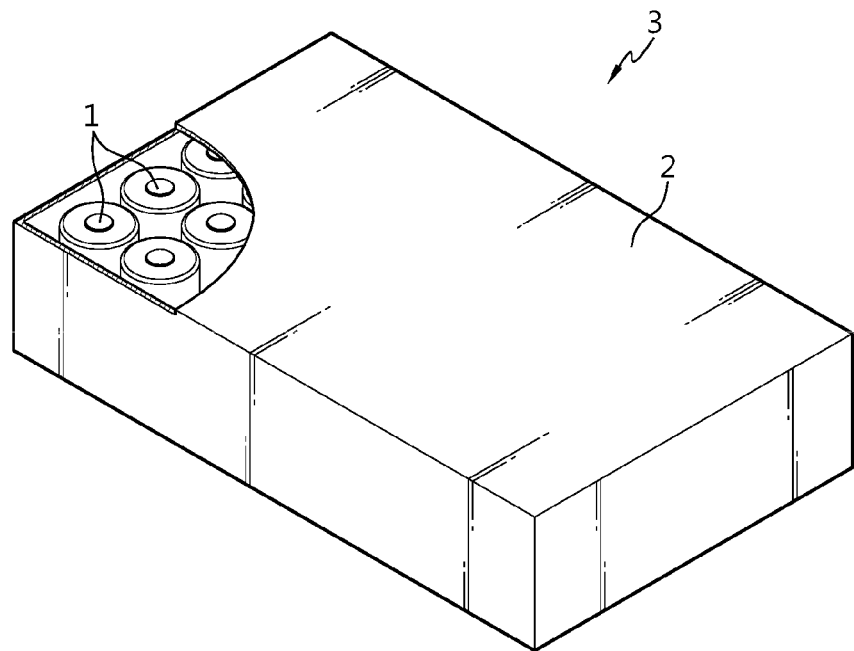
FIG. 24 is a diagram showing a schematic configuration of a battery pack including the cylindrical batteries according to an embodiment of the present disclosure.

Referring to FIG. 24, a battery pack 3 according to an embodiment of the present disclosure includes a secondary battery assembly in which a plurality of cylindrical batteries 1 according to an embodiment of the present disclosure as described above are electrically connected, and a pack housing 2 for accommodating the secondary battery assembly. In FIG. 24 of the present disclosure, components for electrical connection such as a bus bar, a cooling unit and a power terminal are not depicted for convenience of illustration. The electrical connection structure of the plurality of batteries 1 for manufacturing the battery pack 3 has been exemplarily described above with reference to FIGS. 20 and 21.

Figure 25:
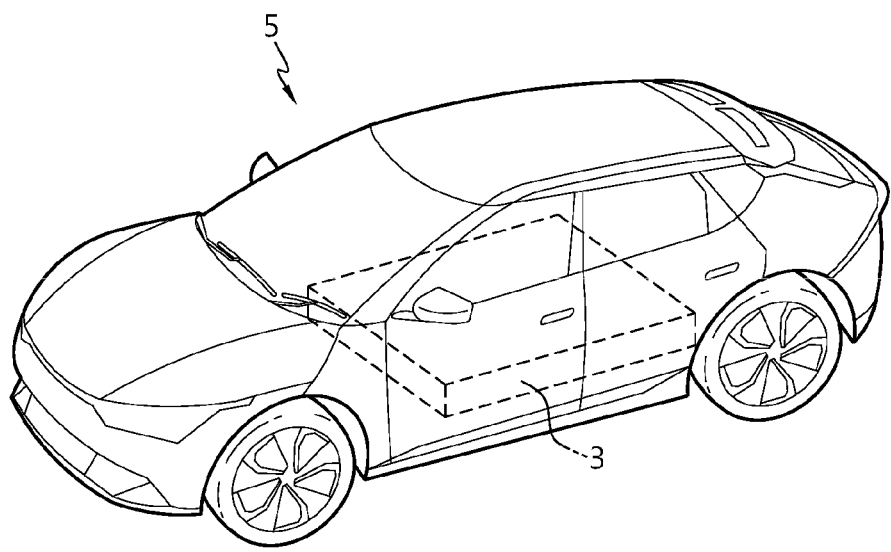
FIG. 25 is a diagram showing a schematic configuration of a vehicle including the battery pack according to an embodiment of the present disclosure.

Referring to FIG. 25, a vehicle 5 according to an embodiment of the present disclosure may be, for example, an electric vehicle, a hybrid electric vehicle or a plug-in vehicle, and includes the battery pack 3 according to an embodiment of the present disclosure. The vehicle 5 includes a four-wheeled vehicle and a two-wheeled vehicle. The vehicle 5 operates by receiving a power from the battery pack 3 according to an embodiment of the present disclosure.

The present disclosure has been described in detail. However, it should be understood that the detailed description and specific examples, while indicating example embodiments of the disclosure, are given by way of illustration only, since various changes and modifications within the scope of the disclosure will become apparent to those skilled in the art from this detailed description.

What is claimed is:

1. A battery, comprising:
   an electrode assembly having a first electrode, a second electrode and a separator between the first electrode and the second electrode, wherein the first electrode, the second electrode, and the separator are wound about an axis, and wherein each of the first electrode and the second electrode has a first portion including an active material corresponding to the separator, and a second portion exposed beyond the separator and not coated with the active material;
   a battery housing having a first end with a first opening and a second end with a second opening opposite the first end, the battery housing accommodating the electrode assembly through the second opening at the second end and electrically connected to the second portion of the second electrode;
   a terminal electrically connected to the second portion of the first electrode and exposed out of the battery housing through the first opening of the battery housing at the first end;
   a cap covering and sealing the second opening at the second end of the battery housing;
   an insulating gasket between the battery housing and the terminal, wherein the insulating gasket overlappingly circumscribes an inner wall of the electrode assembly in an axial direction of battery; and
   a sealing gasket between the battery housing and the cap at an overlap of the cap and the battery housing at the second end, wherein the sealing gasket overlappingly circumscribes an outer wall of the electrode assembly in the axial direction of the battery.

2. The battery according to claim 1, wherein the cap has no polarity, and
   wherein the terminal has a first polarity and the battery housing has a second polarity.

3. The battery according to claim 1, wherein the terminal penetrates the first opening of the battery housing at the first end.

4. The battery according to claim 1, wherein a surface of the terminal exposed out of the battery housing serves as a first electrode terminal to which a first bus bar terminal is coupled, and
   wherein a region of an outer surface of the first end of the battery housing, which is parallel to an upper surface of the first electrode terminal, serves as a second electrode terminal to which a second bus bar terminal is coupled,
   wherein the first bus bar terminal overlaps with the first electrode terminal on a plane to form a first overlapping region,
   wherein the second bus bar terminal overlaps with the second electrode terminal on a plane to form a second overlapping region, and
   wherein a diameter of the first electrode terminal and a width of the second electrode terminal satisfy the following formulas:

$W_1 \leq E_1 \leq D - 2R_d - 2G - 2W_2$, and $E_2 = 0.5*(D - 2R_d - 2G - E_1)$, wherein $E_1$ is a diameter of the terminal exposed out of the battery housing,
   $E_2$ is a width of the region of the outer surface of the first end of the battery housing parallel to the upper surface of the terminal,
   D is an outer diameter of the battery housing,
   $R_d$ is a width of a round region at an edge of the battery housing measured on a plane,
   G is an exposure width of the insulating gasket exposed out of an edge of the first electrode terminal on a plane,
   $W_1$ is a maximum value among distances between arbitrarily selected two points at an edge of the first overlapping region; and
   $W_2$ is a maximum value among distances between two points at which a plurality of straight lines passing through a center of the first electrode terminal meet an edge of the second overlapping region.

5. The battery according to claim 1, wherein at least a part of the second portion of the first electrode includes a plurality of segments divided along a winding direction of the electrode assembly, and
   wherein the plurality of segments are bent along a radial direction of the electrode assembly.

6. The battery according to claim 5, wherein the plurality of segments are overlapped in multiple layers along the radial direction.

7. The battery according to claim 6, wherein the electrode assembly includes a welding target region in which the number of multiple layers that are overlapped of the plurality of segments of the second portion of the first electrode is kept constant along the radial direction of the electrode assembly.

8. The battery according to claim 7, further comprising a first current collector coupled to the second portion of the first electrode of the electrode assembly and coupled to the terminal to electrically connect the second portion of the first electrode of the electrode assembly and the terminal, and wherein the first current collector is coupled to the second portion of the first electrode at the welding target region.

9. The battery according to claim 1, wherein at least a part of the second portion of the second electrode includes a plurality of segments divided along a winding direction of the electrode assembly, and
   wherein the plurality of segments are bent along a radial direction of the electrode assembly.

10. The battery according to claim 9, wherein the plurality of segments are overlapped in multiple layers along the radial direction.

11. The battery according to claim 10, wherein the electrode assembly includes a welding target region in which the number of multiple layers that are overlapped of the plurality of segments of the second portion of the second electrode is kept constant along the radial direction of the electrode assembly.

12. The battery according to claim 11, further comprising a second current collector coupled to the second portion of the second electrode of the electrode assembly and coupled to the battery housing to electrically connect the second portion of the second electrode of the electrode assembly and the battery housing, and
   wherein the second current collector is coupled to the second portion of the second electrode inside the welding target region.

13. The battery according to claim 1, wherein the cap includes a venting portion that ruptures when an internal pressure of the battery housing increases over a predetermined level to discharge gas generated inside the battery housing.

14. The battery according to claim 1, wherein the terminal includes:
   a terminal exposing portion exposed out of the battery housing; and
   a terminal insert portion provided through the first opening of the first end of the battery housing and located inside the battery housing.

15. The battery according to claim 14, wherein the terminal insert portion includes:
   an electric connection portion electrically connected to the second portion of the first electrode; and
   a flange portion formed at a periphery of the electric connection portion and having a shape bent toward an inner surface of the first end of the battery housing and riveted on the inner surface.

16. The battery according to claim 15,
   wherein the insulating gasket includes:
   a gasket exposing portion between the terminal exposing portion and the battery housing; and
   a gasket insert portion between the terminal insert portion and the battery housing.

17. The battery according to claim 16, wherein the gasket insert portion and the inner surface of the first end of the battery housing are pressed together when the flange portion of the terminal insert portion is riveted, and are in contact.

18. The battery according to claim 1, further comprising a first current collector coupled to a second portion of the first electrode of the electrode assembly and coupled to the terminal to electrically connect the second portion of the first electrode of the electrode assembly and the terminal,
   wherein the first current collector includes:
   an edge portion disposed on the electrode assembly;
   a second portion of the first electrode coupling portion extending inward from the edge portion and coupled to the second portion of the first electrode;
   a terminal coupling portion extending inward from the edge portion and coupled to the terminal; and
   a bridge portion extending radially inward from the edge portion and connected to the terminal coupling portion.

19. The battery according to claim 18, wherein the second portion of the first electrode coupling portion and the terminal coupling portion are not directly contacted, and are electrically connected through the edge portion and the bridge portion.

20. The battery according to claim 18, wherein the bridge portion includes a notching portion formed to reduce a sectional area of the bridge portion.

21. The battery according to claim 20, wherein at least a part of the second portion of the first electrode includes a plurality of segments divided along a winding direction of the electrode assembly, and the plurality of segments are bent along a radial direction of the electrode assembly to be overlapped in multiple layers, and
   wherein the notching portion is provided in a region corresponding to a welding target region in which the number of overlapping layers of the plurality of segments of the second portion of the first electrode is constant along the radial direction of the electrode assembly.

22. The battery according to claim 1, further comprising a second current collector coupled to the second portion of the second electrode of the electrode assembly and coupled to the battery housing to electrically connect the second portion of the second electrode of the electrode assembly and the battery housing,
   wherein the second current collector includes:
   a support portion disposed on the electrode assembly;
   a second portion of the second electrode coupling portion extending from the support portion and coupled to the second portion of the second electrode; and
   a housing coupling portion extending from the support portion and coupled to the battery housing.

23. The battery according to claim 22, wherein the housing coupling portion is provided in plural,
   wherein the plurality of the housing coupling portions radially extend toward a sidewall of the battery housing, and
   wherein the second current collector and the battery housing are electrically connected at a plurality of locations.

24. The battery according to claim 22, wherein the battery housing includes a beading portion formed by press-fitting a periphery of an outer circumferential surface of the battery housing at the second end, and
   wherein the housing coupling portion is electrically coupled to a surface of the beading portion.

25. The battery according to claim 24, wherein the battery housing includes a crimping portion formed away from the beading portion and having a shape extending and bent from the beading portion to surround an outer circumferential surface of the cap and a part of an outer surface of the cap,
   wherein the sealing gasket is disposed between the battery housing and the cap at the crimping portion, and
   wherein the housing coupling portion is between the sealing gasket and the surface of the beading portion.

26. The battery according to claim 24, wherein a flat portion parallel to the first end of the battery housing is formed on the surface of the beading portion, and
   wherein the housing coupling portion is electrically coupled onto the flat portion.

27. The battery according to claim 1, wherein the sealing gasket creates an airtight seal based on the cap being interposed between portions of the sealing gasket in the axial direction of the battery.

28. The battery according to claim 1, wherein the terminal includes a center portion and a periphery portion encircling the center,
- wherein a thickness of the terminal at the center is greater than a thickness of the terminal at the peripheral portion, and
- wherein the center portion of the terminal entirely overlaps a winding center of the electrode assembly.

* * * * *